(12) United States Patent
Fong et al.

(10) Patent No.: US 8,793,989 B2
(45) Date of Patent: Aug. 5, 2014

(54) COMPRESSED AIR ENERGY STORAGE SYSTEM UTILIZING TWO-PHASE FLOW TO FACILITATE HEAT EXCHANGE

(75) Inventors: Danielle A. Fong, Berkeley, CA (US); Stephen E. Crane, Santa Rosa, CA (US); Edwin P. Berlin, Jr., Oakland, CA (US)

(73) Assignee: Lightsail Energy, Inc., Oakland, CA (US)

(*) Notice: Subject to any disclaimer, the term of this patent is extended or adjusted under 35 U.S.C. 154(b) by 367 days.

(21) Appl. No.: 12/701,032

(22) Filed: Feb. 5, 2010

(65) Prior Publication Data
US 2010/0329891 A1 Dec. 30, 2010

Related U.S. Application Data

(63) Continuation of application No. 12/695,922, filed on Jan. 28, 2010.
(60) Provisional application No. 61/221,487, filed on Jun. 29, 2009.

(51) Int. Cl.
*F04D 29/58* (2006.01)
(52) U.S. Cl.
USPC .............................................. 60/408; 60/456
(58) Field of Classification Search
USPC ................................................... 60/408, 456
See application file for complete search history.

(56) References Cited

U.S. PATENT DOCUMENTS

| | | |
|---|---|---|
| 1,456,765 A | 5/1923 | Cupp |
| 1,751,537 A | 3/1930 | Vianello |
| 1,929,350 A | 10/1933 | Christensen |
| 2,025,142 A | 12/1935 | Zahm et al. |
| 2,280,645 A | 4/1942 | Ferguson |
| 2,280,845 A | 4/1942 | Parker |
| 3,704,079 A | 11/1972 | Berlyn |

(Continued)

FOREIGN PATENT DOCUMENTS

| | | |
|---|---|---|
| DE | 69329459 T2 | 1/2001 |
| EP | 0647291 B1 | 9/2000 |

(Continued)

OTHER PUBLICATIONS

U.S. Appl. No. 12/701,023, filed Feb. 5, 2010, Lightsail Energy Inc.

(Continued)

*Primary Examiner* — F. Daniel Lopez

(57) ABSTRACT

A compressed-air energy storage system according to embodiments of the present invention comprises a reversible mechanism to compress and expand air, one or more compressed air storage tanks, a control system, one or more heat exchangers, and, in certain embodiments of the invention, a motor-generator. The reversible air compressor-expander uses mechanical power to compress air (when it is acting as a compressor) and converts the energy stored in compressed air to mechanical power (when it is acting as an expander). In certain embodiments, the compressor-expander comprises one or more stages, each stage consisting of pressure vessel (the "pressure cell") partially filled with water or other liquid. In some embodiments, the pressure vessel communicates with one or more cylinder devices to exchange air and liquid with the cylinder chamber(s) thereof. Suitable valving allows air to enter and leave the pressure cell and cylinder device, if present, under electronic control.

12 Claims, 42 Drawing Sheets

(56) References Cited

U.S. PATENT DOCUMENTS

| | | |
|---|---|---|
| 3,952,723 A | 4/1976 | Browning |
| 4,027,993 A | 6/1977 | Wolff |
| 4,229,661 A | 10/1980 | Mead et al. |
| 4,476,851 A | 10/1984 | Brugger et al. |
| 4,651,525 A | 3/1987 | Cestero |
| 4,784,570 A | 11/1988 | Bond |
| 5,076,067 A | 12/1991 | Prenger et al. |
| 5,121,607 A | 6/1992 | George, Jr. |
| 5,195,874 A | 3/1993 | Odagiri |
| 5,391,067 A * | 2/1995 | Saunders .................. 418/60 |
| 5,491,969 A | 2/1996 | Cohn et al. |
| 5,537,822 A | 7/1996 | Shnaid et al. |
| 5,616,007 A | 4/1997 | Cohen |
| 5,634,340 A | 6/1997 | Grennan |
| 5,680,764 A | 10/1997 | Viteri |
| 5,685,154 A | 11/1997 | Bronicki et al. |
| 5,832,728 A | 11/1998 | Buck |
| 6,206,660 B1 | 3/2001 | Coney et al. |
| RE37,603 E | 3/2002 | Coney |
| 6,962,053 B2 | 11/2005 | Gebel et al. |
| 8,037,677 B2 | 10/2011 | Fong et al. |
| 8,037,679 B2 | 10/2011 | Fong et al. |
| 8,061,132 B2 | 11/2011 | Fong et al. |
| 8,065,873 B2 | 11/2011 | Fong et al. |
| 8,065,874 B2 | 11/2011 | Fong et al. |
| 8,087,241 B2 | 1/2012 | Fong et al. |
| 2003/0105556 A1 | 6/2003 | Enis et al. |
| 2005/0274334 A1 | 12/2005 | Warren |
| 2006/0137348 A1 | 6/2006 | Pas |
| 2006/0266037 A1 | 11/2006 | Ingersoll |
| 2007/0006586 A1 | 1/2007 | Hoffman et al. |
| 2007/0095069 A1 | 5/2007 | Joshi et al. |
| 2008/0047271 A1 | 2/2008 | Ingersoll |
| 2008/0050234 A1 | 2/2008 | Ingersoll et al. |
| 2009/0282822 A1 * | 11/2009 | McBride et al. .......... 60/415 |
| 2009/0301089 A1 | 12/2009 | Bollinger |
| 2010/0060013 A1 | 3/2010 | Csefko |
| 2010/0117372 A1 | 5/2010 | McMaster |
| 2011/0042959 A1 | 2/2011 | Kelly |
| 2011/0094231 A1 | 4/2011 | Freund |
| 2011/0100010 A1 | 5/2011 | Freund et al. |
| 2011/0106321 A1 | 5/2011 | Cherian et al. |

FOREIGN PATENT DOCUMENTS

| | | |
|---|---|---|
| JP | 56-132477 A | 10/1981 |
| JP | 57-97006 A | 6/1982 |
| JP | 9-166028 A | 6/1997 |
| JP | 2007-502389 A | 2/2007 |
| WO | WO 01/75290 A1 | 10/2001 |
| WO | WO 2008/045468 A1 | 4/2008 |
| WO | WO 2008/139267 A1 | 11/2008 |
| WO | WO 2009/034421 A1 | 3/2009 |
| WO | WO 2009/034548 A2 | 3/2009 |
| WO | WO 2009/114205 A2 | 9/2009 |
| WO | WO 2009/126784 A2 | 10/2009 |

OTHER PUBLICATIONS

U.S. Appl. No. 12/701,039, filed Feb. 5, 2010, Lightsail Energy Inc.
U.S. Appl. No. 12/701,080, filed Feb. 5, 2010, Lightsail Energy Inc.
U.S. Appl. No. 12/701,146, filed Feb. 5, 2010, Lightsail Energy Inc.
Website, "LightSail Designs—Technologies", Oct. 2008.
Website, "LightSail Designs—Frequenty Asked Questions", Oct. 2008.
Danielle Fong, "Tick Tock", Essays by Danielle Fong, Blog Entry, Nov. 2008.
Sylvain Lemofouet, "Energy Autonomy and Efficiency through Hydro-Pneumatic Storage", Enairys Power Tech.
Giuseppe Grazzini et al., "Energy Analysis of a CAES with Terminal Energy Storage", Università di Firenze, Italy.
Office Action from Japan Patent Office for Japanese Patent Application No. 2011-553178, dated Feb. 26, 2013.
International Search Report and Written Opinion for PCT/US2012/056155 filed on Sep. 19, 2012.

* cited by examiner

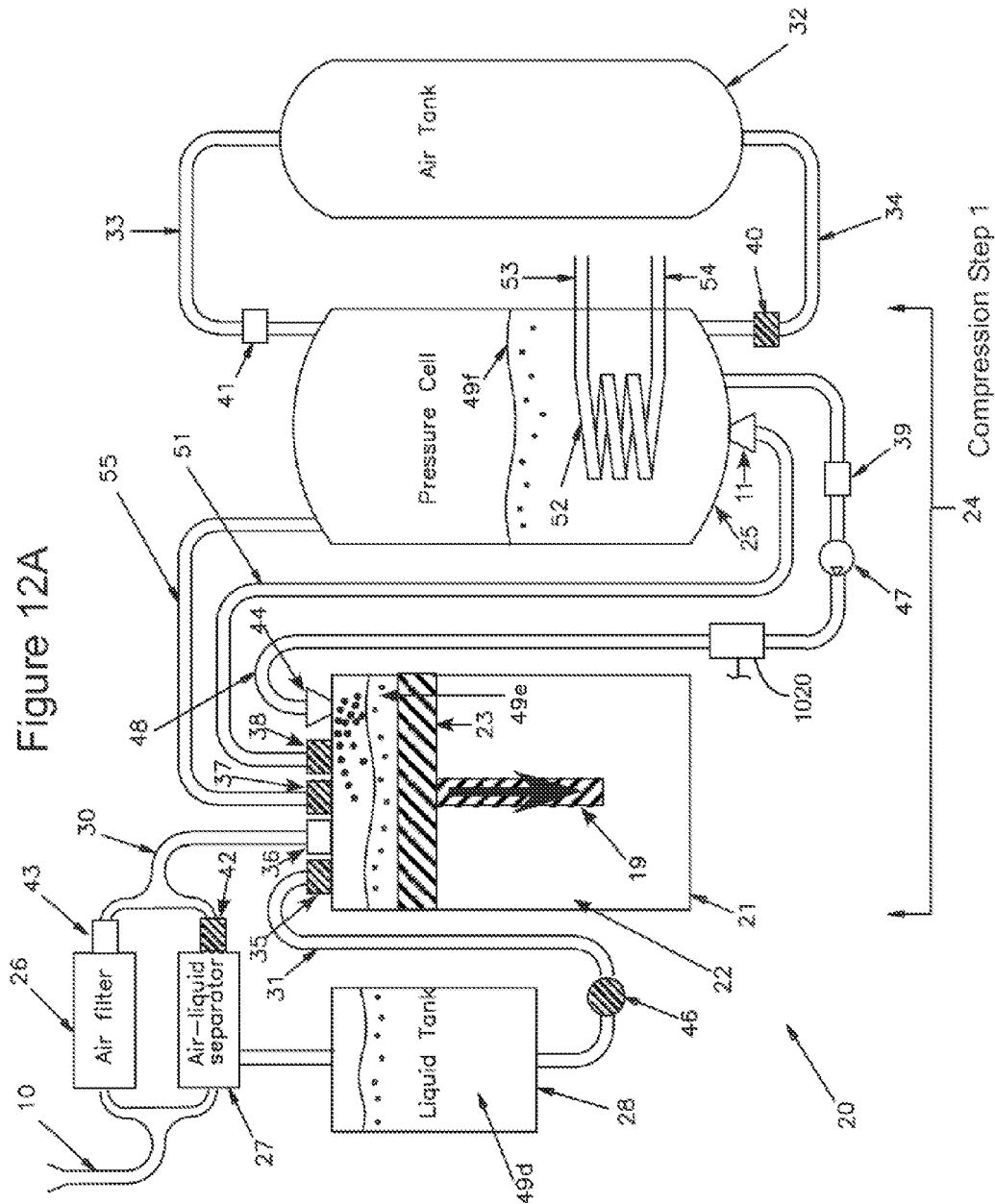

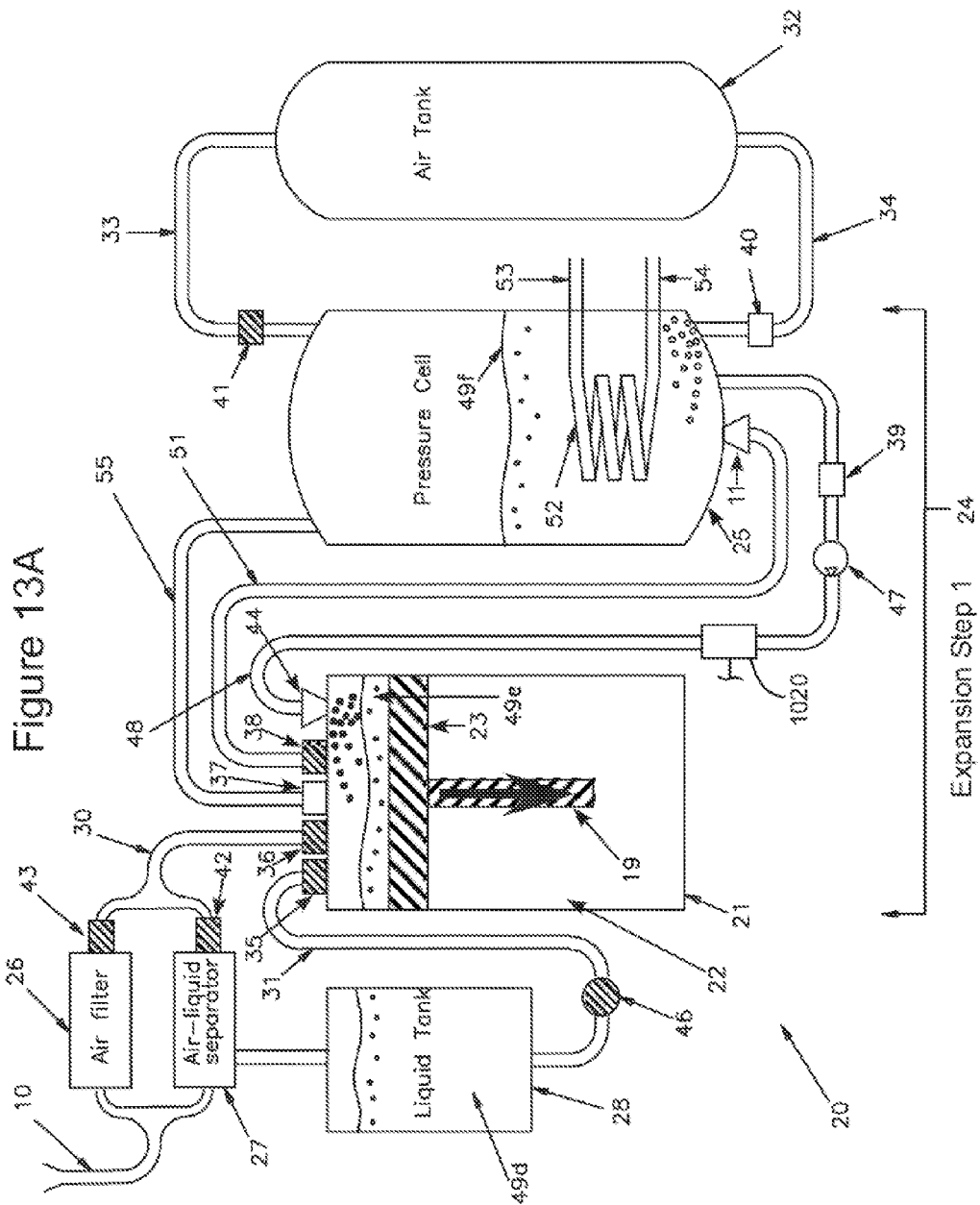

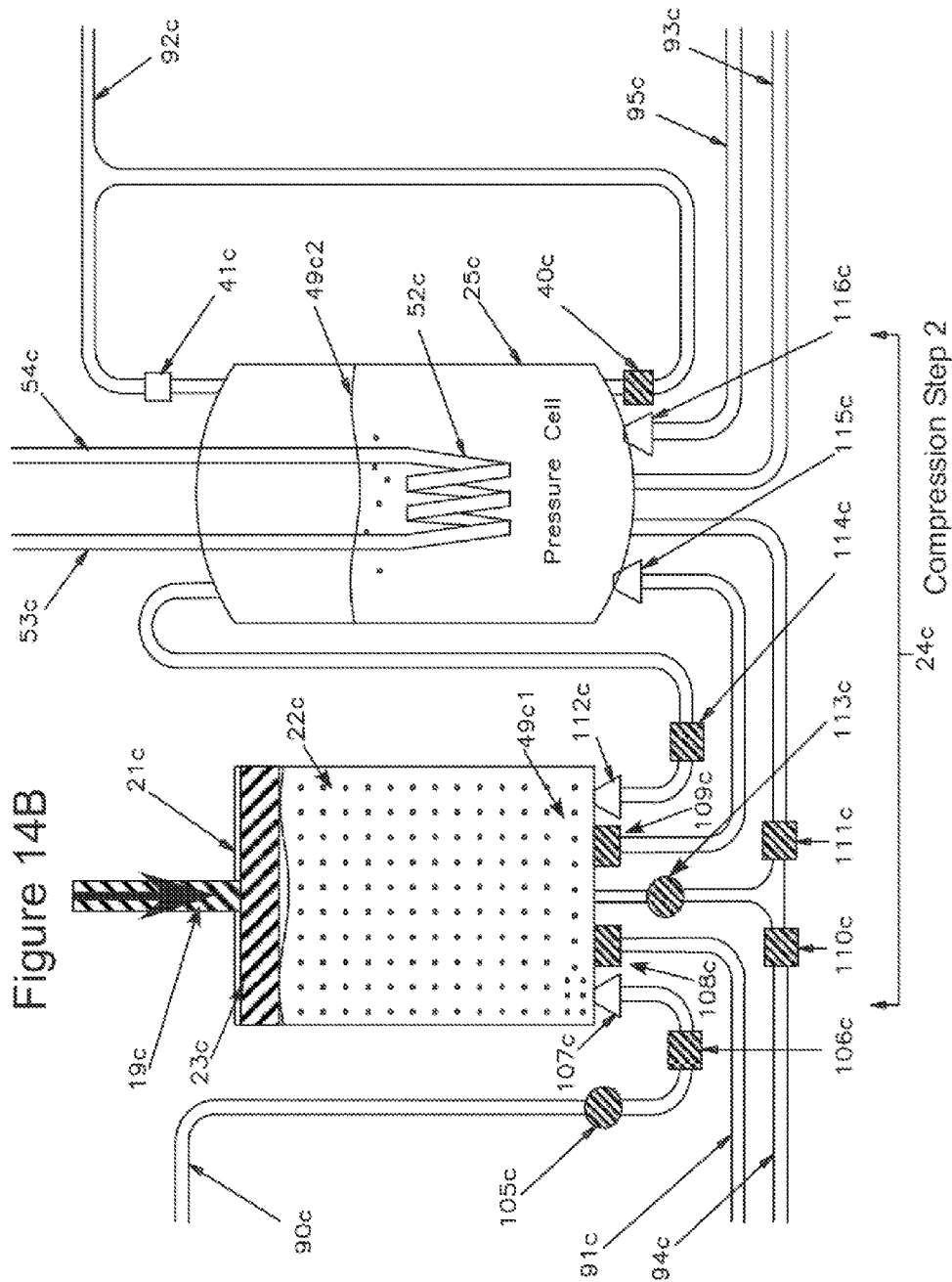

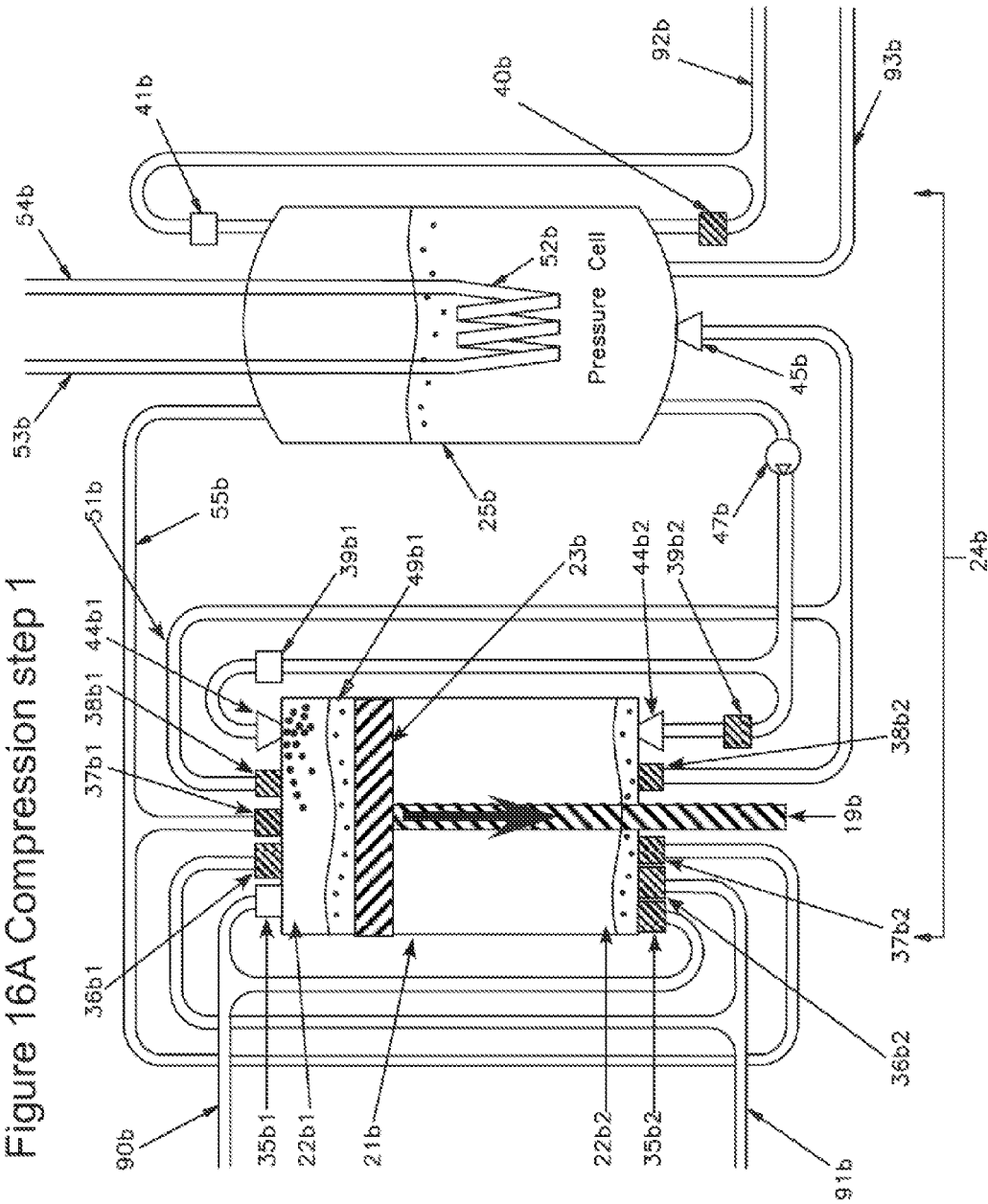

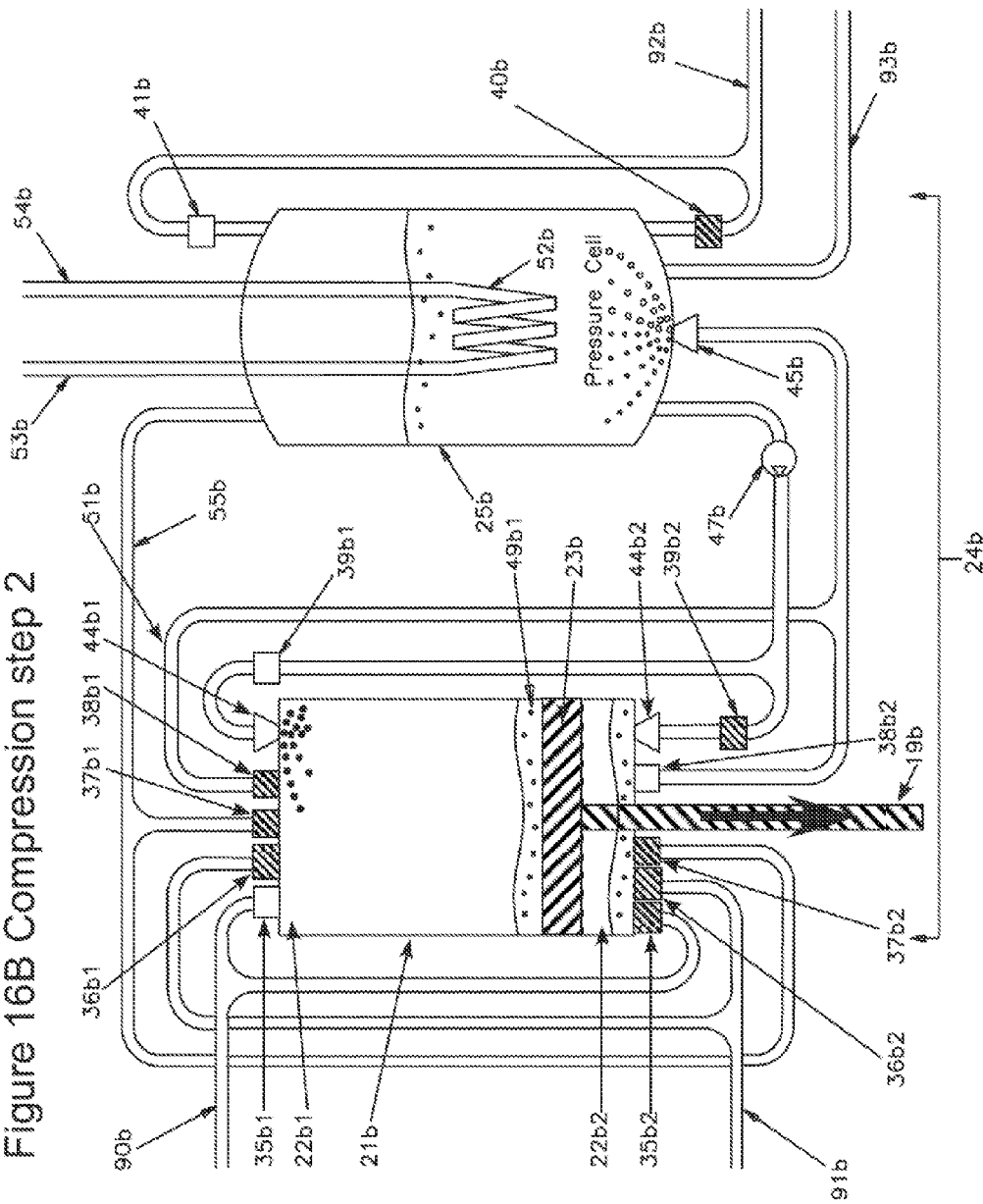

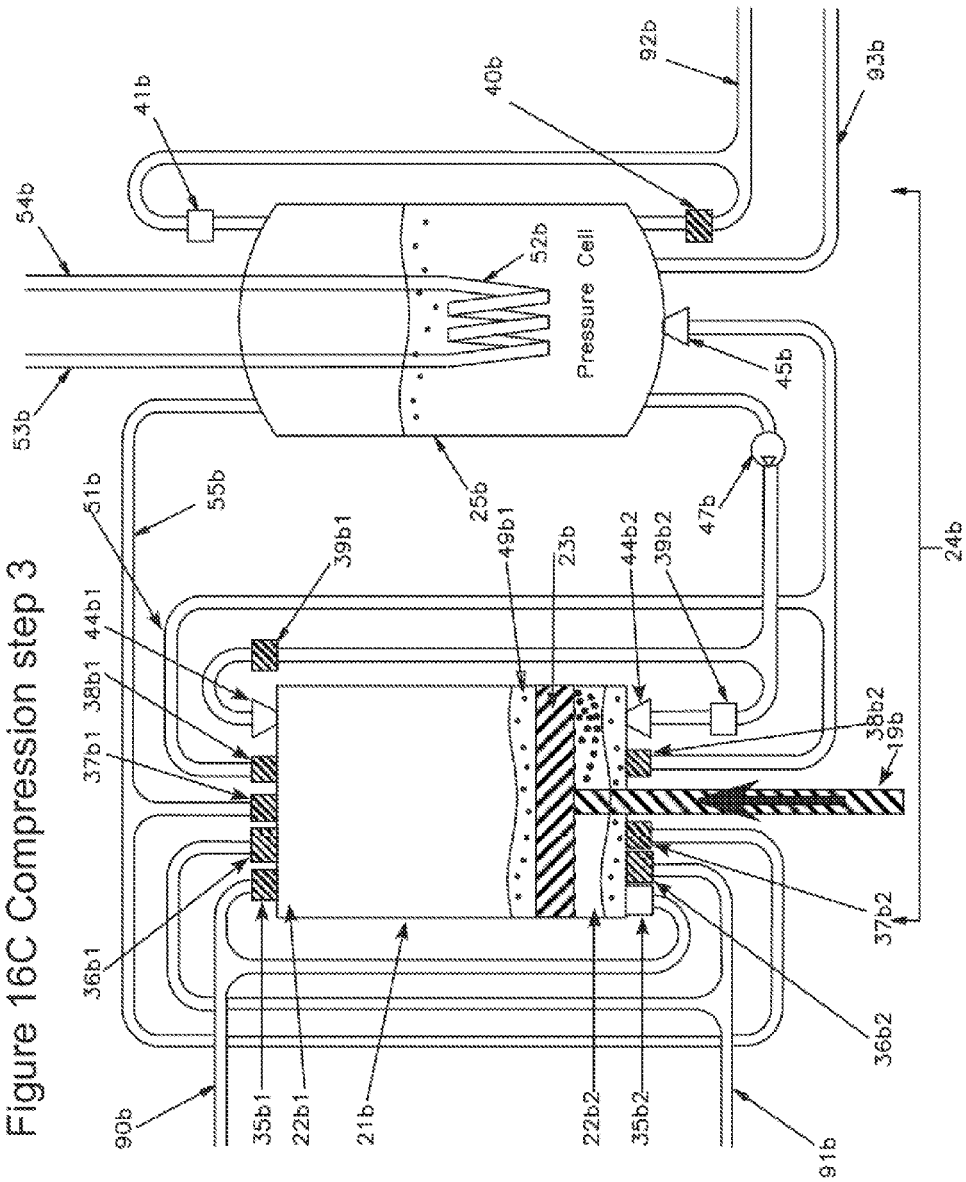

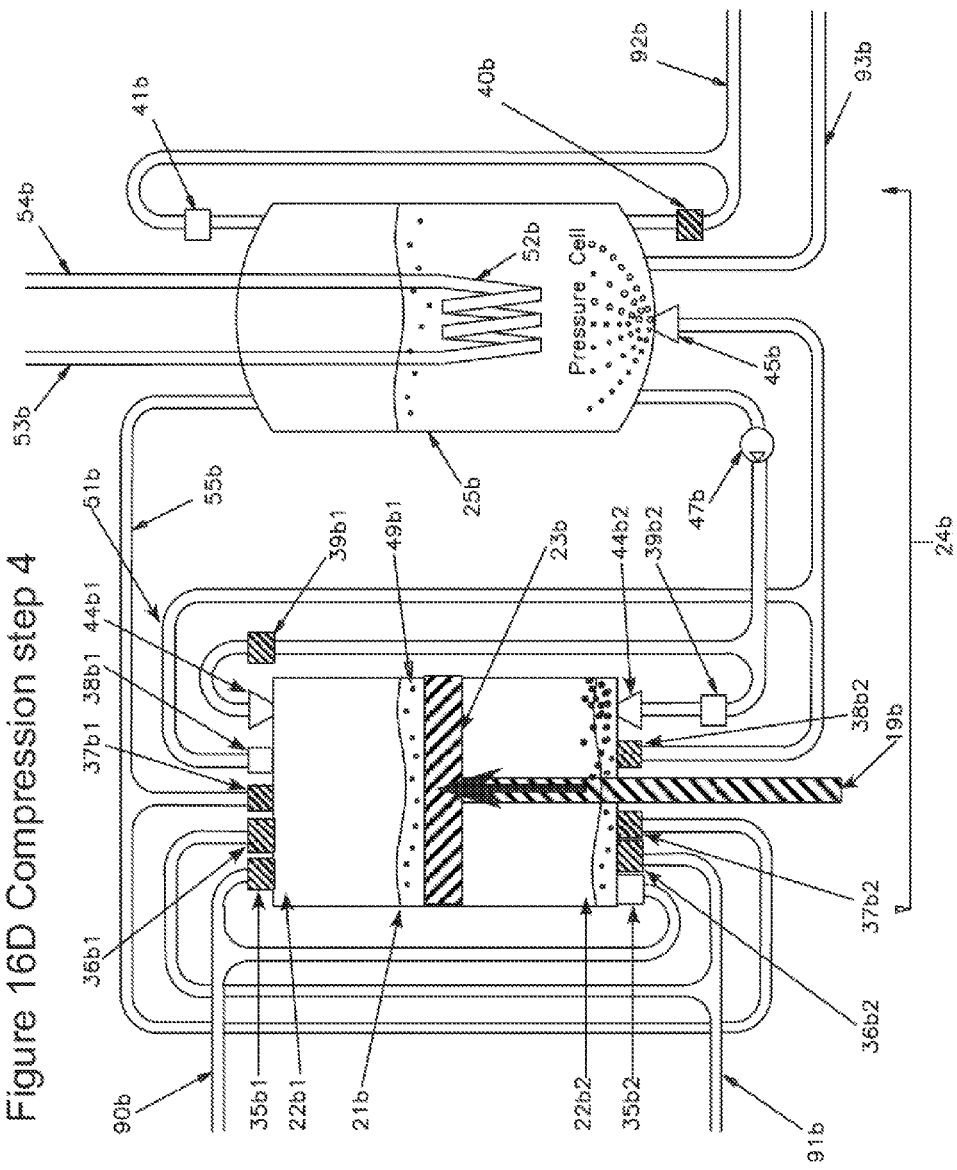

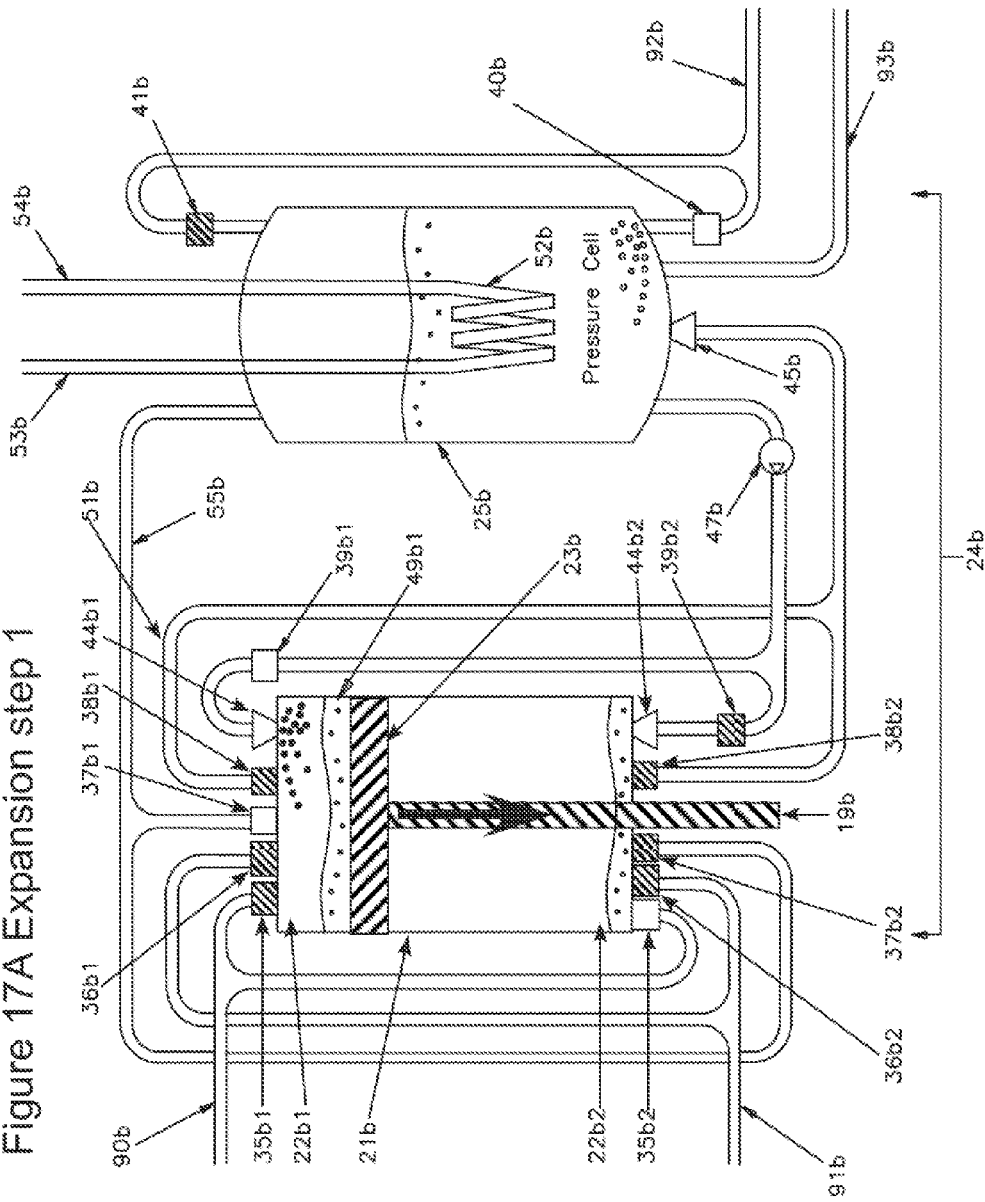

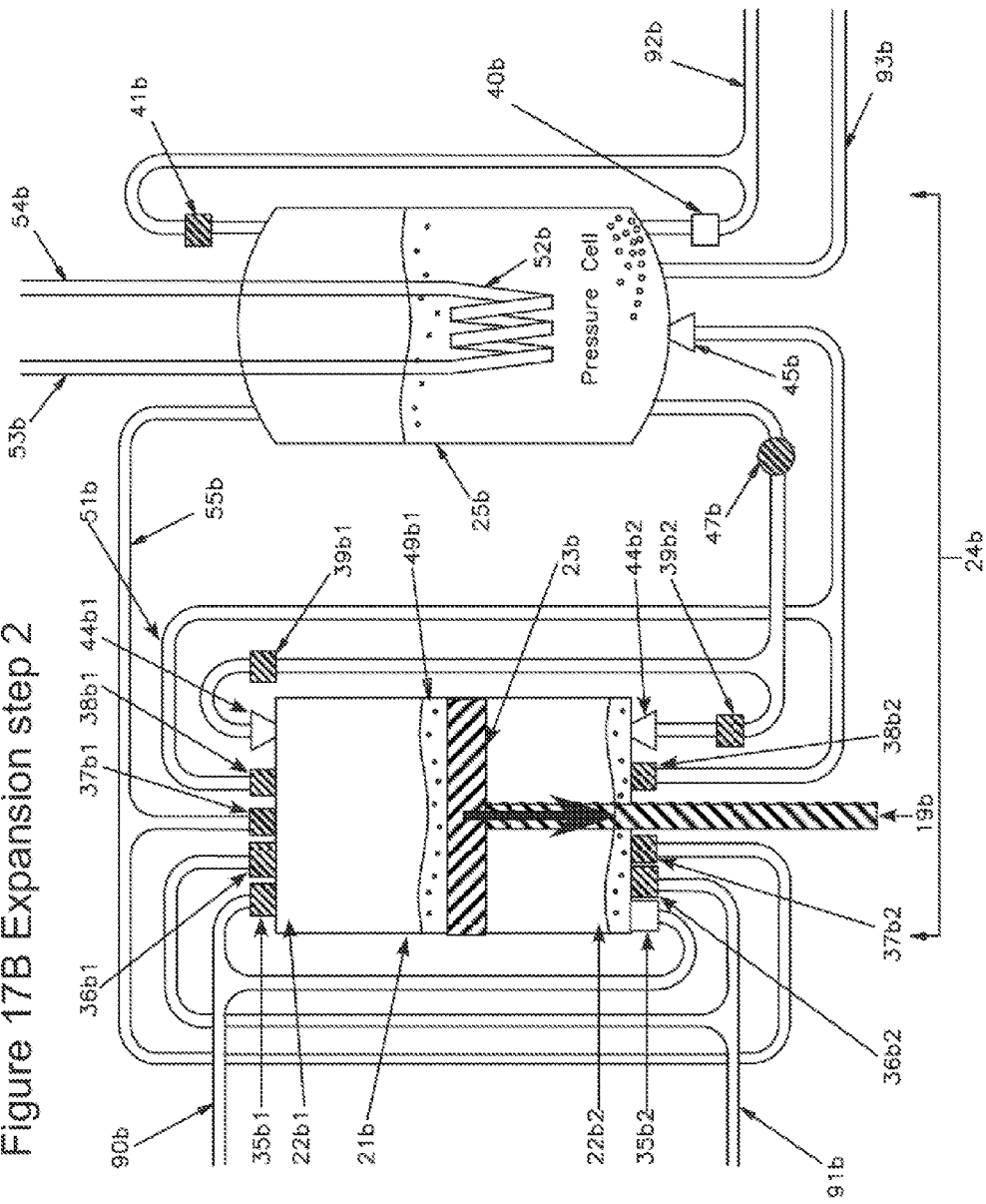

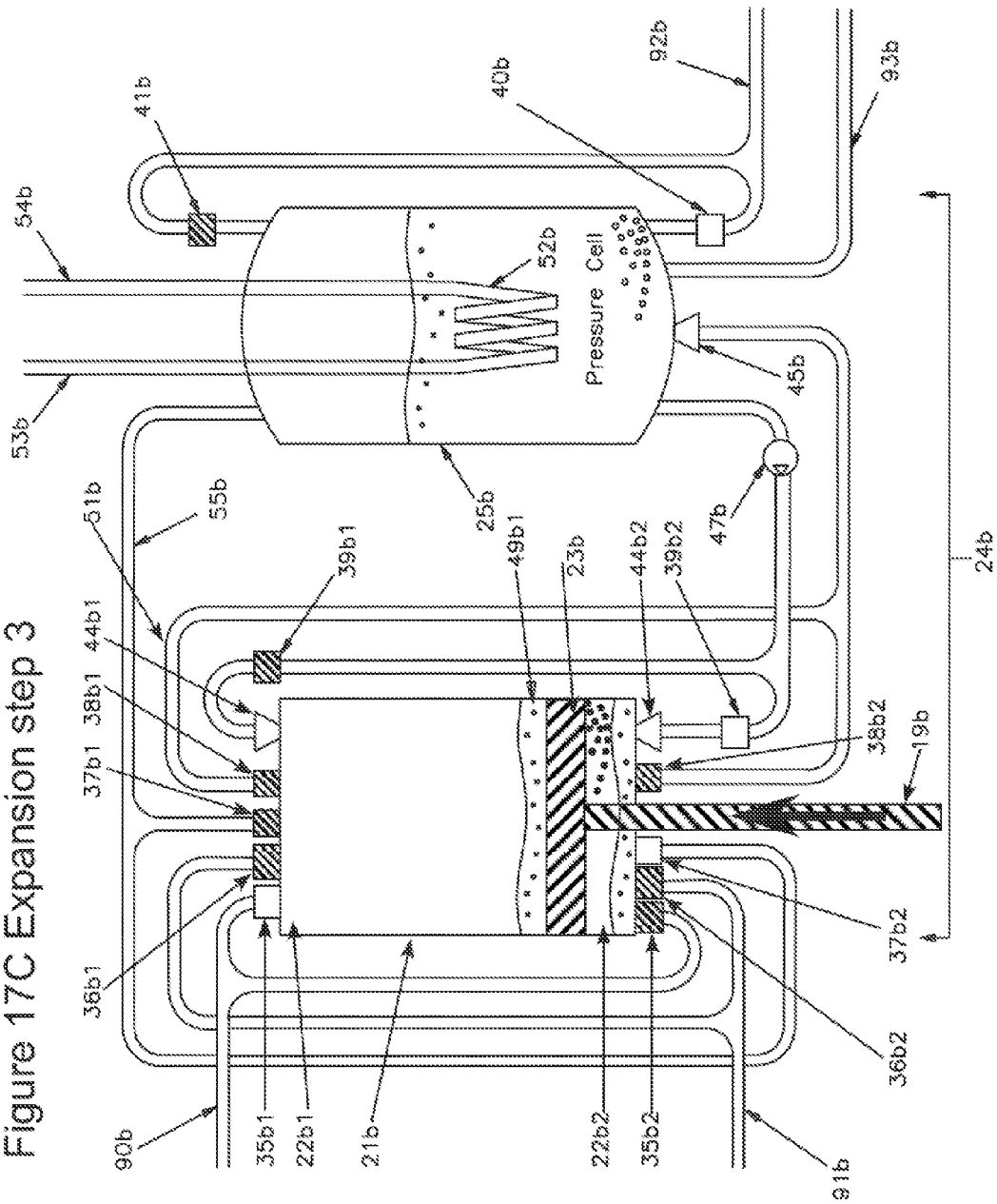

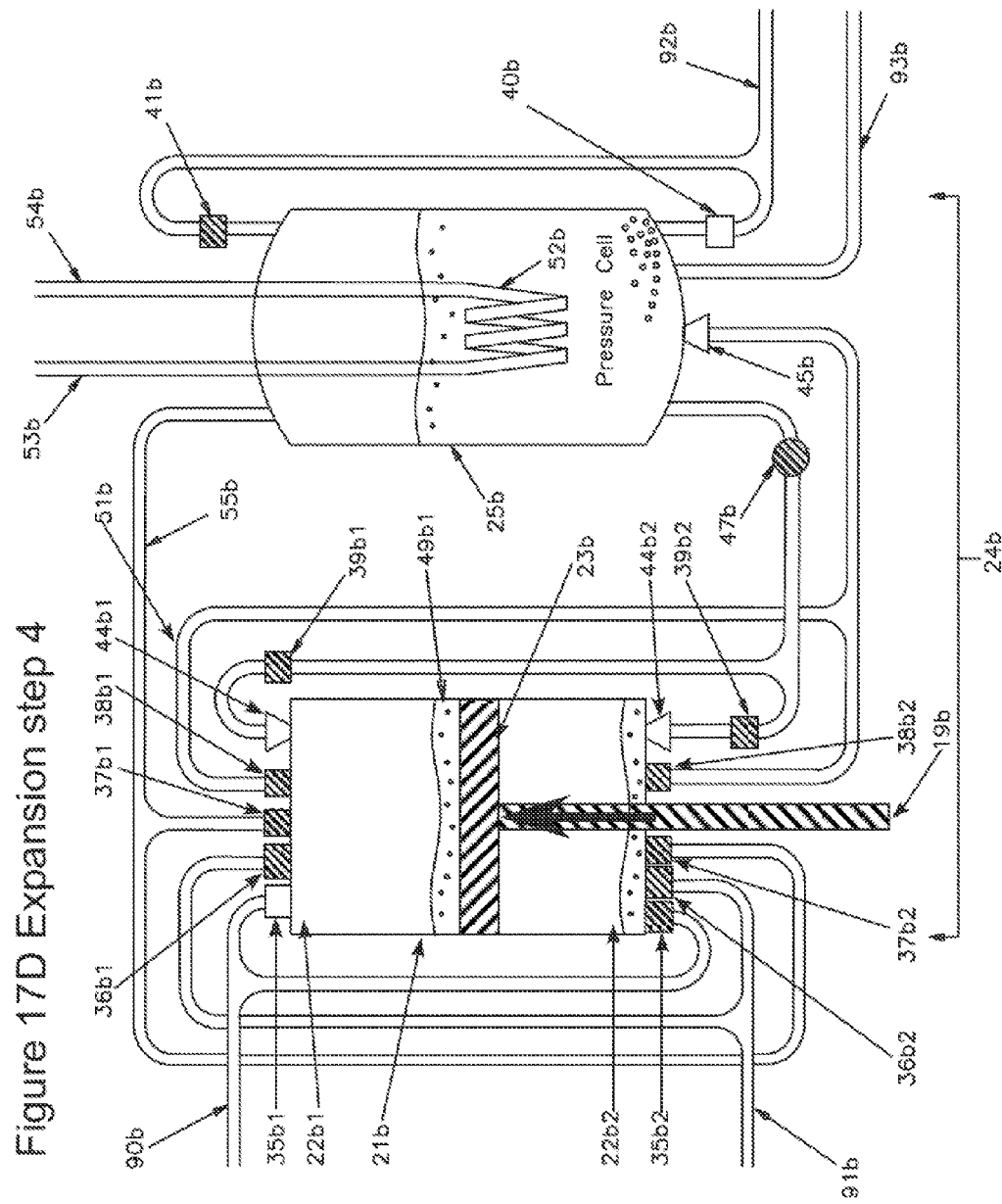
Figure 17D Expansion step 4

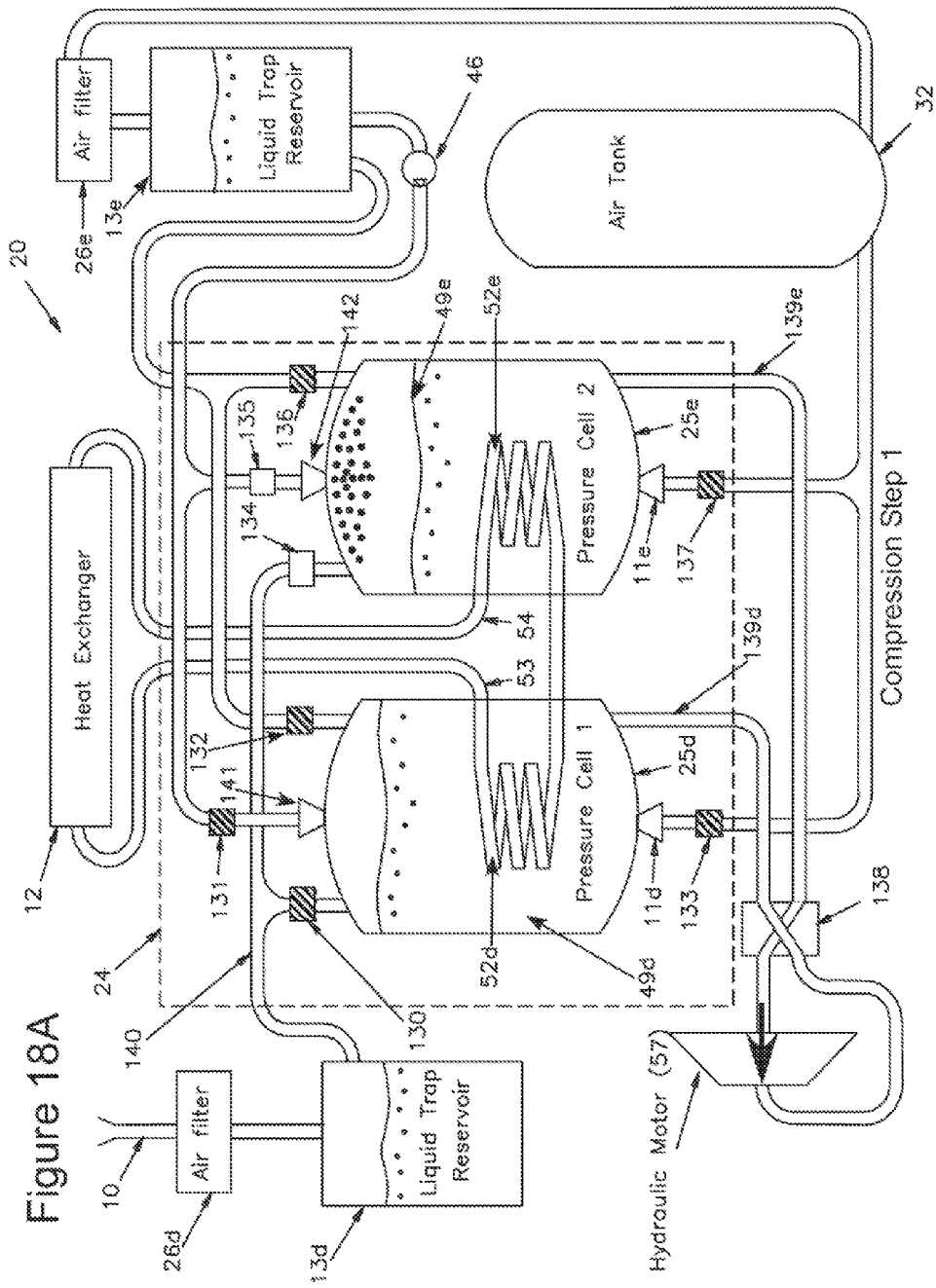

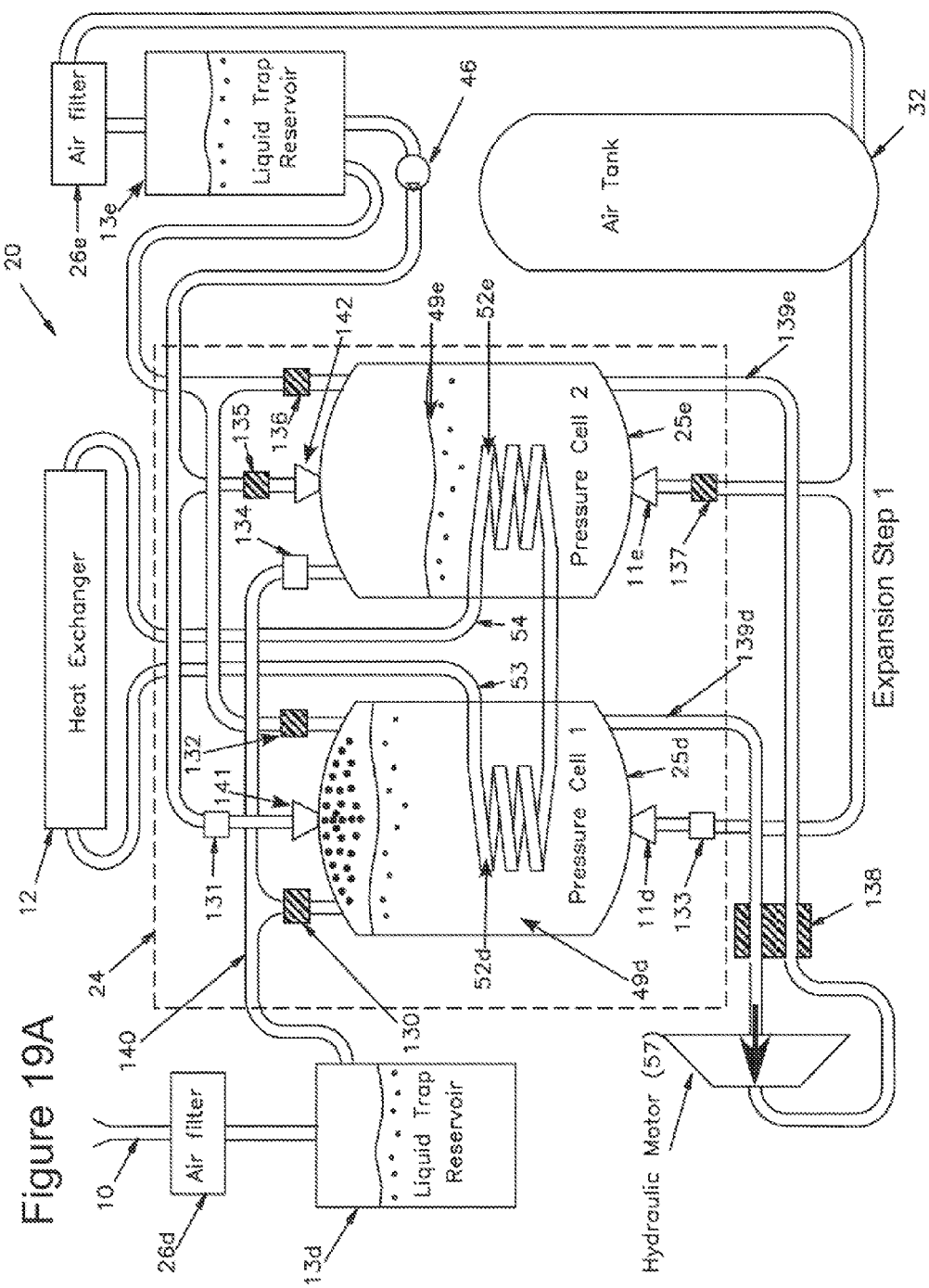

COMPRESSED AIR ENERGY STORAGE SYSTEM UTILIZING TWO-PHASE FLOW TO FACILITATE HEAT EXCHANGE

CROSS-REFERENCE TO RELATED APPLICATION

The instant nonprovisional patent application claims priority to U.S. Provisional Patent Application No. 61/221,487, filed Jun. 29, 2009 and incorporated by reference in its entirety herein for all purposes.

BACKGROUND

Air compressed to 300 bar has energy density comparable to that of lead-acid batteries and other energy storage technologies. However, the process of compressing and decompressing the air typically is inefficient due to thermal and mechanical losses. Such inefficiency limits the economic viability of compressed air for energy storage applications, despite its obvious advantages.

It is well known that a compressor will be more efficient if the compression process occurs isothermally, which requires cooling of the air before or during compression. Patents for isothermal gas compressors have been issued on a regular basis since 1930 (e.g., U.S. Pat. Nos. 1,751,537 and 1,929, 350). One approach to compressing air efficiently is to effect the compression in several stages, each stage comprising a reciprocating piston in a cylinder device with an intercooler between stages (e.g., U.S. Pat. No. 5,195,874). Cooling of the air can also be achieved by injecting a liquid, such as mineral oil, refrigerant, or water into the compression chamber or into the airstream between stages (e.g., U.S. Pat. No. 5,076,067).

Several patents exist for energy storage systems that mix compressed air with natural gas and feed the mixture to a combustion turbine, thereby increasing the power output of the turbine (e.g., U.S. Pat. No. 5,634,340). The air is compressed by an electrically-driven air compressor that operates at periods of low electricity demand. The compressed-air enhanced combustion turbine runs a generator at times of peak demand. Two such systems have been built, and others proposed, that use underground caverns to store the compressed air.

Patents have been issued for improved versions of this energy storage scheme that apply a saturator upstream of the combustion turbine to warm and humidify the incoming air, thereby improving the efficiency of the system (e.g., U.S. Pat. No. 5,491,969). Other patents have been issued that mention the possibility of using low-grade heat (such as waste heat from some other process) to warm the air prior to expansion, also improving efficiency (e.g., U.S. Pat. No. 5,537,822).

BRIEF SUMMARY OF THE INVENTION

Embodiments of the present invention relate generally to energy storage systems, and more particularly, relates to energy storage systems that utilize compressed air as the energy storage medium, comprising an air compression/expansion mechanism, a heat exchanger, and one or more air storage tanks.

According to embodiments of the present invention, a compressed-air energy storage system is provided comprising a reversible mechanism to compress and expand air, one or more compressed air storage tanks, a control system, one or more heat exchangers, and, in certain embodiments of the invention, a motor-generator, for example motor-generator 97 in FIG. 1.

The reversible air compressor-expander uses mechanical power to compress air (when it is acting as a compressor) and converts the energy stored in compressed air to mechanical power (when it is acting as an expander). The compressor-expander comprises one or more stages, each stage consisting of pressure vessel (the "pressure cell") partially filled with water or other liquid. In some embodiments, the pressure vessel communicates with one or more cylinder devices to exchange air and liquid with the cylinder chamber(s) thereof. Suitable valving allows air to enter and leave the pressure cell and cylinder device, if present, under electronic control.

The cylinder device referred to above may be constructed in one of several ways. In one specific embodiment, it can have a piston connected to a piston rod, so that mechanical power coming in or out of the cylinder device is transmitted by this piston rod. In another configuration, the cylinder device can contain hydraulic liquid, in which case the liquid is driven by the pressure of the expanding air, transmitting power out of the cylinder device in that way. In such a configuration, the hydraulic liquid can interact with the air directly, or a diaphragm across the diameter of the cylinder device can separate the air from the liquid.

In low-pressure stages, liquid is pumped through an atomizing nozzle into the pressure cell or, in certain embodiments, the cylinder device during the expansion or compression stroke to facilitate heat exchange. The amount of liquid entering the chamber is sufficient to absorb (during compression) or release (during expansion) all the heat associated with the compression or expansion process, allowing those processes to proceed near-isothermally. This liquid is then returned to the pressure cell during the non-power phase of the stroke, where it can exchange heat with the external environment via a conventional heat exchanger. This allows the compression or expansion to occur at high efficiency.

Operation of embodiments according the present invention may be characterized by a magnitude of temperature change of the gas being compressed or expanded. According to one embodiment, during a compression cycle the gas may experience an increase in temperate of 100 degrees Celsius or less, or a temperature increase of 60 degrees Celsius or less. In some embodiments, during an expansion cycle, the gas may experience a decrease in temperature of 100 degrees Celsius or less, 15 degrees Celsius or less, or 11 degrees Celsius or less—nearing the freezing point of water from an initial point of room temperature.

Instead of injecting liquid via a nozzle, as described above, air may be bubbled though a quantity of liquid in one or more of the cylinder devices in order to facilitate heat exchange. This approach is preferred at high pressures.

During expansion, the valve timing is controlled electronically so that only so much air as is required to expand by the desired expansion ratio is admitted to the cylinder device. This volume changes as the storage tank depletes, so that the valve timing must be adjusted dynamically.

The volume of the cylinder chambers (if present) and pressure cells increases from the high to low pressure stages. In other specific embodiments of the invention, rather than having cylinder chambers of different volumes, a plurality of cylinder devices is provided with chambers of the same volume are used, their total volume equating to the required larger volume.

During compression, a motor or other source of shaft torque drives the pistons or creates the hydraulic pressure via a pump which compresses the air in the cylinder device. During expansion, the reverse is true. Expanding air drives the piston or hydraulic liquid, sending mechanical power out of the system. This mechanical power can be converted to or from electrical power using a conventional motor-generator.

BRIEF DESCRIPTION OF THE DRAWINGS

FIGS. 12A-C show the configuration of an apparatus during steps of a compression cycle according to an embodiment of the present invention.

FIGS. 13A-C show the configuration of an apparatus during steps of an expansion cycle according to an embodiment of the present invention.

FIGS. 14A-C show the configuration of an apparatus during steps of a compression cycle according to an embodiment of the present invention.

FIGS. 16A-D show the configuration of an apparatus during steps of a compression cycle according to an embodiment of the present invention.

FIGS. 17A-D show the configuration of an apparatus during steps of an expansion cycle according to an embodiment of the present invention.

FIGS. 18A-D show the configuration of an apparatus during steps of a compression cycle according to an embodiment of the present invention.

FIGS. 19A-D show the configuration of an apparatus during steps of an expansion cycle according to an embodiment of the present invention.

Figure 1:
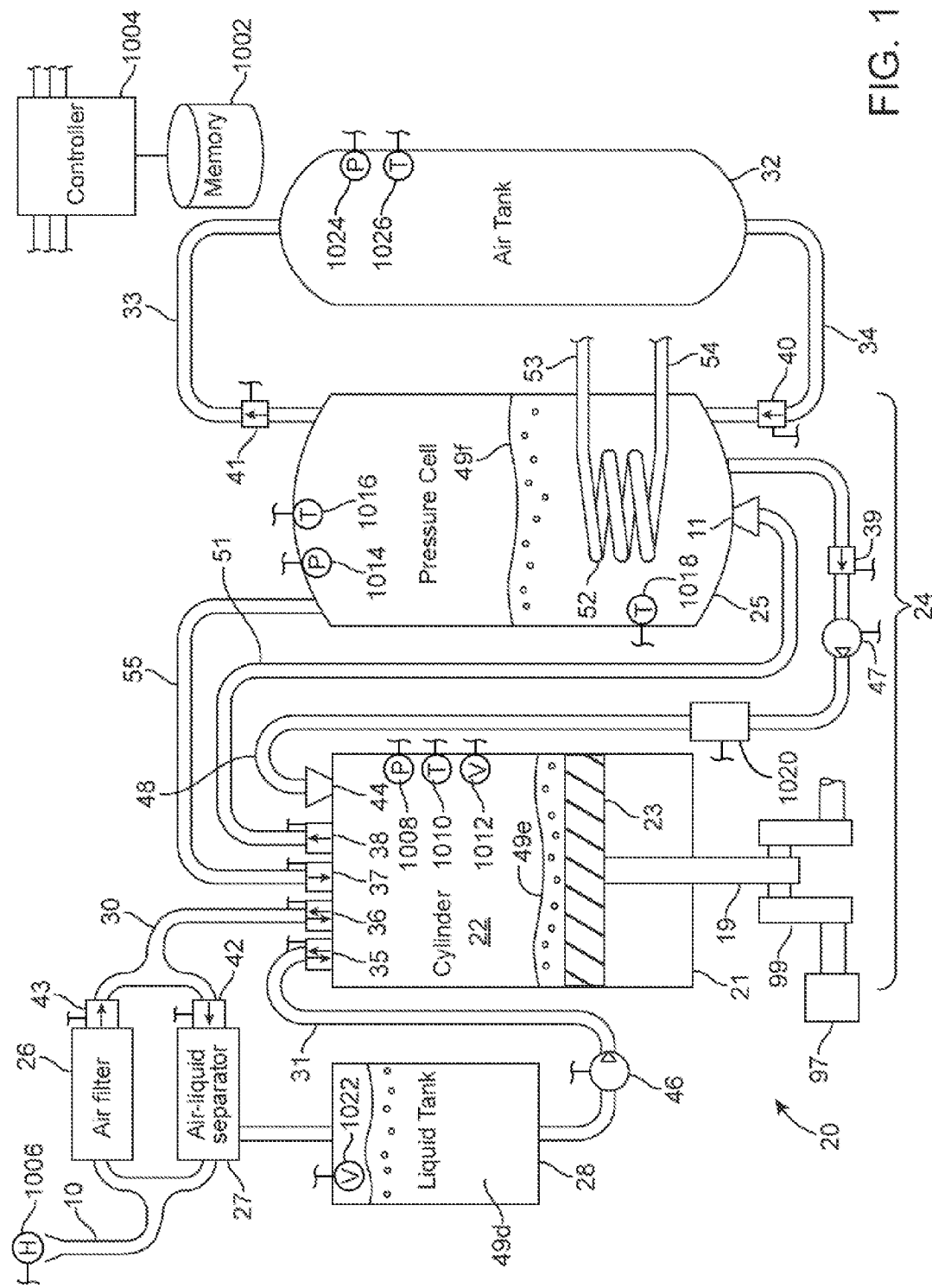
FIG. 1 is a schematic representation of the first embodiment of a compressed air energy storage system in accordance with the present invention, that is a single-stage, single-acting energy storage system using liquid mist to effect heat exchange.

While certain drawings and systems depicted herein may be configured using standard symbols, the drawings have been prepared in a more general manner to reflect the variety of implementations that may be realized from different embodiments.

DETAILED DESCRIPTION OF THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention. It will be noted here that for a better understanding, like components are designated by like reference numerals throughout the various figures.

Single-Stage System

FIG. 1 depicts the simplest embodiment of the compressed air energy storage system 20 of the present invention, and illustrates many of the important principles. Briefly, some of these principles which improve upon current compressed air energy storage system designs include mixing a liquid with the air to facilitate heat exchange during compression and expansion, thereby improving the efficiency of the process, and applying the same mechanism for both compressing and expanding air. Lastly, by controlling the valve timing electronically, the highest possible work output from a given volume of compressed air can be obtained.

As best shown in FIG. 1, the energy storage system 20 includes a cylinder device 21 defining a chamber 22 formed for reciprocating receipt of a piston device 23 or the like therein. The compressed air energy storage system 20 also includes a pressure cell 25 which when taken together with the cylinder device 21, as a unit, form a one stage reversible compression/expansion mechanism (i.e., a one-stage 24). There is an air filter 26, a liquid-air separator 27, and a liquid tank 28, containing a liquid 49d fluidly connected to the compression/expansion mechanism 24 on the low pressure side via pipes 30 and 31, respectively. On the high pressure side, an air storage tank or tanks 32 is connected to the pressure cell 25 via input pipe 33 and output pipe 34. A plurality of two-way, two position valves 35-43 are provided, along with two output nozzles 11 and 44. This particular embodiment also includes liquid pumps 46 and 47. It will be appreciated, however, that if the elevation of the liquid tank 28 is higher than that of the cylinder device 21, water will feed into the cylinder device by gravity, eliminating the need for pump 46.

Figure 8:
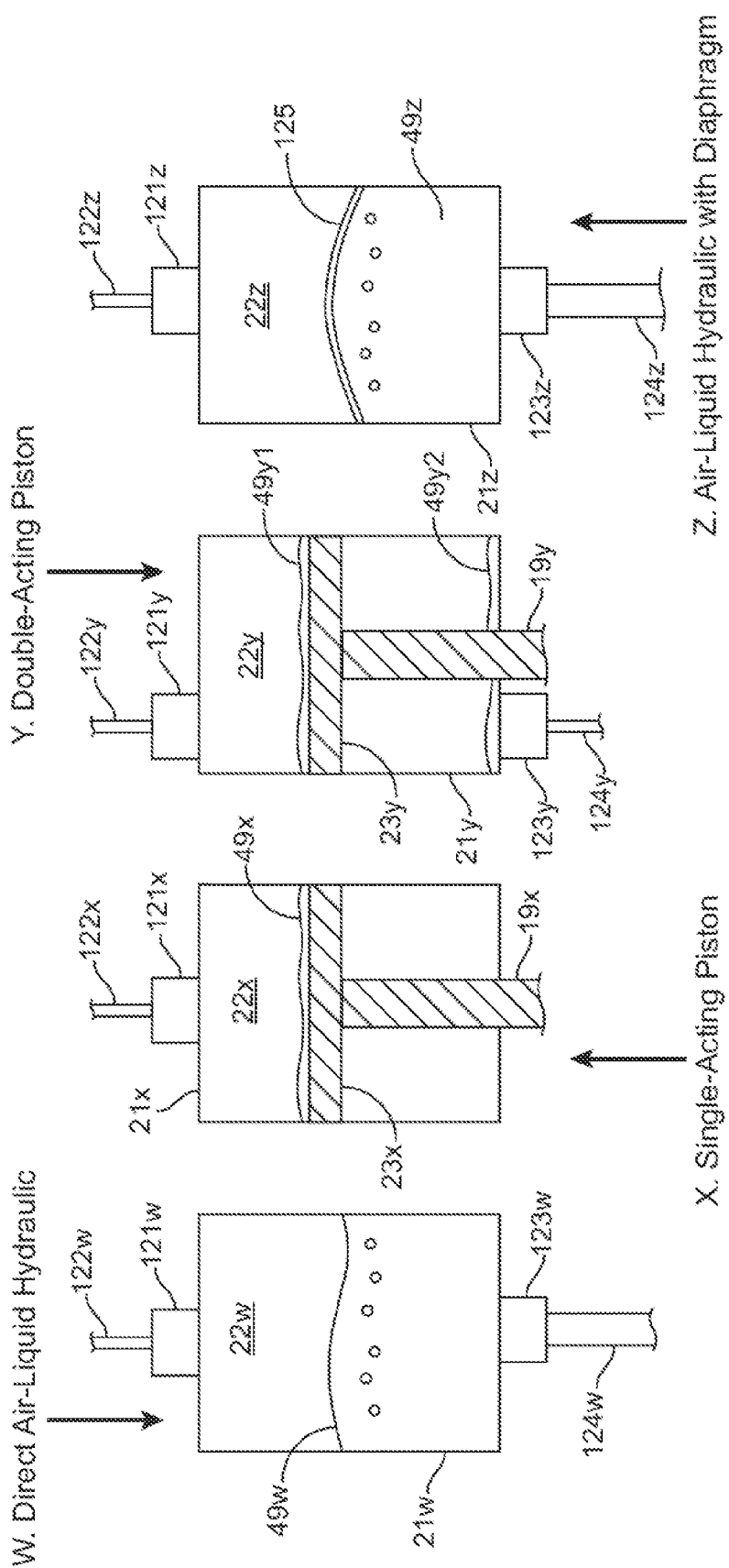
FIG. 8 is a schematic representation of four methods for conveying power into or out of the system.

Briefly, atmospheric air enters the system via pipe 10, passes through the filter 26 and enters the cylinder chamber 22 of cylinder device 21, via pipe 30, where it is compressed by the action of piston 23, by hydraulic pressure, or by other mechanical approaches (see FIG. 8). Before compression begins, a liquid mist is introduced into the chamber 22 of the cylinder device 21 using an atomizing nozzle 44, via pipe 48 from the pressure cell 25. This liquid may be water, oil, or any appropriate liquid 49f from the pressure cell having sufficient high heat capacity properties. The system preferably operates at substantially ambient temperature, so that liquids capable of withstanding high temperatures are not required. The primary function of the liquid mist is to absorb the heat generated during compression of the air in the cylinder chamber. The predetermined quantity of mist injected into the chamber during each compression stroke, thus, is that required to absorb all the heat generated during that stroke. As the mist condenses, it collects as a body of liquid 49e in the cylinder chamber 22.

The compressed air/liquid mixture is then transferred into the pressure cell 25 through outlet nozzle 11, via pipe 51. In the pressure cell 25, the transferred mixture exchanges the captured heat generated by compression to a body of liquid 49f contained in the cell. The air bubbles up through the liquid and on to the top of the pressure cell, and then proceeds to the air storage tank 32, via pipe 33.

The expansion cycle is essentially the reverse process of the compression cycle. Air leaves the air storage tank 32, via pipe 34, bubbling up through the liquid 49f in the pressure cell 25, enters the chamber 22 of cylinder device 21, via pipe 55, where it drives piston 23 or other mechanical linkage. Once again, liquid mist is introduced into the cylinder chamber 22, via outlet nozzle 44 and pipe 48, during expansion to keep a substantially constant temperature in the cylinder chamber during the expansion process. When the air expansion is complete, the spent air and mist pass through an air-liquid separator 27 so that the separated liquid can be reused. Finally, the air is exhausted to the atmosphere via pipe 10.

The liquid 49f contained in the pressure cell 25 is continually circulated through the heat exchanger 52 to remove the heat generated during compression or to add the heat to the chamber to be absorbed during expansion. This circulating liquid in turn exchanges heat with a thermal reservoir external to the system (e.g. the atmosphere, a pond, etc.) via a conventional air or water-cooled heat exchanger (not shown in this figure, but shown as 12 in FIG. 3). The circulating liquid is conveyed to and from that external heat exchanger via pipes 53 and 54 communicating with internal heat exchanger 52.

The apparatus of FIG. 1 further includes a controller/processor 1004 in electronic communication with a computer-readable storage device 1002, which may be of any design, including but not limited to those based on semiconductor principles, or magnetic or optical storage principles. Controller 1004 is shown as being in electronic communication with a universe of active elements in the system, including but not limited to valves, pumps, chambers, nozzles, and sensors. Specific examples of sensors utilized by the system include but are not limited to pressure sensors (P) 1008, 1014, and 1024, temperature sensors (T) 1010, 1018, 1016, and 1026, humidity sensor (H) 1006, volume sensors (V) 1012 and 1022, and flow rate sensor 1020.

As described in detail below, based upon input received from one or more system elements, and also possibly values calculated from those inputs, controller/processor 4 may dynamically control operation of the system to achieve one or more objectives, including but not limited to maximized or controlled efficiency of conversion of stored energy into useful work; maximized, minimized, or controlled power output; an expected power output; an expected output speed of a rotating shaft in communication with the piston; an expected output torque of a rotating shaft in communication with the piston; an expected input speed of a rotating shaft in communication with the piston; an expected input torque of a rotating shaft in communication with the piston; a maximum output speed of a rotating shaft in communication with the piston; a maximum output torque of a rotating shaft in communication with the piston; a minimum output speed of a rotating shaft in communication with the piston; a minimum output torque of a rotating shaft in communication with the piston; a maximum input speed of a rotating shaft in communication with the piston; a maximum input torque of a rotating shaft in communication with the piston; a minimum input speed of a rotating shaft in communication with the piston; a minimum input torque of a rotating shaft in communication with the piston; or a maximum expected temperature difference of air at each stage.

The compression cycle for this single-stage system proceeds as follows:

| | Step 1 | Step 2 | Step 3 | Step 4 | Step 5 |
|---|---|---|---|---|---|
| | Description | | | | |
| | Add liquid to cylinder device | Add mist to cylinder device | Compress | Move compressed air to pressure cell | Refill cylinder device |
| Valve 35 | Open | Closed | Closed | Closed | Closed |
| Valve 36 | Open | Closed | Closed | Closed | Open |
| Valve 37 | Closed | Closed | Closed | Closed | Closed |
| Valve 38 | Closed | Closed | Closed | Open | Closed |
| Valve 39 | Closed | Open | Closed | Closed | Closed |
| Valve 40 | Closed | Closed | Closed | Closed | Closed |
| Valve 41 | Closed | Closed | Closed | Open | Closed |
| Valve 42 | Open | Closed | Closed | Closed | Closed |
| Valve 43 | Closed | Closed | Closed | Closed | Open |
| Pump 46 | On | Off | Off | Off | Off |
| Pump 47 | Off | On | Off | Off | Off |
| Piston 23 | Near bottom dead center (BDC) | Near BDC | At BDC at start of step | Between BDC and TDC | At TDC at start of step |

During step 1 of the compression cycle, liquid 49d is added to the chamber 22 of the cylinder device 21 from the liquid tank 28 (collecting as body of liquid 49e) such that, when the piston 23 reaches top dead center (TDC), the dead volume in the cylinder device is zero. This will only have to be done occasionally, so that this step is omitted on the great majority of cycles.

During step 2 of the compression cycle, liquid mist from pressure cell 25 is pumped, via pump 47, into the cylinder chamber 22, via pipe 48 and nozzle 44. The selected quantity of mist is sufficient to absorb the heat generated during the compression step (step 3). The volume fraction of liquid must sufficiently low enough that the droplets will not substantially fuse together, thus reducing the effective surface area available for heat exchange (that is, the interface between air and liquid). Typically, the pressure differential between the pressure cell 25 and the chamber 22 of the cylinder device 21 is sufficiently high so that the operation of pump 47 is not required.

During step 3 of the compression cycle, the piston 23 is driven upward by a crankshaft 99 coupled to a piston rod 19, by hydraulic pressure, or by some other mechanical structure (as shown in FIG. 8), compressing the air and mist contained in the cylinder chamber.

Step 4 of the compression cycle begins when the air pressure inside the cylinder chamber 22 is substantially equal to the pressure inside the pressure cell 25, at which point outlet valve 38 opens, allowing compressed air to flow from the cylinder chamber to the pressure cell. Because of the liquid added to the cylinder device during step 1 of the compression cycle, substantially all the air in the cylinder chamber can be pushed out during this step. The compressed air is introduced into the pressure cell 25 through an inlet nozzle 11, along with any entrained mist, creating fine bubbles so that the heat generated during compression will exchange with the liquid 49f in the cell rapidly.

During step 5 of the compression cycle, the piston 23 is pulled down allowing low-pressure air to refill it, via valve 36 and pipe 30. The above table shows valve 39 as being closed during this step, and shows pump 47 as being off during this step 5. However, this is not required. In other embodiments valve 39 could be open and pump 47 could be on, during the step 5 such that mist is introduced into the cylinder chamber as it is refilled with air.

The expansion cycle for this single-stage system proceeds as follows:

| | Step | | | |
|---|---|---|---|---|
| | 1 | 2 | 3 | 4 |
| | | Description | | |
| | Add liquid to cylinder device | Add compressed air and liquid mist to cylinder device | Expansion | Exhaust spent air |
| Valve 35 | Open | Closed | Closed | Closed |
| Valve 36 | Open | Closed | Closed | Open |
| Valve 37 | Closed | Open | Closed | Closed |
| Valve 38 | Closed | Closed | Closed | Closed |
| Valve 39 | Closed | Open | Closed | Closed |
| Valve 40 | Closed | Open | Closed | Closed |
| Valve 41 | Closed | Closed | Closed | Closed |
| Valve 42 | Closed | Closed | Closed | Open |
| Valve 43 | Closed | Closed | Closed | Closed |
| Pump 46 | On | Off | Off | Off |
| Pump 47 | Off | On | Off | Off |
| Piston 23 | Near TDC | At TDC at start of step | Near TDC at start of step | At BDC at start of step |

During step 1 of the expansion cycle, liquid is added to the cylinder chamber from the liquid tank 28 to eliminate dead volume in the system. This will be required only rarely, as mentioned above. Similar to the compression cycle, the pump 46 can be eliminated if the liquid tank 28 is oriented at an elevation higher than that of the chamber of cylinder device 21.

During step 2 of the expansion cycle, a pre-determined amount of air, $V_0$, is added to the chamber of the cylinder device by opening inlet valve 37 for the correct interval, which is dependent on the pressure of the air in the pressure cell and the desired expansion ratio. The $V_0$ required is the total cylinder device volume divided by the desired expansion ratio. For a single stage system, that ratio is less than or equal to the pressure of air in the air storage tank in atmospheres. At the same time air is being introduced into the cylinder chamber 22, liquid mist from the pressure cell is being pumped (via pump 47) through inlet nozzle 44 into the cylinder chamber. If a sufficient pressure differential exists between the pressure cell 25 and the cylinder device 21, pump 47 is not required. Once the pressure inside of the cylinder chamber is sufficiently high, valve 37 is closed. The piston 23 is urged in the direction of BDC beginning with this step, transmitting power out of the system via a crankshaft, hydraulic pressure, or other mechanical structure.

During step 3 of the expansion cycle, the air introduced in step 2 is allowed to expand in the chamber 22. Liquid mist also continues to be pumped into the chamber 22 through nozzle 44. The predetermined total amount of mist introduced is that required to add enough heat to the system to keep the temperature substantially constant during air expansion. The piston 23 is driven to the bottom of the cylinder device during this step.

It will be appreciated that this two-step expansion process (a quantity of air $V_0$ introduced in the first step—step 2—and then allowed to expand in the second step—step 3) allows the system to extract substantially all the energy available in the compressed air.

During step 4 of the expansion cycle, the crankshaft or other mechanical linkage moves the piston 19 back up to top dead-center (TDC), exhausting the spent air and liquid mist from the cylinder device. The power required to drive the piston comes from the momentum of the system and/or from the motion of other out-of-phase pistons. The exhausted air passes through an air-liquid separator, and the liquid that is separated out is returned to the liquid tank 28.

It will be appreciated that in accordance with the present invention, at any given time, energy is either being stored or delivered. The two processes are never carried out simultaneously. As a result, the same mechanism can be used for both compression and expansion, reducing system cost, size and complexity. This is also the situation with all of the other embodiments of the present invention to be described below.

Multi-Stage System

Figure 2:
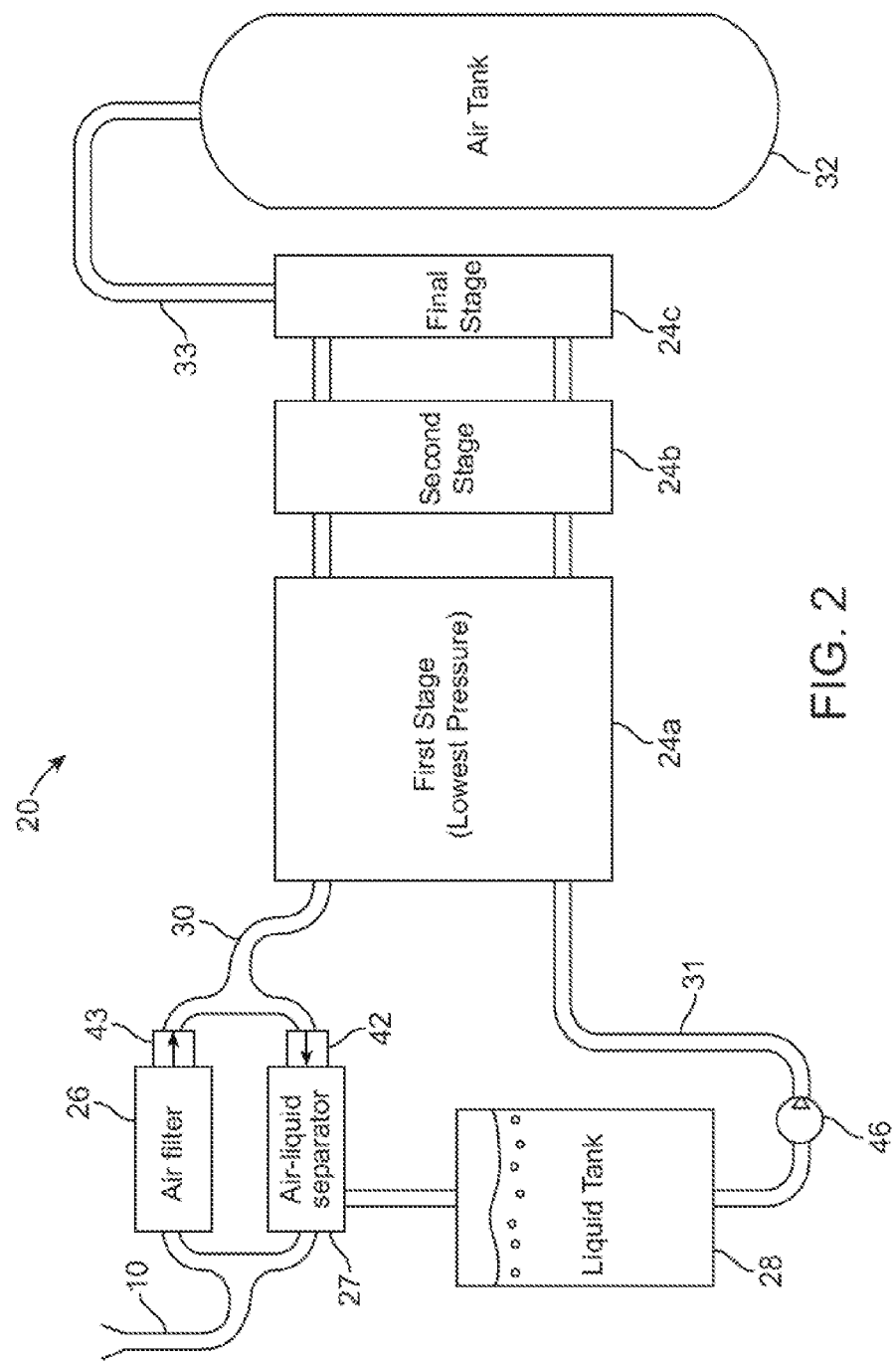
FIG. 2 is a block diagram of a second embodiment of a compressed air energy storage system showing how multiple stages are incorporated into a complete system in accordance with the present invention.

When a larger compression/expansion ratio is required than can be accommodated by the mechanical or hydraulic approach by which mechanical power is conveyed to and from the system, then multiple stages should be utilized. A multi-stage compressed air energy storage system 20 with three stages (i.e., first stage 24a, second stage 24b and third stage 24c) is illustrated in schematic form in FIG. 2. Systems with more or fewer stages are constructed similarly. Note that, in all figures that follow, when the letters a, b, and c are used with a number designation (e.g. 25a), they refer to elements in an individual stage of a multi-stage energy storage system 20.

In accordance with the present invention, each stage may typically have substantially the same expansion ratio. A stage's expansion ratio, $r_1$, is the Nth root of the overall expansion ratio. That is, $$r = \sqrt[N]{R}$$

Where R is the overall expansion ratio and N is the number of stages. It will be appreciated, however, that the different stages can have different expansion ratios, so long as the product of the expansion ratios of all of the stages is R. That is, in a three-stage system, for example:

$$r_1 \times r_2 \times r_3 = R$$

In order for the mass flow rate through each stage to be substantially the, the lower pressure stages will need to have cylinder chambers with greater displacements. In a multi-stage system, the relative displacements of the cylinder chambers are governed by the following equation:

$$V_i = V_f \frac{r^i}{\sum_{j=1}^{N} r^j}$$

Where $V_i$ is the volume of the $i^{th}$ cylinder device, and $V_f$ is the total displacement of the system (that is, the sum of the displacements of all of the cylinder devices).

As an example, suppose that the total displacement of a three-stage system is one liter. If the stroke length of each piston is substantially the same and substantially equal to the bore (diameter) of the final cylinder chamber, then the volumes of the three cylinder chambers are about 19 cm³, 127 cm³, and 854 cm³. The bores are about 1.54 cm, 3.96 cm, and 10.3 cm, with a stroke length of about 10.3 cm for all three. The lowest-pressure cylinder device is the largest and the highest-pressure cylinder device the smallest.

Figure 9:
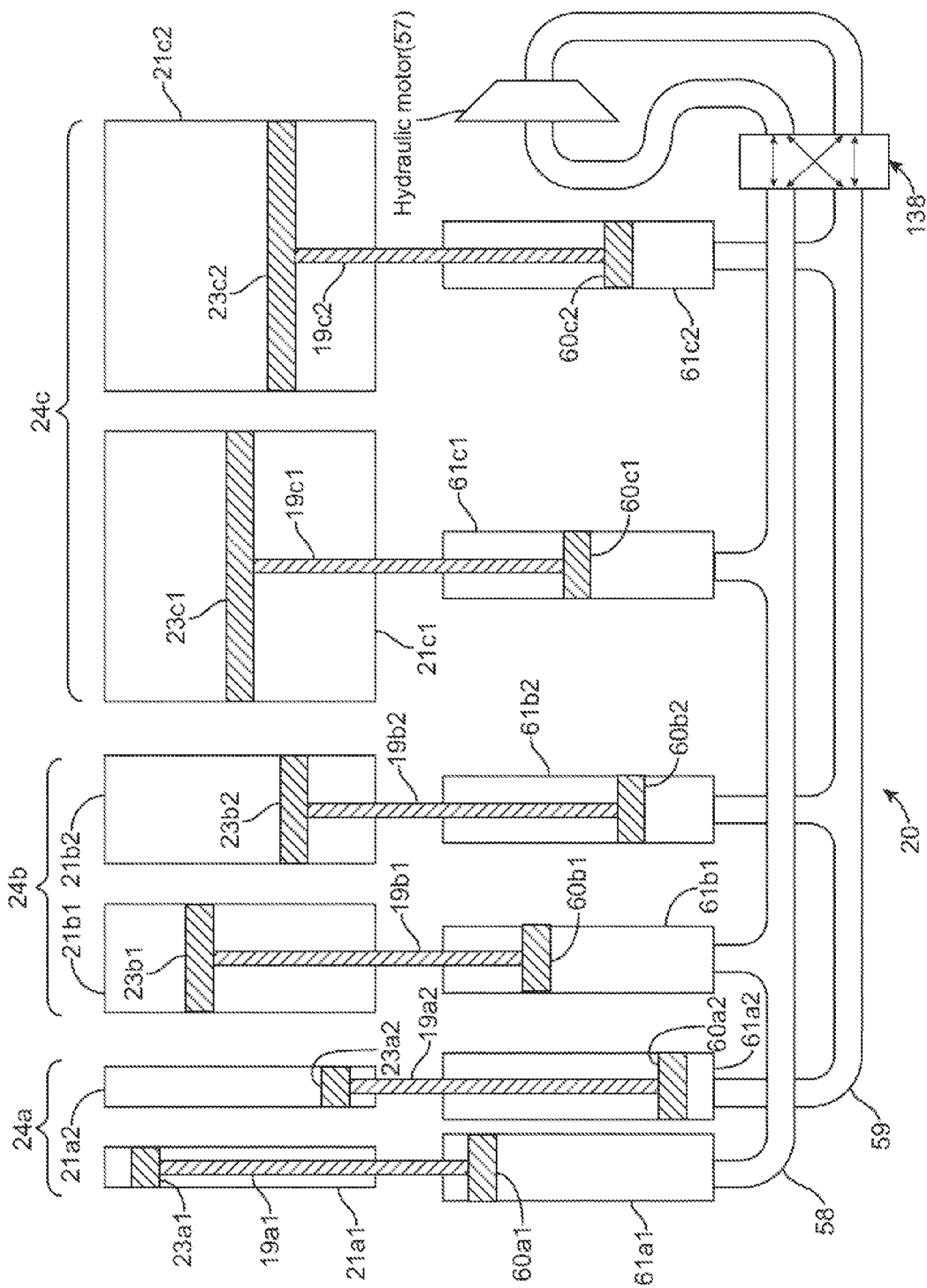
FIG. 9 is a block diagram of a multi-stage compressed air energy system that utilizes a hydraulic motor as its mechanism for conveying and receiving mechanical power.

FIG. 9 is a schematic representation of how three stages 24a, 24b and 24c could be coupled to a hydraulic system (e.g., a hydraulic motor 57 and six hydraulic cylinders 61a1-61c2) to produce continuous near-uniform power output. Each compressed-air-driven piston 23a1-23c2 of each corresponding compressed-air driven cylinder device 21a1-21c2 is coupled via a respective piston rod 19a1-19c2 to a corresponding piston 60a1-60c2 of a respective hydraulic cylinder device 61a1-61c2.

The chambers of the air-driven cylinder devices 21a1-21c2 vary in displacement as described above. The chambers of the hydraulic cylinder devices 61a1-61c2, however, are substantially identical in displacement. Because the force generated by each air-driven piston is substantially the same across the three stages, each hydraulic cylinder device provides substantially the same pressure to the hydraulic motor 57. Note that, in this configuration, the two air-driven pistons 21a1, 21a2 that comprise a given stage (e.g. the first stage 24a) operate 180 degrees out of phase with each other.

Stages Using Liquid Mist to Effect Heat Exchange in a Multi-Stage System

If a stage is single-acting and uses liquid mist to effect heat exchange, it operates according to the scheme described in the section titled Single-Stage System above. Each single-acting stage of a multi-stage system 20 (e.g., the second stage 24b of FIG. 2) is illustrated schematically in FIG. 4. In this configuration, air passes to a cylinder chamber 22b of the second stage 24b illustrated from the pressure cell 25a of the next-lower-pressure stage (e.g., first stage 24a) during compression, and to the pressure cell of the next-lower-pressure stage during expansion, via pipe 92a/90b. Liquid passes to and from the pressure cell 25a of the next-lower-pressure stage via pipe 93a/91b.

In contrast, air passes from pressure cell 25b of the stage illustrated (e.g., the second stage 24b) to the chamber of the cylinder device of the next higher-pressure stage (e.g., the third stage 24c) during compression and from the chamber of the cylinder device of the next higher-pressure stage during expansion via pipe 92b/90c. It will be appreciated that the air compression/expansion mechanism (i.e., second stage 24b) illustrated is precisely the same as the central elements (the cylinder device 21 and the pressure cell 25 of the first stage 24) shown in FIG. 1, with the exception that, in FIG. 4, there is a pipe 93b that conveys liquid from the pressure cell of one stage to the chamber of the cylinder device of the next higher-pressure stage. Pipe 93b is not required for the highest-pressure stage; hence, it doesn't appear in the diagrams, FIGS. 1 and 3, of single-stage configurations.

If the stage illustrated is the lowest-pressure-stage (e.g., first stage 24a in the embodiment of FIG. 2), then line 90a passes air to an air-liquid separator (e.g., separator 27 in FIG. 1) during the expansion cycle and from an air filter (e.g., filter 26 in FIG. 1) during the compression cycle. Similarly, if the stage illustrated is the lowest-pressure stage, then line 91a communicates liquid to and from the liquid tank. If the stage illustrated is the highest-pressure-stage (e.g., the third stage 24c), then air is conveyed to and from the air tank (e.g., air tank 32 in FIG. 1) via pipe 92c.

Single-Acting Stage Utilizing Bubbles to Effect Heat Exchange

Figure 6:
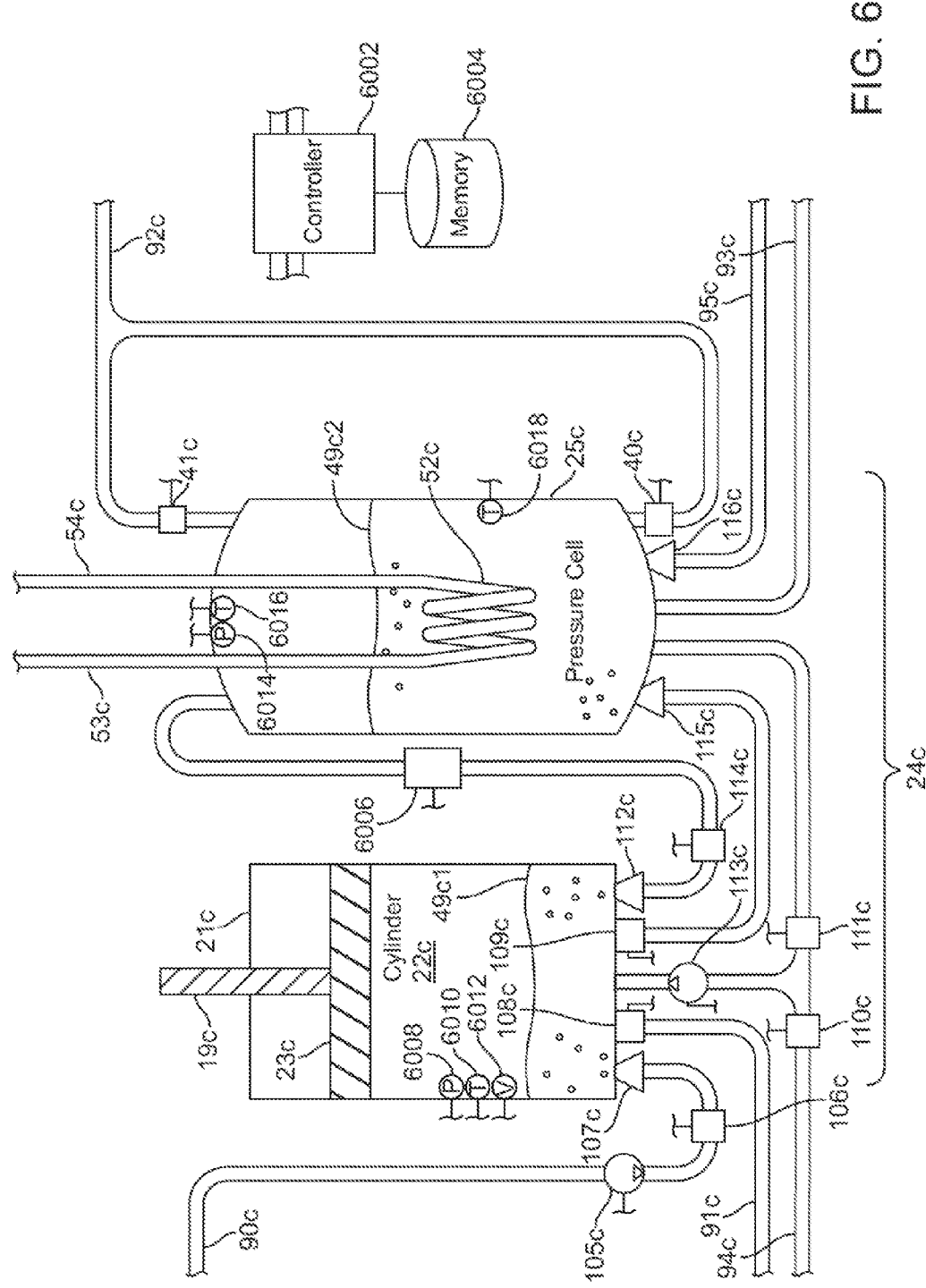
FIG. 6 is a schematic representation of one single-acting stage in a multi-stage compressed air energy storage system, in accordance with the present invention, that uses air bubbling through a body of liquid to effect heat exchange.

Instead of using liquid mist sprayed into the cylinder device or pressure cell in order to cool the air as it compresses or warm it as it expands, one specific embodiment of the present invention utilizes the inverse process. As best illustrated in FIG. 6, that is, the air is bubbled up through a body of liquid 49c1 in the chamber 22c of the cylinder device 21c. This process should be used in preference to the mist approach above discussed when the volume fraction of mist required to effect the necessary heat exchange would be sufficiently high enough to cause a high percentage of the droplets to fuse during the compression cycle. Typically, this occurs at higher pressures. Hence, the use of the designator c in FIG. 6 (e.g. 25c) indicating a third, or high-pressure stage.

As described above in connection with FIG. 1, the apparatus of FIG. 6 further includes a controller/processor 6002 in electronic communication with a computer-readable storage device 6004, which may be of any design, including but not limited to those based on semiconductor principles, or magnetic or optical storage principles. Controller 6002 is shown as being in electronic communication with a universe of active elements in the system, including but not limited to valves, pumps, chambers, nozzles, and sensors. Specific examples of sensors utilized by the system include but are not limited to pressure sensors (P) 6008 and 6014, temperature sensor (T) 6010, 6016, and 6018, and volume sensor (V) 6012.

FIG. 6 illustrates a stage that uses bubbles to facilitate heat exchange. The compression cycle for this single-acting stage system proceeds as follows:

| | Step | | | |
|---|---|---|---|---|
| | 1 | 2 | 3 | 4 |
| | Description | | | |
| | Fill cylinder device with air | Compress | Transfer air to pressure cell | Replenish liquid |
| Valve 108c | Closed | Closed | Closed | Closed |
| Valve 109c | Closed | Closed | Open | Closed |
| Valve 114c | Closed | Closed | Closed | Closed |
| Valve 41c | Closed | Closed | Open | Closed |
| Valve 40c | Closed | Closed | Closed | Closed |
| Valve 106c | Open | Closed | Closed | Closed |
| Valve 110c | Closed | Closed | Closed | Closed |
| Valve 111c | Closed | Closed | Closed | Open |

-continued

| | Step | | | |
|---|---|---|---|---|
| | 1 | 2 | 3 | 4 |
| | | Description | | |
| | Fill cylinder device with air | Compress | Transfer air to pressure cell | Replenish liquid |
| Pump 105c | On | Off | Off | Off |
| Pump 113c | Off | Off | Off | On |
| Piston 23c | At top of liquid at start of step | At TDC at start of step | Near BDC at start of step | At BDC at start of step |

In contrast, the expansion cycle for this single-acting stage system uses the following process:

| | Step | | | |
|---|---|---|---|---|
| | 1 | 2 | 3 | 4 |
| | | Description | | |
| | Replenish liquid in cylinder device | Add compressed air to cylinder device | Expansion | Exhaust spent air |
| Valve 108c | Closed | Closed | Closed | Open |
| Valve 109c | Closed | Closed | Closed | Closed |
| Valve 114c | Closed | Open | Closed | Closed |
| Valve 41c | Closed | Closed | Closed | Closed |
| Valve 40c | Closed | Open | Closed | Closed |
| Valve 106c | Closed | Closed | Closed | Closed |
| Valve 110c | Open | Closed | Closed | Closed |
| Valve 111c | Closed | Closed | Closed | Closed |
| Pump 105c | Off | Off | Off | Off |
| Pump 113c | On | Off | Off | Off |
| Piston 23c | At BDC at start | At top of liquid | Near BDC at start | At TDC at start |

An air-liquid mixture from the chamber 22c of cylinder device 21c in this stage (e.g., third stage 24c) is conveyed to the pressure cell 25b of the next lower-pressure stage (e.g., second stage 24b) during the expansion cycle, via valve 108c and pipe 91c/95b. Air is conveyed to the chamber 22c of cylinder device 21c in this third stage 24c, for example, from the next lower-pressure stage 24b during compression via pipe 92b/90c.

In contrast, air from the pressure cell 25c of this second stage 24c, for instance, is conveyed to and from the cylinder chamber 22d of next higher-pressure stage via pipe 92c/90d together with the operation of in-line valve 41c. Liquid 49c from the pressure cell 25c of this stage is conveyed to the cylinder chamber 22d of the next higher-pressure stage 24d, for example, via pipe 93c/94d. An air-liquid mixture from the cylinder chamber 22d of the next higher-pressure stage (during the expansion cycle thereof) is conveyed to pressure cell 25c of this stage via pipe 91d/95c.

It will be appreciated that, in some multi-stage systems, some (lower-pressure) stages might employ the liquid mist technique while other (higher-pressure) stages may employ the bubbles technique to store and remove energy therefrom.

Multiple Phases

The systems as described so far represent a single phase embodiment. That is, all pistons operate together over the course of one cycle. During expansion, for example, this produces a varying amount of mechanical work output during one half of the cycle and requires some work input during the other half of the cycle. Such work input may be facilitated by the use of a flywheel (not shown).

To smooth out the power output over the course of one cycle and reduce the flywheel requirements, in one embodiment, multiple systems phases may be employed. N sets of pistons thus may be operated 360/N degrees apart. For example, four complete sets of pistons may be operated 90 degrees out of phase, smoothing the output power and effecting self-starting and a preferential direction of operation. Note that valves connecting cylinder devices to a pressure cell are only opened during less than one-half of a cycle, so it is possible to share a pressure cell between two phases 180 degrees apart.

Figure 5:
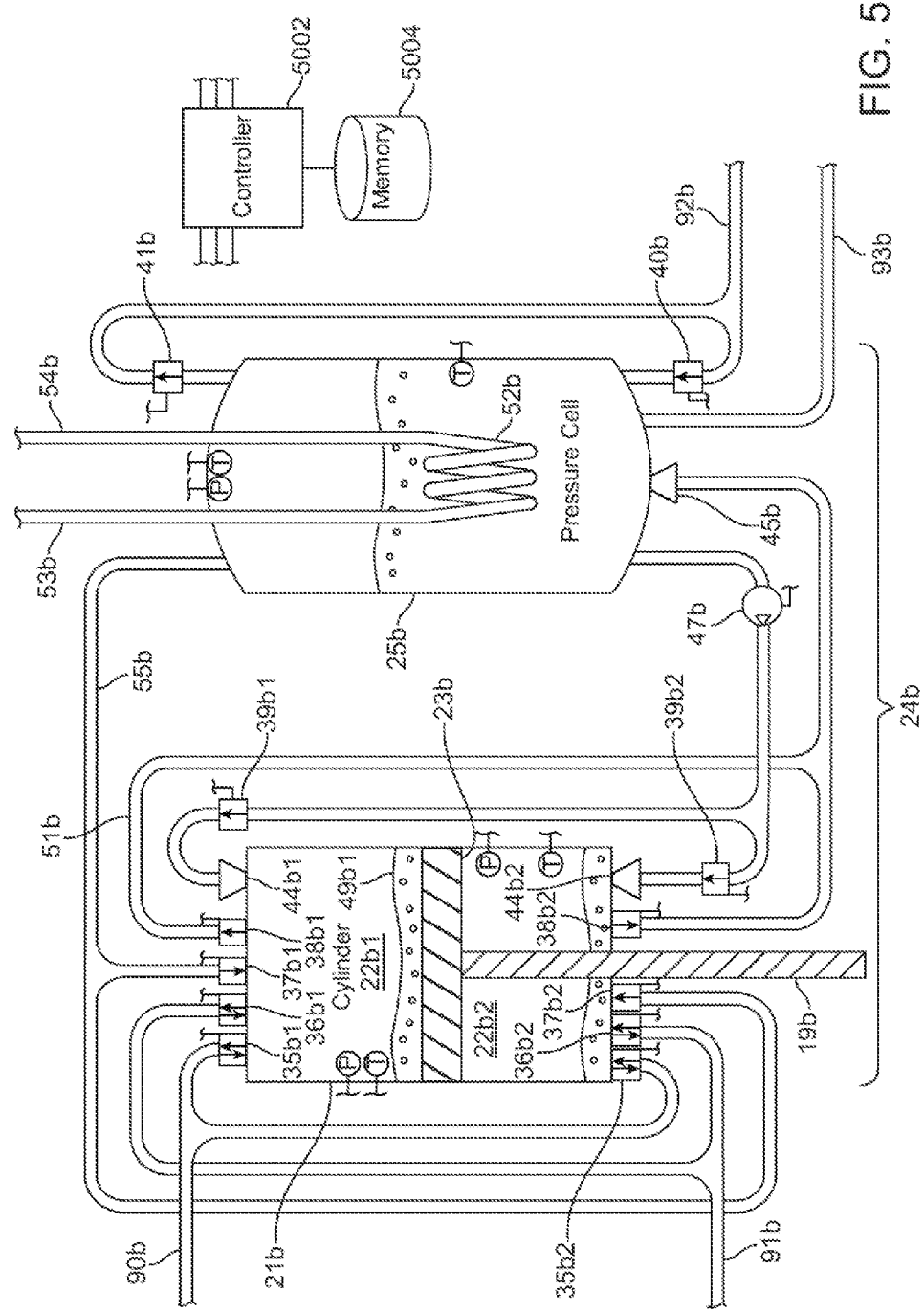
FIG. 5 is a schematic representation of one double-acting stage in a multi-stage compressed air energy storage system in accordance with the present invention.

If N phases are used, and N is even, pairs of phases are 180 degrees apart and may be implemented using double-acting pistons. FIG. 5 illustrates a double-acting stage that uses liquid mist to effect heat exchange. Each half of the piston operates according the protocol outlined in the section Single Stage System, but 180 degrees out of phase.

As described above in connection with FIG. 1, the apparatus of FIG. 5 further includes a controller/processor 5002 in electronic communication with a computer-readable storage device 5004, which may be of any design, including but not limited to those based on semiconductor principles, or magnetic or optical storage principles. Controller 5002 is shown as being in electronic communication with a universe of active elements in the system, including but not limited to valves, pumps, chambers, nozzles, and sensors. Specific examples of sensors utilized by the system include but are not limited to pressure sensors (P), temperature sensors (T), humidity sensor (H), and volume sensors (V).

The compression cycle for the double-acting stage illustrated in FIG. 5 proceeds as follows:

| | Step | | | | |
|---|---|---|---|---|---|
| | 1 | 2 | 3 | 4 | 5 |
| | | | Description | | |
| | Add mist to chamber 22b1 and move air to pressure cell from chamber 22b2 | Compress air in chamber 22b1 and refill chamber 22b2 | Move air to pressure cell from chamber 22b1 and add mist to chamber 22b2 | Refill chamber 22b1 and compress air in chamber 22b2 | Replenish liquids in cylinder device |
| Valve 35b1 | Closed | Closed | Open | Open | Closed |
| Valve 36b1 | Closed | Closed | Closed | Closed | Open |
| Valve 37b1 | Closed | Closed | Closed | Closed | Closed |
| Valve 38b1 | Closed | Closed | Open | Closed | Closed |
| Valve 39b1 | Open | Closed | Closed | Closed | Closed |
| Valve 35b2 | Open | Open | Closed | Closed | Closed |
| Valve 36b2 | Closed | Closed | Closed | Closed | Open |
| Valve 37b2 | Closed | Closed | Closed | Closed | Closed |
| Valve 38b2 | Open | Closed | Closed | Closed | Closed |

|  | Step | | | | |
|---|---|---|---|---|---|
|  | 1 | 2 | 3 | 4 | 5 |
|  |  |  | Description |  |  |
|  | Add mist to chamber 22b1 and move air to pressure cell from chamber 22b2 | Compress air in chamber 22b1 and refill chamber 22b2 | Move air to pressure cell from chamber 22b1 and add mist to chamber 22b2 | Refill chamber 22b1 and compress air in chamber 22b2 | Replenish liquids in cylinder device |
| Valve 39b2 | Closed | Closed | Open | Closed | Closed |
| Valve 40b | Closed | Closed | Closed | Closed | Closed |
| Valve 41b | Open | Closed | Open | Closed | Closed |
| Pump 47b | On | Off | On | Off | Off |
| Piston 23b | Near TDC at start of step | Between TDC and BDC, moving down | Near BDC at start of step | Between TDC and BDC, moving up | Between TDC and BDC |

Note that step 5 is unnecessary, in some specific embodiments, and can be omitted in the great majority of cycles since the liquid levels in the piston remain substantially the same across long periods of operation.

In contrast, the expansion cycle for the double-acting stage illustrated in FIG. 5 proceeds as follows:

|  | Step | | | | |
|---|---|---|---|---|---|
|  | 1 | 2 | 3 | 4 | 5 |
|  |  |  | Description |  |  |
|  | Add mist and air to chamber 22b1 and exhaust air from chamber 22b2 | Allow air in chamber 22b1 to expand and continue exhausting air from chamber 22b2 | Add mist and air to chamber 22b2 and exhaust air from chamber 22b1 | Allow air in chamber 22b2 to expand and continue exhausting air from chamber 22b1 | Replenish liquids in cylinder device |
| Valve 35b1 | Closed | Closed | Open | Open | Closed |
| Valve 36b1 | Closed | Closed | Closed | Closed | Open |
| Valve 37b1 | Open | Closed | Closed | Closed | Closed |
| Valve 38b1 | Closed | Closed | Closed | Closed | Closed |
| Valve 39b1 | Open | Closed | Closed | Closed | Closed |
| Valve 35b2 | Open | Open | Closed | Closed | Closed |
| Valve 36b2 | Closed | Closed | Closed | Closed | Open |
| Valve 37b2 | Closed | Closed | Open | Closed | Closed |
| Valve 38b2 | Closed | Closed | Closed | Closed | Closed |
| Valve 39b2 | Closed | Closed | Open | Closed | Closed |
| Valve 40b | Open | Closed | Open | Closed | Closed |
| Valve 41b | Closed | Closed | Closed | Closed | Closed |
| Pump 47b | On | Off | On | Off | Off |
| Piston 23b | Near TDC at start of step | Between TDC and BDC, moving down | Near BDC at start of step | Between TDC and BDC, moving up | Between TDC and BDC |

Note that, as with compression, step 5 is rarely necessary and can be omitted in the great majority of cycles.

Stages with Multiple Cylinder devices

Figure 7:
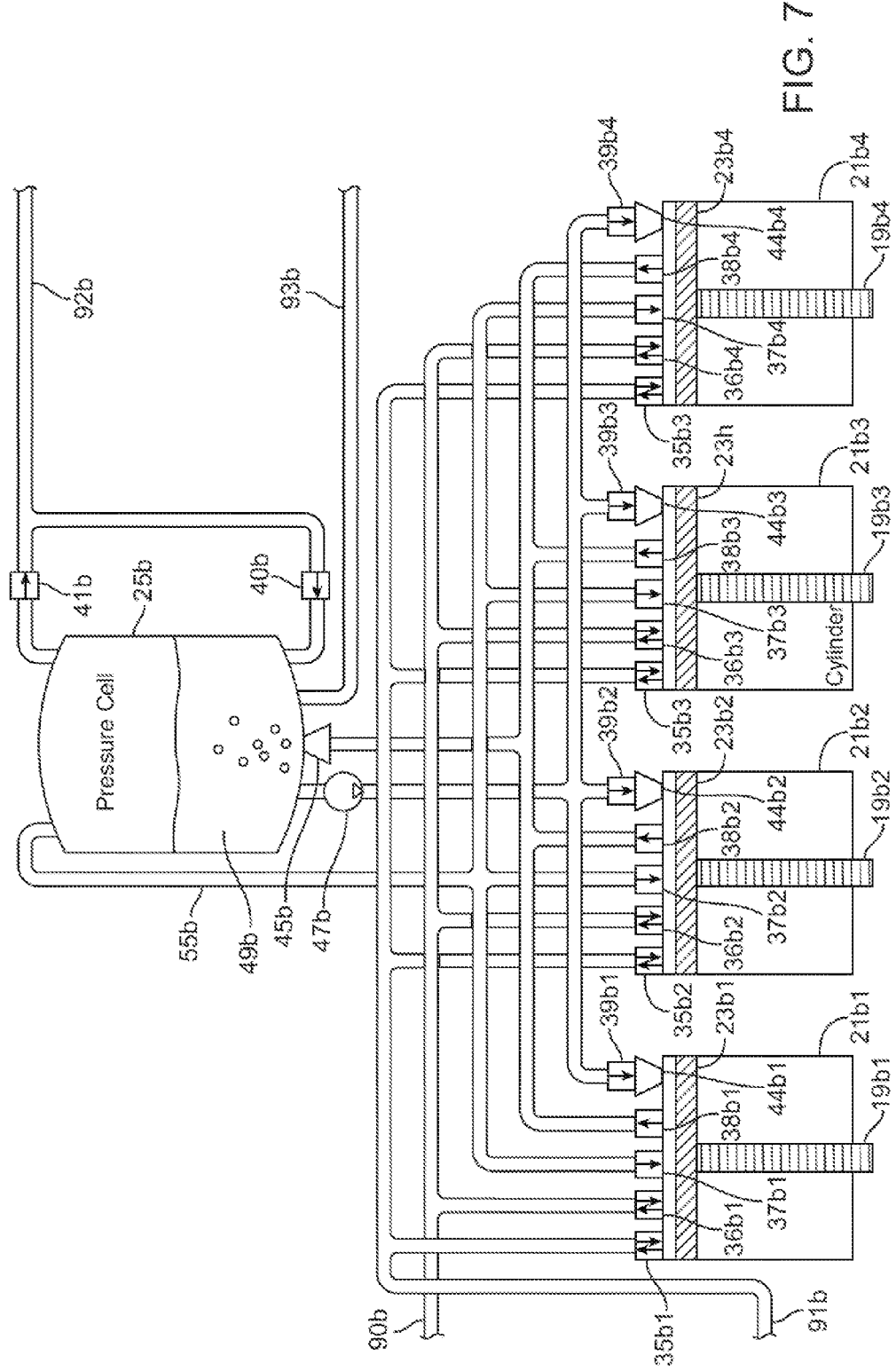
FIG. 7 is a schematic representation of a single-acting stage in a multi-stage compressed air energy storage system, in accordance with the present invention, using multiple cylinder devices.

If it is desirable that all the cylinder devices in a multi-stage system 20 be of substantially similar size, the larger (lower-pressure) cylinder devices may be divided up into two or more smaller cylinder devices communicating in parallel. An example of such a stage is illustrated in FIG. 7, which is an alternative embodiment of the stage of embodiment of FIG. 4. In this configuration, four substantially similar cylinder devices 21b1-21b4 share a single pressure cell 25b containing body of liquid 49b. However, if it is desirable to operate the cylinder devices out of phase with each other so that the system as a whole may convey power more uniformly, separate pressure cells will be required for each cylinder device. As mentioned above, the exception is cylinder devices that are 180 degrees out of phase, which then may share a common pressure cell.

Referring back to the embodiment of FIG. 7, each cylinder device 21b1-21b4 operates according to the scheme used for the mist-type system described in the Single-Stage System section above.

Multi-cylinder device stages may be single or double-acting, and may use either liquid mist or bubbles to effect heat exchange. A multi-stage system may have some stages with a single cylinder device and others with multiple cylinder devices.

Options for Conveying Mechanical Power to and from the System

At least four methods may be applied to convey power to and from a stage in accordance with the present invention. These are described as follows, and illustrated in FIG. 8.

W. A direct-acting hydraulic cylinder device 21w is shown and operates as follows. During the expansion cycle, air entering the chamber 22w of cylinder device 21w, via valve 121w and pipe 122w, urges the hydraulic liquid 49w out through valve 123w. It then flows through pipe 124w. The force thus pneumatically applied against the liquid can be used to operate a hydraulic device (e.g., a hydraulic motor 57, a hydraulic cylinder device or a hydro turbine as shown in FIG. 9) to create mechanical power. During the compression cycle, the reverse process occurs. An external source of mechanical power operates a hydraulic pump or cylinder device, which forces hydraulic liquid 49w into the cylinder chamber 22w, through valve 123w, compressing the air in the chamber. When the air has reached the desired pressure, valve 121w is opened, allowing the compressed air to flow from the cylinder chamber 22w to the next higher-pressure stage or to the air tank.

X. A single-acting piston 23x (also illustrated in FIG. 4) may be connected to a conventional crankshaft via a piston rod 19x. Its operation is described in detail in the section titled Single-Stage System above.

Y. A double-acting piston (also illustrated in FIG. 5), may similarly be connected to a crankshaft via a piston rod 19y. Its operation is described in detail in the section titled Multiple Phases above.

Z. A hydraulic cylinder device 21 with a diaphragm 125 is illustrated such that when air enters the cylinder chamber 22z, via valve 121z, during the expansion cycle, the diaphragm 125 is forced downwardly. Consequently, the hydraulic liquid 49z is urged or driven through valve 123z and through pipe 124z. Similarly, during compression, the hydraulic liquid 49z is driven through valve 123z and into the cylinder chamber 22z, deflecting the diaphragm 125 upwardly, compressing the air in the upper part of the chamber 22z, which then exits via valve 121z.

Note that all four of these options can be used with either the liquid mist technique or the bubbles technique to effect heat transfer. The necessary valves and nozzles to supply the mist or bubbles are not shown on FIG. 8.

Figure 8A:
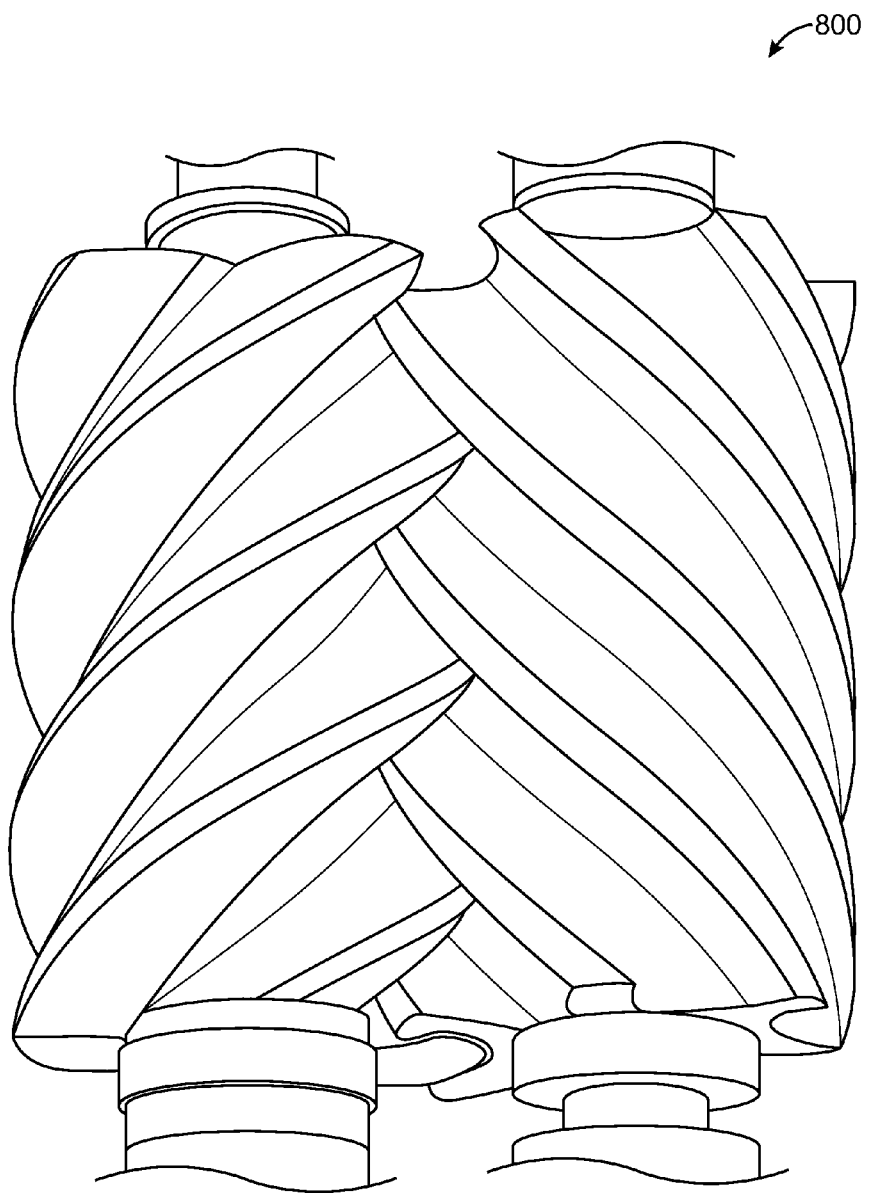
FIG. 8A is a representation of a screw compressor.

While the above examples describe the use of pistons, other types of moveable elements may be utilized and still remain within the scope of the present invention. Examples of alternative types of apparatuses which could be utilized include but are not limited to screw compressors, multi-lobe blowers, vane compressors, gerotors, and quasi-turbines. FIG. 8A is a general representation of a screw compressor 800.

Figure 3:
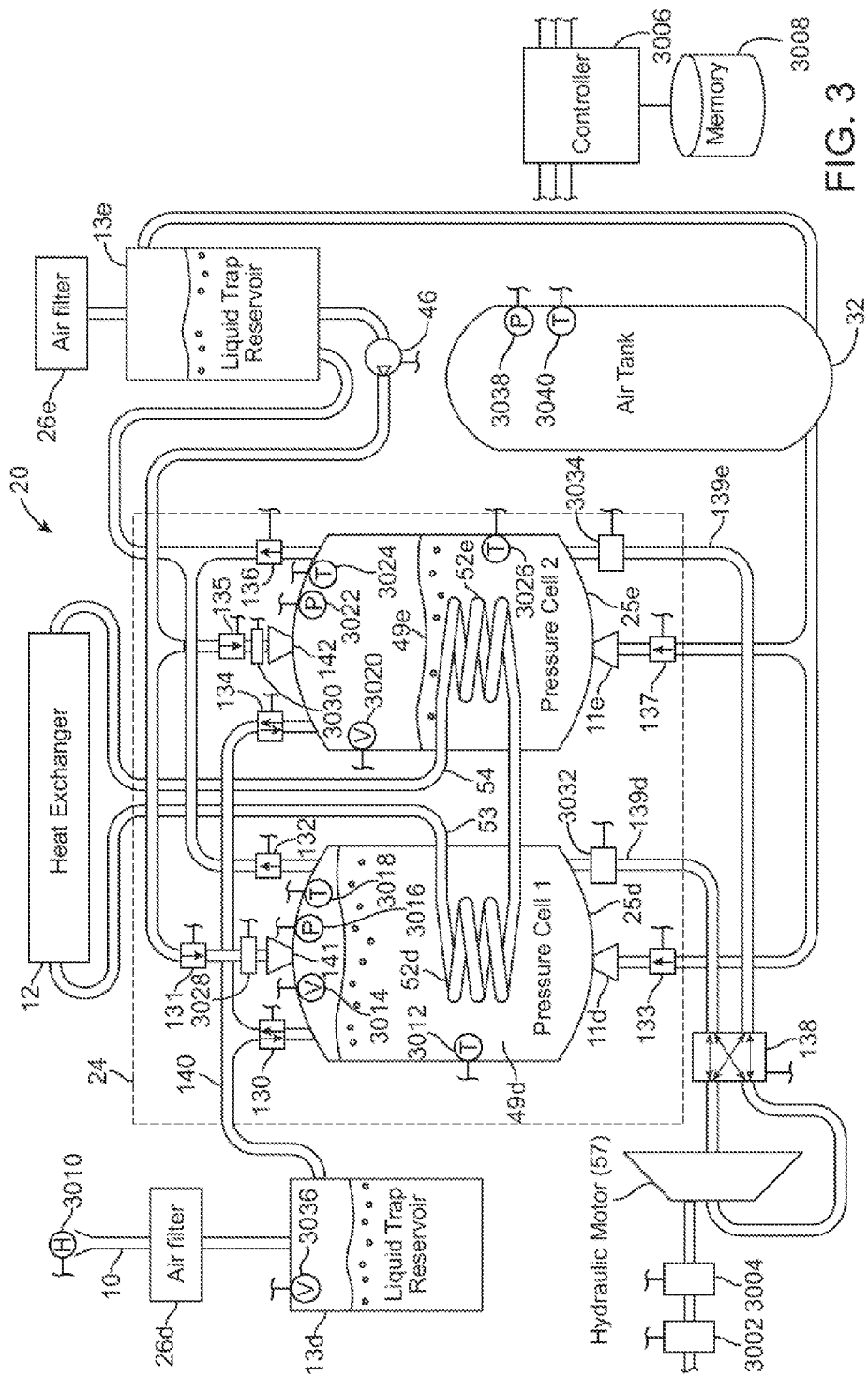
FIG. 3 is a schematic representation of a third embodiment of a compressed air energy storage system, that is a single-stage, single-acting energy storage system that uses both liquid mist and air bubbling through a body of liquid to effect heat exchange.

Single-Stage, Single-Acting Enemy Storage System:

Referring now to the embodiment of FIG. 3, a single-stage, single-acting energy storage system 20 is illustrated that utilizes two pressure cells 25d and 25e configured as direct-acting hydraulic cylinder devices (option A above). The two pressure cells operate substantially 180 degrees out of phase with each other. Liquid mist is used to effect heat exchange during the compression cycle, and both bubbles and mist are used to effect heat exchange during the expansion cycle.

As described above in connection with FIG. 1, the apparatus of FIG. 3 further includes a controller/processor 3006 in electronic communication with a computer-readable storage device 3008, which may be of any design, including but not limited to those based on semiconductor principles, or magnetic or optical storage principles. Controller 3006 is shown as being in electronic communication with a universe of active elements in the system, including but not limited to valves, pumps, chambers, nozzles, and sensors. Specific examples of sensors utilized by the system include but are not limited to pressure sensors (P) 3016, 3022, and 3038, temperature sensors (T) 3018, 3024, and 3040, humidity sensor (H) 3010, and volume sensors (V) 3036, 3014, and 3020.

The compression cycle of the single-stage, single-acting energy storage system 20 proceeds as follows:

| | Step 1 | Step 2 | Step 3 | Step 4 |
| --- | --- | --- | --- | --- |
| Description | Compress air in cell 25d while spraying mist, and replenish the air in cell 25e | Move compressed air from cell 25d to air tank | Compress air in cell 25e while spraying mist, and replenish the air in cell 25d | Move compressed air from cell 25e to air tank |
| Valve 130 | Closed | Closed | Open | Open |
| Valve 131 | Open | Open | Closed | Closed |
| Valve 132 | Closed | Open | Closed | Closed |
| Valve 133 | Closed | Closed | Closed | Closed |
| Valve 134 | Open | Open | Closed | Closed |
| Valve 135 | Closed | Closed | Open | Open |
| Valve 136 | Closed | Closed | Closed | Open |
| Valve 137 | Closed | Closed | Closed | Closed |
| Valve 138 | Pump out to cell 25d, pump in from cell 25e | Pump out to cell 25d, pump in from cell 25e | Pump out to cell 25e, pump in from cell 25d | Pump out to cell 25e, pump in from cell 25d |
| Pump 46 | On | On | On | On |

During step 1, fluid is pumped from pressure cell 25e using the hydraulic pump-motor 57 into pressure cell 25d, thereby compressing the air inside cell 25d. Fluid mist is sprayed through nozzle 141, which absorbs the heat of compression. When the pressure inside cell 25d has reached the pressure of the air tank 32, valve 132 is opened to let the compressed air move to the air tank. As these steps have been progressing, air at atmospheric pressure has entered the system via pipe 10 and air filter 26d and thence into cell 25e to replace the fluid pumped out of it.

When all the air has been driven out of cell 25d, the process reverses, and step 3 commences, with the four-way valve 138 changing state to cause liquid to be pumped out of cell 25d and into cell 25e, causing the air in cell 25e to be compressed. Thus, liquid is pumped back and forth between cells 25d and 25e in a continuous cycle.

The expansion cycle of the single-stage, single-acting energy storage system proceeds as follows:

In step 1, compressed air is bubbled into pressure cell 25d via nozzle 11d. As the bubbles rise, they exchange heat with the body of fluid 49d. Air is forced out of cell 25d, passing through pipe 139d, and then driving hydraulic motor 57, thereby delivering mechanical power In step 2, the valve 133 admitting the compressed air into cell 25d is closed, allowing the air in cell 25d to expand, continuing to operate motor 57. In step 3, once the air admitted in step 1 has risen to the top of cell 25d and can no longer exchange heat with the body of fluid 49d, fluid mist is sprayed into the cell via nozzle 141 to further warm the expanding air.

As fluid passes through the hydraulic motor 57 during steps 1, 2, and 3, it continues through pipe 139e and enters pressure cell 25e, urging the air present in that cell through pipe 140 and into the liquid trap-reservoir 13d, and thence into the atmosphere via air filter 26d and finally pipe 10.

Steps 4, 5, and 6 mirror steps 1, 2, and 3. That is, compressed air is bubbled into pressure cell 25e, forcing fluid through the hydraulic motor 57, and then into pressure cell 25d.

If reservoir 13e is depleted during operation, excess liquid is pumped from the bottom of reservoir 13d into cells 25d and 25e, using a pump, not shown in the figure, connected to pipe 140.

Over time, both liquid traps 13d and 13e will change temperature due to the air and entrained droplets transferring heat—a heat exchanger, as shown by coils 52d and 52e, in pressure cells 25d and 25e, and connected to a conventional external heat exchanger 12 that exchanges heat with the environment, will moderate the temperature to near ambient.

The volume of compressed air bubbled into the cells during steps 1 and 3 depends on the power output desired. If the air can expand fully to one atmosphere without displacing all the liquid in the cell, then the maximum amount of work will be done during the stroke. If the air does not fully expand during the stroke, all else being equal the power output will be higher at the expense of efficiency.

Note that the pressure cells cannot be of insufficient height so that the air bubbles reach the surface of the liquid during the course of the stroke, since almost all heat exchange with the body of liquid occurs while the bubbles are rising through it. However, they must be sufficiently tall for the column of bubbles to completely separate from the fluid by the time the exhaust stroke completes. If the system must be run slowly, some of the bubbles will reach the top before expansion completes. In this event, liquid mist is sprayed through nozzles 141 (in step 3) or 142 (in step 6) of the expansion cycle.

FIG. 3 is meant to illustrate the basic principles. In a system in which a large expansion ratio is desired will require the use of multiple stages 24.

System Configurations

It will be understood that a plurality of energy storage system embodiments, designed in accordance with this invention, are possible. These energy storage system 20 may be single or multi-stage. Stages may be single-cylinder device or multi-cylinder device. Heat exchange may be effected via liquid mist or via bubbles. Power may be conveyed in and out of the system via any of the at least four methods described in the previous section. Each possible configuration has advantages for a specific application or set of design priorities. It would not be practicable to describe every one of these configurations here, but it is intended that the information given should be sufficient for one practiced in the art to configure any of these possible energy storage systems as required.

All of the many possible configurations have three elements in common:

1. Near-isothermal expansion and compression of air, with the required heat exchange effected by a liquid phase in high-surface-area contact with the air.

2. A reversible mechanism capable of both compression and expansion of air.

3. Electronic control of valve timing so as to obtain the highest possible work output from a given volume of compressed air.

Note that all the configurations described herein use and generate power in mechanical form, be it hydraulic pressure or the reciprocating action of a piston. In most applications, however, the requirement will be for the storage of electrical energy. In that case, a generator, along with appropriate power conditioning electronics, must be added to convert the mechanical power supplied by the system during expansion to electrical power. Similarly, the mechanical power required by the system during compression must be supplied by a motor. Since compression and expansion are never done simultaneously, a motor-generator may be used to perform both functions. If the energy storage system utilizes a hydraulic motor or a hydro turbine, then the shaft of that device connects directly or via a gearbox to the motor-generator. If the energy storage system utilizes reciprocating pistons, then a crankshaft or other mechanical linkage that can convert reciprocating motion to shaft torque is required.

Use of Waste Heat During Expansion

In order to operate isothermally, the tendency of air to cool as it expands while doing work (i.e. by pushing a piston or displacing hydraulic liquid) must be counteracted by heat exchange with the ambient air or with a body of water (e.g. a stream or lake). If, however, some other source of heat is available—for example, hot water from a steam condenser—it may be used advantageously during the expansion cycle. In FIG. 1, as described in the Single-Stage System section above, pipes 53 and 54 lead to an external heat exchanger. If those pipes are routed instead to a heat source, the efficiency of the expansion process can be increased dramatically.

Because the system operates substantially at or near ambient temperature, the source of heat need only be a few degrees above ambient in order to be useful in this regard. The heat source must, however, have sufficient thermal mass to supply all the heat required to keep the expansion process at or above ambient temperature throughout the cycle.

Figure 20:
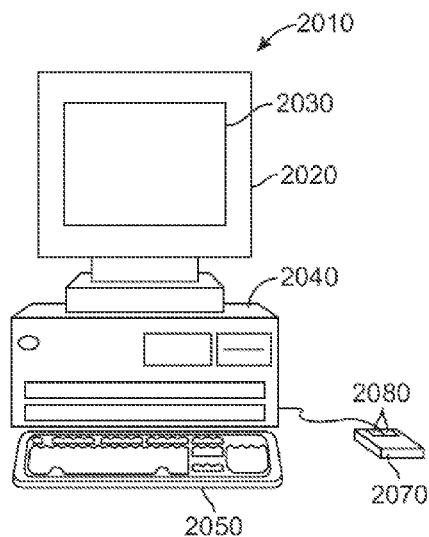
FIG. 20 shows a simplified view of a computer system suitable for use in connection with the methods and systems of the embodiments of the present invention.

As described in detail above, embodiments of systems and methods for storing and recovering energy according to the present invention are particularly suited for implementation in conjunction with a host computer including a processor and a computer-readable storage medium. Such a processor and computer-readable storage medium may be embedded in the apparatus, and/or may be controlled or monitored through external input/output devices. FIG. 20 is a simplified diagram of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 20 shows computer system 2010 including display device 2020, display screen 2030, cabinet 2040, keyboard 2050, and mouse 2070. Mouse 2070 and keyboard 2050 are representative "user input devices." Mouse 2070 includes buttons 2080 for selection of buttons on a graphical user interface device. Other examples of user input devices are a touch screen, light pen, track ball, data glove, microphone, and so forth. FIG. 20 is representative of but one type of system for embodying the present invention. It will be readily apparent to one of ordinary skill in the art that many system types and configurations are suitable for use in conjunction with the present invention. In a preferred embodiment, computer system 2110 includes a Pentium™ class based computer, running Windows™ XP™ or Windows 7™ operating system by Microsoft Corporation. However, the apparatus is easily adapted to other operating systems and architectures by those of ordinary skill in the art without departing from the scope of the present invention.

As noted, mouse 2170 can have one or more buttons such as buttons 2180. Cabinet 2140 houses familiar computer components such as disk drives, a processor, storage device, etc. Storage devices include, but are not limited to, disk drives, magnetic tape, solid-state memory, bubble memory, etc. Cabinet 2140 can include additional hardware such as input/output (I/O) interface cards for connecting computer system 2110 to external devices external storage, other computers or additional peripherals, further described below.

Figure 20A:
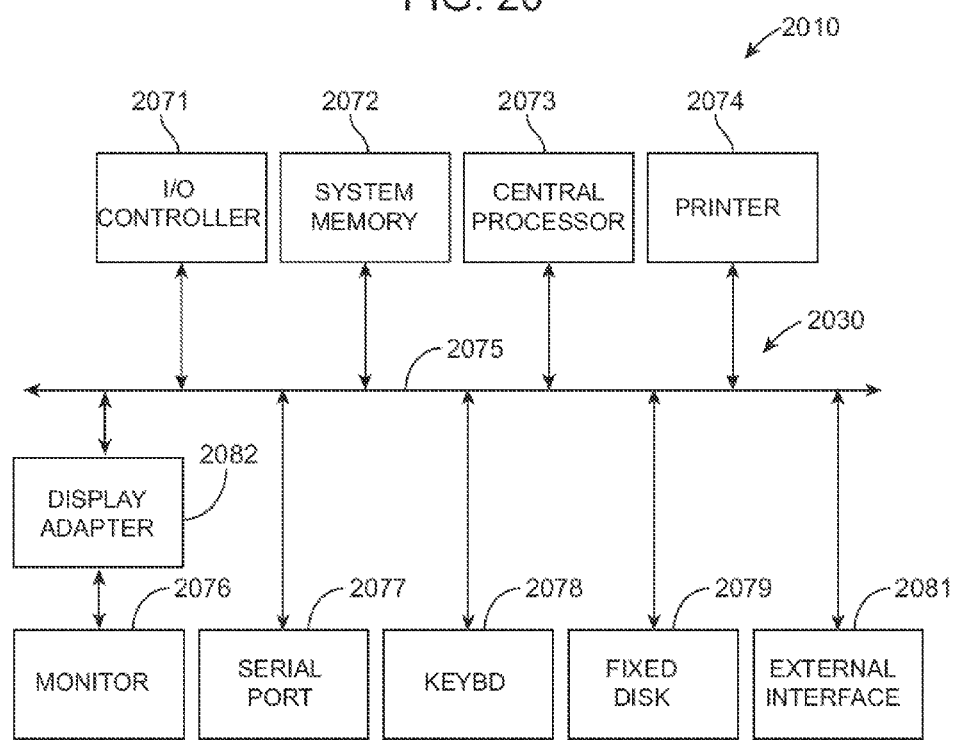
FIG. 20A is an illustration of basic subsystems in the computer system of FIG. 20.

FIG. 20A is an illustration of basic subsystems in computer system 2010 of FIG. 20. This diagram is merely an illustration and should not limit the scope of the claims herein. One of ordinary skill in the art will recognize other variations, modifications, and alternatives. In certain embodiments, the subsystems are interconnected via a system bus 2075. Additional subsystems such as a printer 2074, keyboard 2078, fixed disk 2079, monitor 2076, which is coupled to display adapter 2082, and others are shown. Peripherals and input/output (I/O) devices, which couple to I/O controller 2071, can be connected to the computer system by any number of approaches known in the art, such as serial port 2077. For example, serial port 2077 can be used to connect the computer system to a modem 2081, which in turn connects to a wide area network such as the Internet, a mouse input device, or a scanner. The interconnection via system bus allows central processor 2073 to communicate with each subsystem and to control the execution of instructions from system memory 2072 or the fixed disk 2079, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 21:
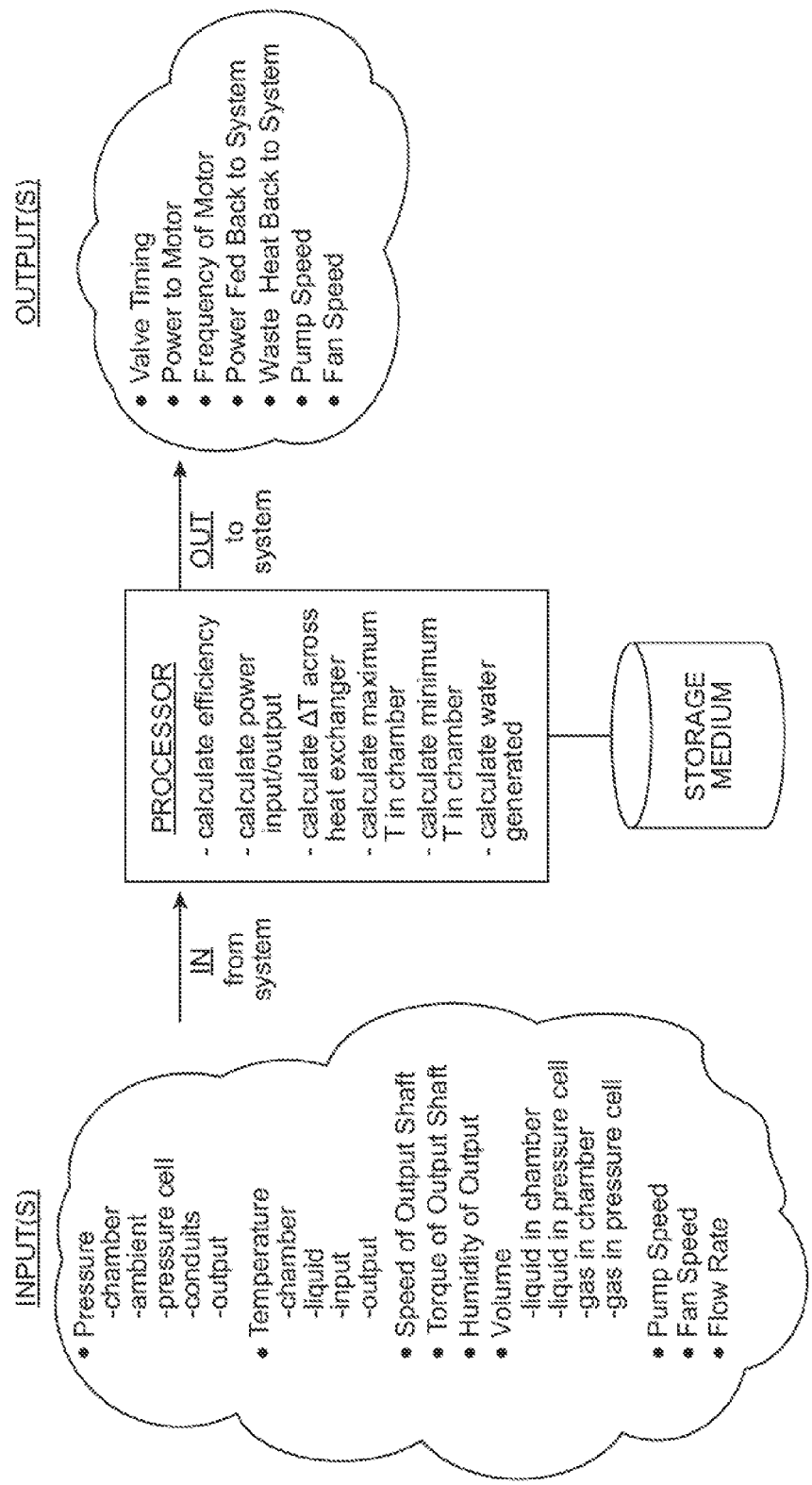
FIG. 21 is an embodiment of a block diagram showing inputs and outputs to a controller responsible for controlling operation of various elements of an apparatus according to the present invention.

FIG. 21 is a schematic diagram showing the relationship between the processor/controller, and the various inputs received, functions performed, and outputs produced by the processor controller. As indicated, the processor may control various operational properties of the apparatus, based upon one or more inputs.

Figure 11A:
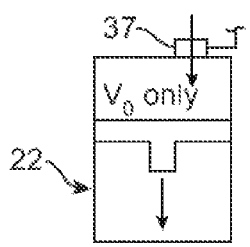
FIGS. 11A-11F show operation of the controller to control the timing of various valves.
Figure 11D:
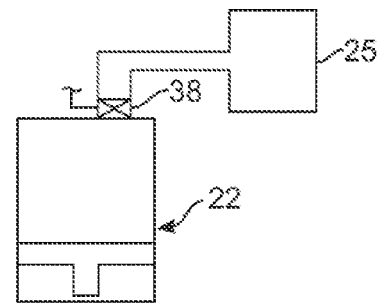
Figure 11B:
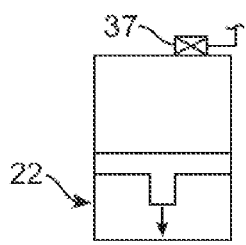
Figure 11E:
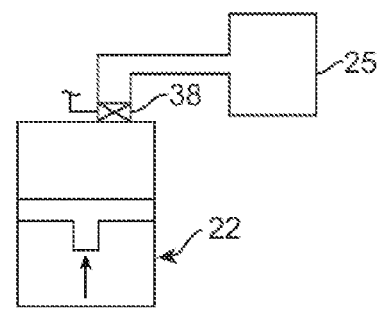
Figure 11C:
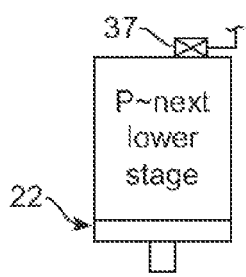

An example of such an operational parameter that may be controlled is the timing of opening and closing of a valve allowing the inlet of air to the cylinder during an expansion cycle. FIGS. 11A-C is a simplified and enlarged view of the cylinder 22 of the single-stage system of FIG. 1, undergoing an expansion cycle as described previously.

Specifically, during step 2 of the expansion cycle, a predetermined amount of air $V_0$, is added to the chamber from the pressure cell, by opening valve 37 for a controlled interval of time. This amount of air $V_0$ is calculated such that when the piston reaches the end of the expansion stroke, a desired pressure within the chamber will be achieved.

In certain cases, this desired pressure will approximately equal that of the next lower pressure stage, or atmospheric pressure if the stage is the lowest pressure stage or is the only stage. Thus at the end of the expansion stroke, the energy in the initial air volume $V_0$ has been fully expended, and little or no energy is wasted in moving that expanded air to the next lower pressure stage.

To achieve this goal, valve 37 is opened only for so long as to allow the desired amount of air ($V_0$) to enter the chamber, and thereafter in steps 3-4 (FIGS. 11B-C), valve 37 is maintained closed. In certain embodiments, the desired pressure within the chamber may be within 1 psi, within 5 psi, within 10 psi, or within 20 psi of the pressure of the next lower stage.

In other embodiments, the controller/processor may control valve 37 to cause it to admit an initial volume of air that is greater than $V_0$. Such instructions may be given, for example, when greater power is desired from a given expansion cycle, at the expense of efficiency of energy recovery.

Timing of opening and closing of valves may also be carefully controlled during compression. For example, as shown in FIGS. 11D-E, in the steps 2 and 3 of the table corresponding to the addition of mist and compression, the valve 38 between the cylinder device and the pressure cell remains closed, and pressure builds up within the cylinder.

In conventional compressor apparatuses, accumulated compressed air is contained within the vessel by a check valve, that is designed to mechanically open in response to a threshold pressure. Such use of the energy of the compressed air to actuate a check valve, detracts from the efficiency of recovery of energy from the air for performing useful work.

Figure 11F:
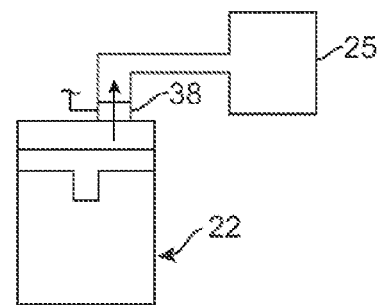

By contrast, as shown in FIG. 11F, embodiments of the present invention may utilize the controller/processor to precisely open valve 38 under the desired conditions, for example where the built-up pressure in the cylinder exceeds the pressure in the pressure cell by a certain amount. In this manner, energy from the compressed air within the cylinder is not consumed by the valve opening process, and efficiency of energy recovery is enhanced. Embodiments of valve types that may be subject to control to allow compressed air to flow out of a cylinder include but are not limited to pilot valves, cam-operated poppet valves, rotary valves, hydraulically actuated valves, and electronically actuated valves.

While the timing of operation of valves 37 and 38 of the single stage apparatus may be controlled as described above, it should be appreciated that valves in other embodiments may be similarly controlled. Examples of such valves include but are not limited to valves 130, 132, 133, 134, 136, and 137 of FIG. 3, valves 37*b* and 38*b* of FIG. 4, valves 37*b*1, 38*b*1, 37*b*2 and 38*b*2 of FIG. 5, valves 106*c* and 114*c* of FIG. 6, and the valves 37*b*1-4 and 38*b*1-4 that are shown in FIG. 7.

Another example of a system parameter that can be controlled by the processor, is the amount of liquid introduced into the chamber. Based upon one or more values such as pressure, humidity, calculated efficiency, and others, an amount of liquid that is introduced into the chamber during compression or expansion, can be carefully controlled to maintain efficiency of operation. For example, where an amount of air greater than $V_0$ is inlet into the chamber during an expansion cycle, additional liquid may need to be introduced in order to maintain the temperature of that expanding air within a desired temperature range.

The present invention is not limited to those particular embodiments described above. Other methods and apparatuses may fall within the scope of the invention. For example, the step of adding liquid to a cylinder device is not required during every cycle. In addition, liquid may be added to the chamber at the same time air is being inlet.

Figure 12B:
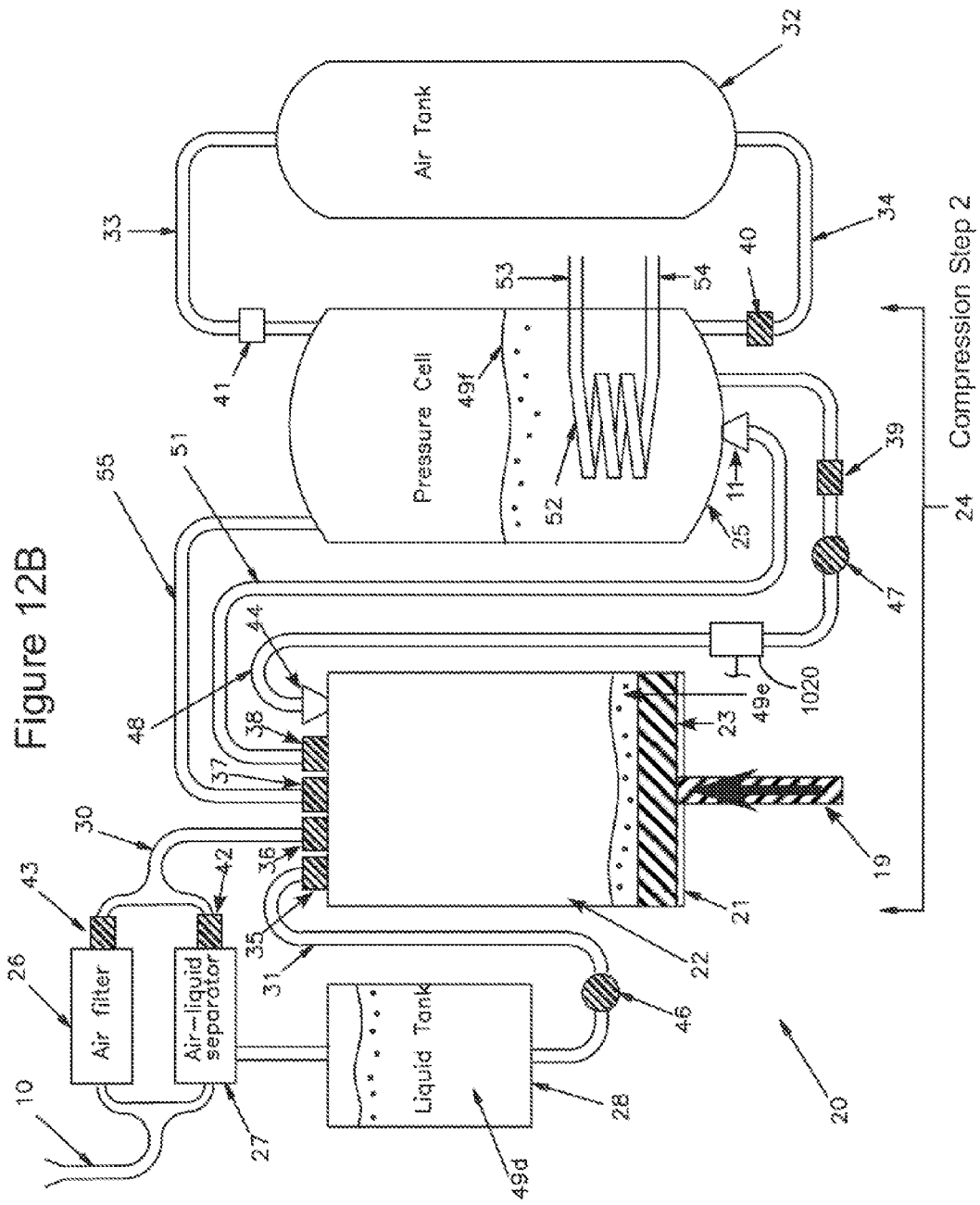
Figure 12C:
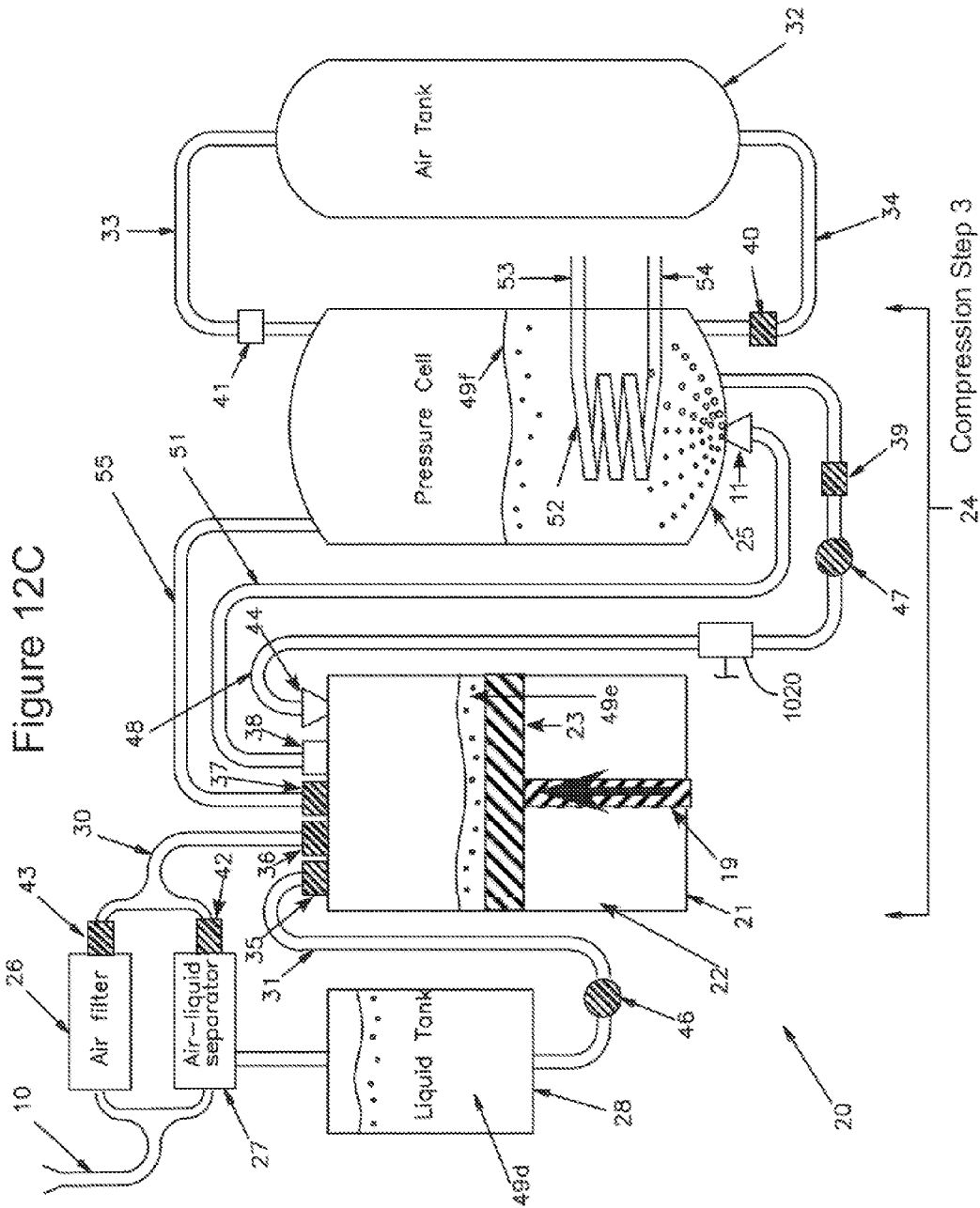

Accordingly, the following table describes steps in an embodiment of a compression cycle for a single-stage system utilizing liquid mist to effect heat exchange, as shown in connection with FIGS. 12A-C, where similar elements as in FIG. 1 are shown:

|  | Step 1 | Step 2 | Step 3 |
|---|---|---|---|
|  | Description | | |
|  | Refill cylinder device | Compress | Move compressed air to pressure cell |
| Valve 35 | Closed | Closed | Closed |
| Valve 36 | Open | Closed | Closed |
| Valve 37 | Closed | Closed | Closed |
| Valve 38 | Closed | Closed | Open |
| Valve 39 | Open | Closed | Closed |
| Valve 40 | Closed | Closed | Closed |
| Valve 41 | Open | Open | Open |
| Valve 42 | Closed | Closed | Closed |
| Valve 43 | Open | Closed | Closed |
| Pump 46 | Off | Off | Off |
| Pump 47 | On | Off | Off |
| Piston 23 | At TDC at start of step | At BDC at start of step | Between BDC and TDC |

Figure 13B:
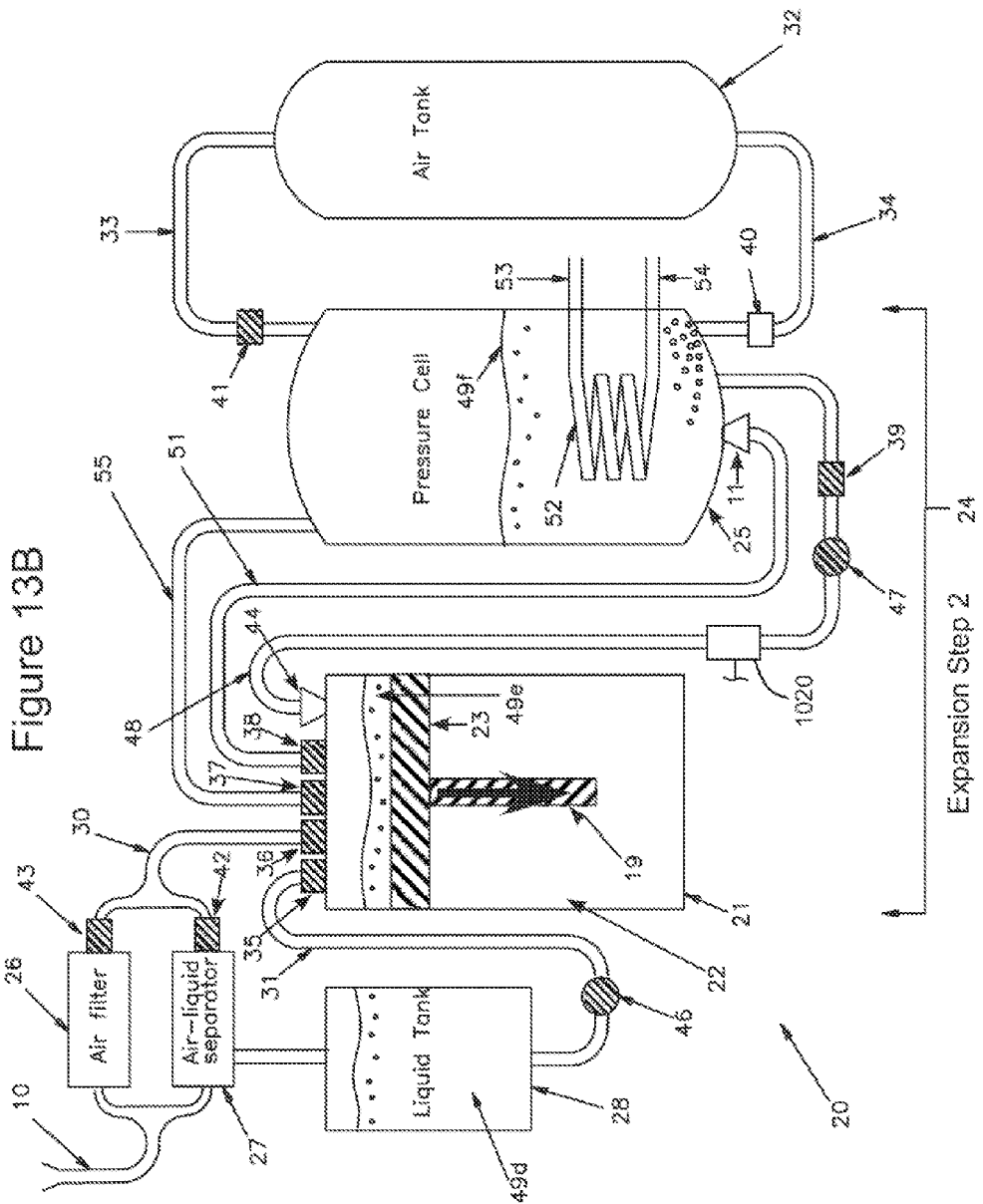
Figure 13C:
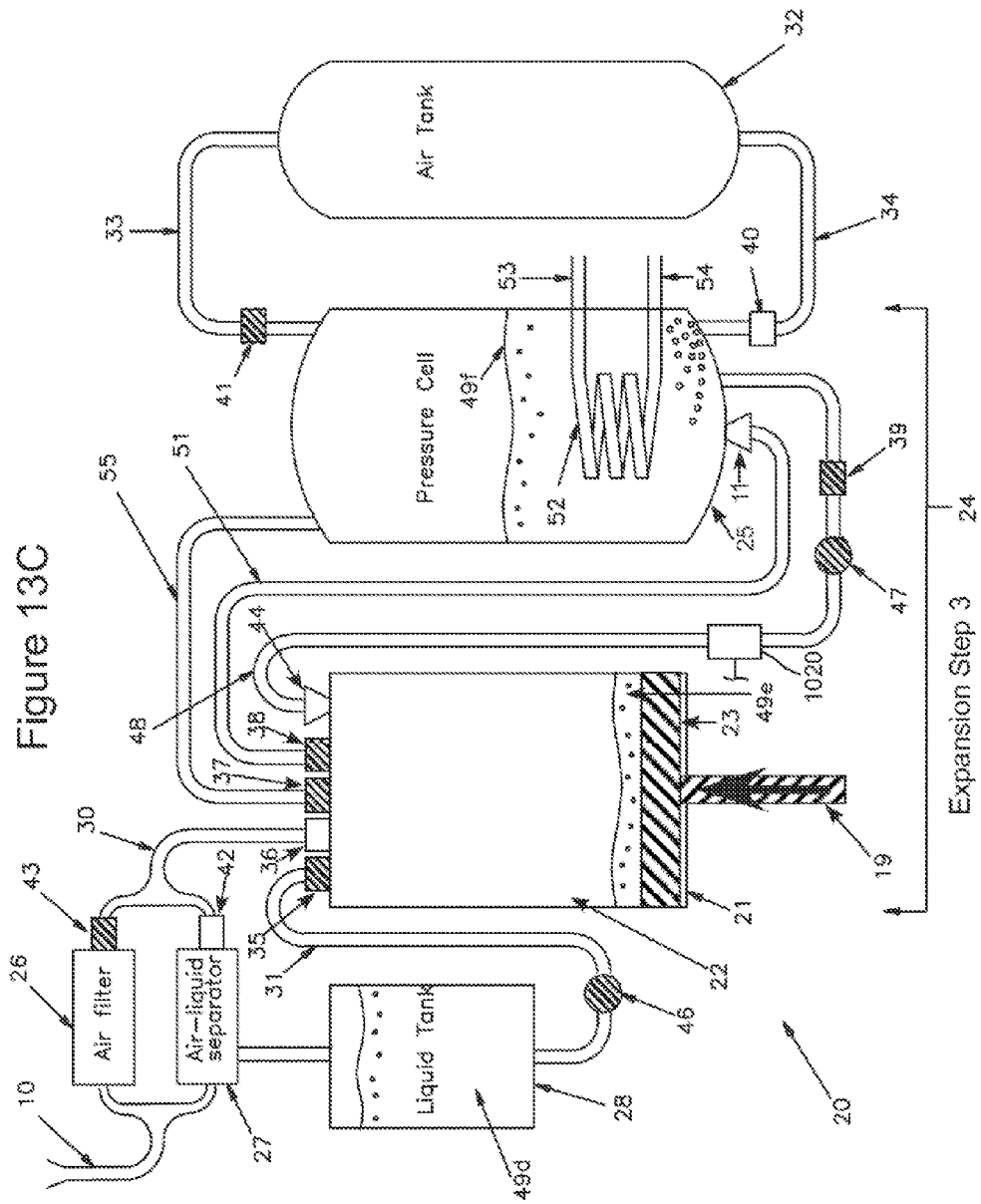

The corresponding expansion cycle where liquid is introduced at the same time as air, is shown in the table below, in connection with FIGS. 13A-C:

|  | Step 1 | Step 2 | Step 3 |
|---|---|---|---|
|  | Description | | |
|  | Add compressed air and liquid mist to cylinder device | Expansion | Exhaust spent air |
| Valve 35 | Closed | Closed | Closed |
| Valve 36 | Closed | Closed | Open |
| Valve 37 | Open | Closed | Closed |
| Valve 38 | Closed | Closed | Closed |
| Valve 39 | Open | Closed | Closed |
| Valve 40 | Open | Open | Open |
| Valve 41 | Closed | Closed | Closed |
| Valve 42 | Closed | Closed | Open |
| Valve 43 | Closed | Closed | Closed |
| Pump 46 | Off | Off | Off |
| Pump 47 | On | Off | Off |
| Piston 23 | At TDC at start of step | Near TDC at start of step | At BDC at start of step |

Figure 14A:
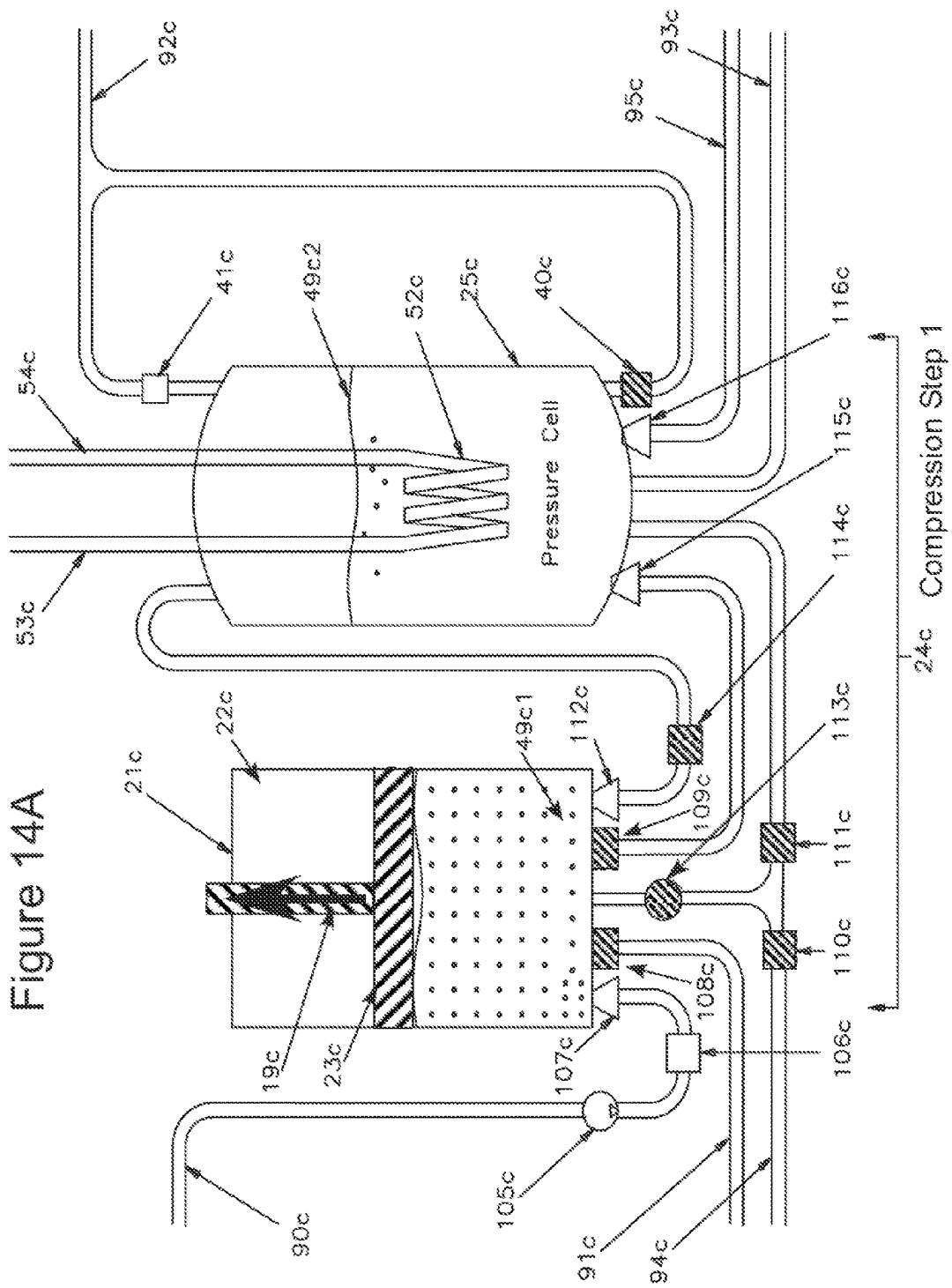
Figure 14C:
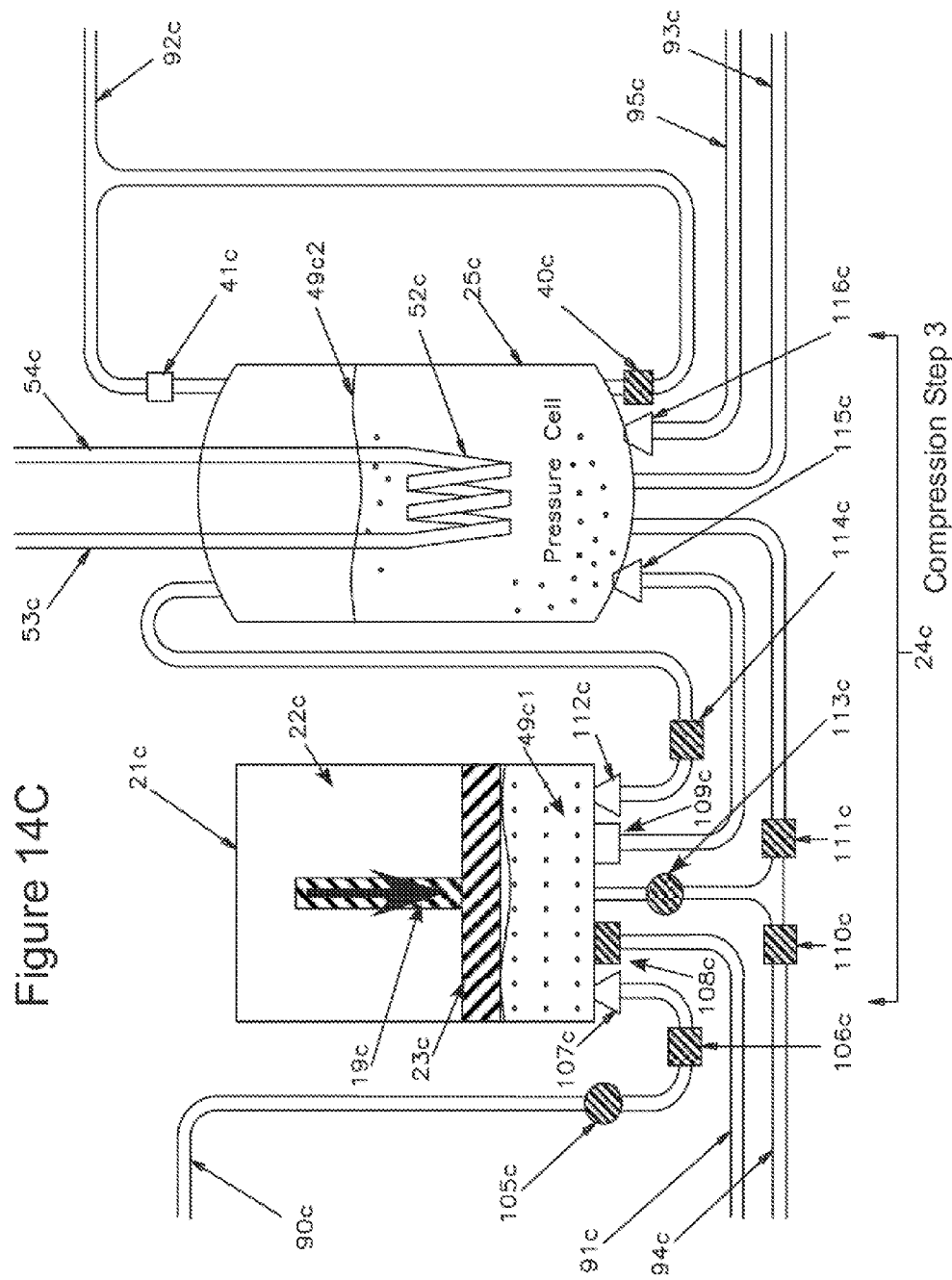

Moreover, where bubbles are utilized to effect heat exchange, the step of replenishing liquid is not required in every cycle. The following table, in conjunction with FIGS. 14A-C, describes steps in an embodiment of a compression cycle for a single-stage system utilizing bubbles to effect heat exchange, where elements similar to those in FIG. 6 are referenced:

|  | Step 1 | Step 2 | Step 3 |
|---|---|---|---|
|  | Description | | |
|  | Fill cylinder device with air | Compress | Transfer air to pressure cell |
| Valve 108c | Closed | Closed | Closed |
| Valve 109c | Closed | Closed | Open |
| Valve 114c | Closed | Closed | Closed |
| Valve 41c | Open | Open | Open |
| Valve 40c | Closed | Closed | Closed |
| Valve 106c | Open | Closed | Closed |
| Valve 110c | Closed | Closed | Closed |
| Valve 111c | Closed | Closed | Closed |
| Pump 105c | On | Off | Off |
| Pump 113c | Off | Off | Off |
| Piston 23c | At top of liquid at start of step | At TDC at start of step | Near BDC at start of step |

Figure 15A:
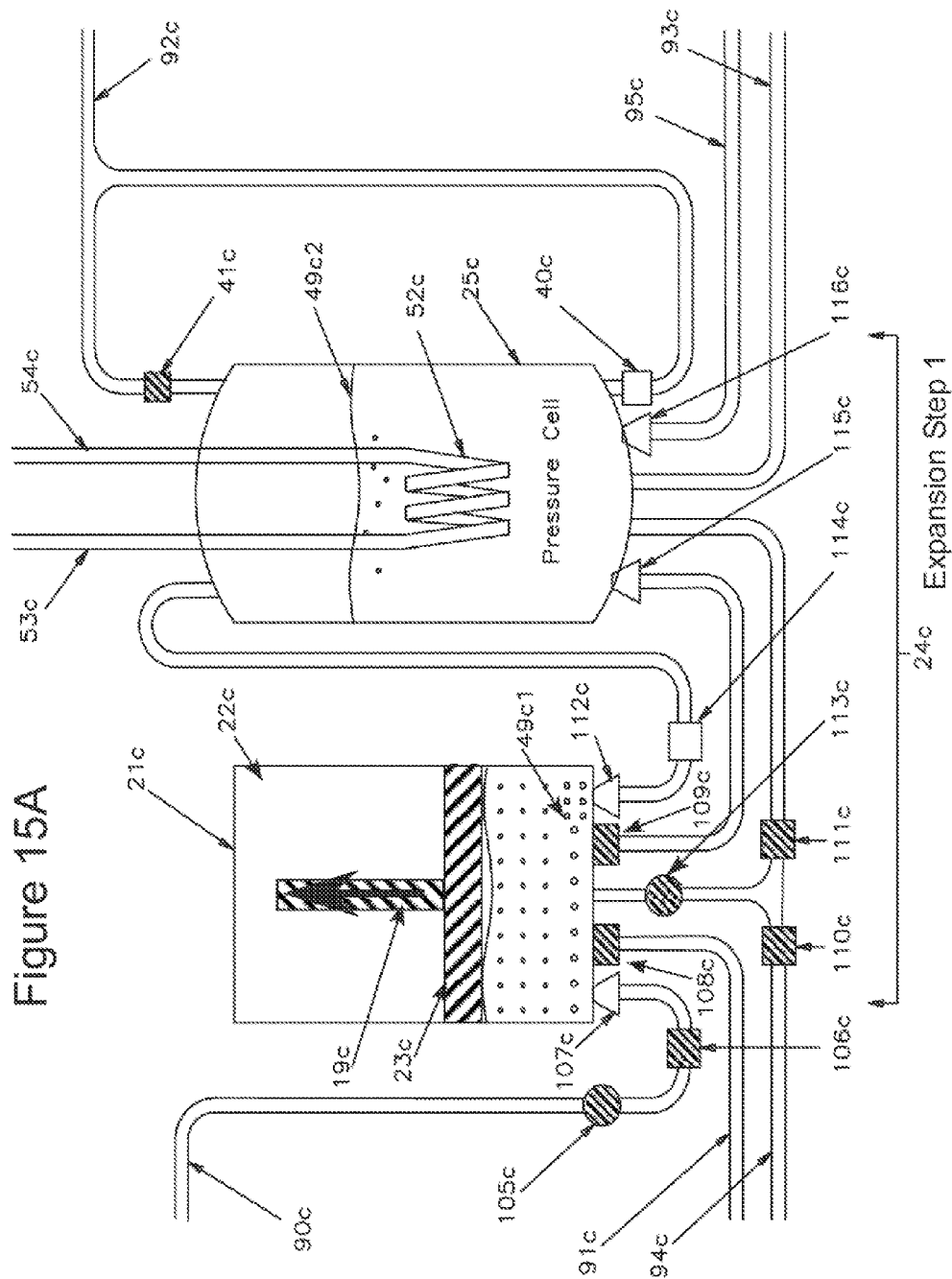
FIGS. 15A-C show the configuration of an apparatus during steps of an expansion cycle according to an embodiment of the present invention.
Figure 15B:
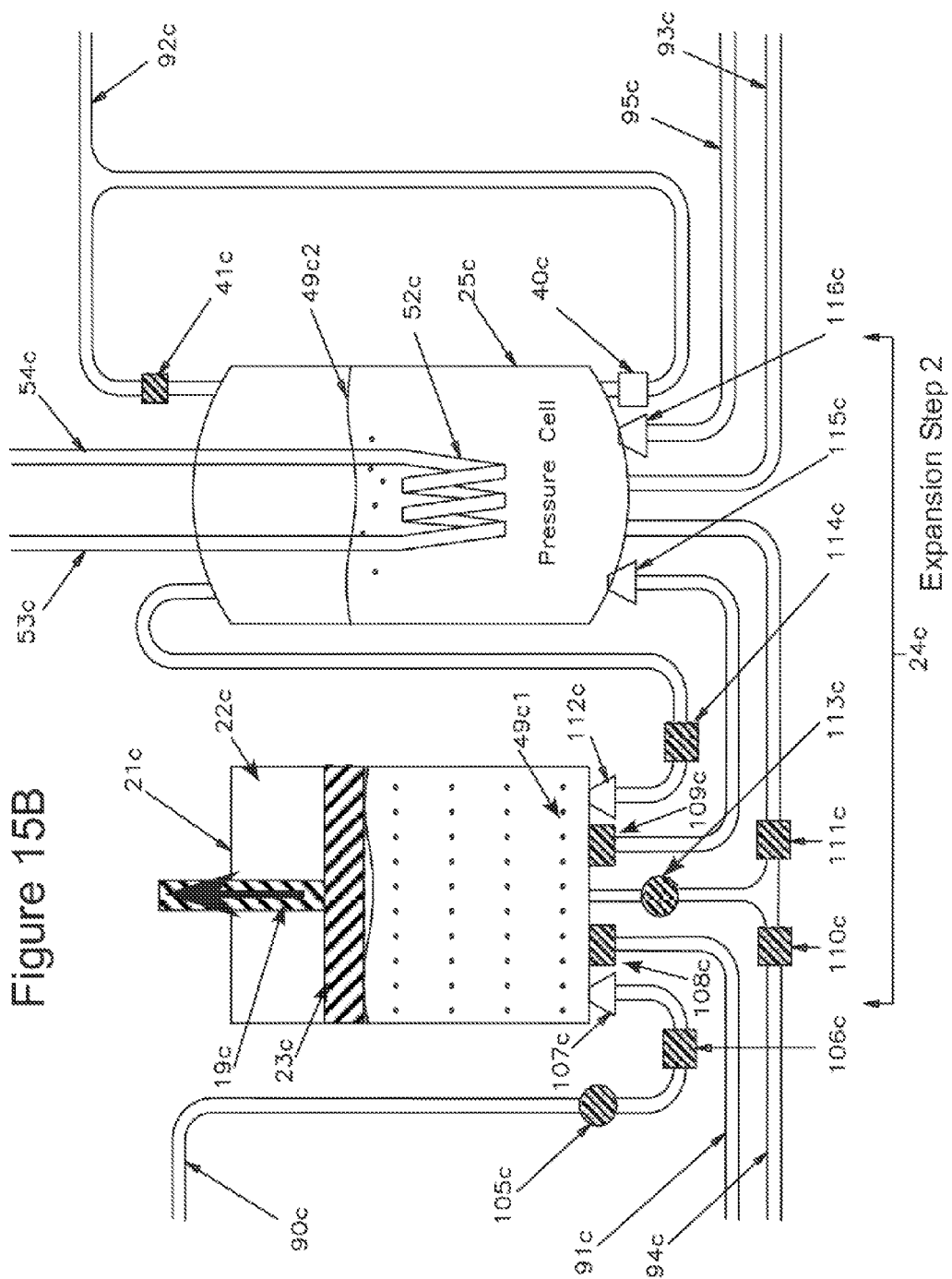
Figure 15C:
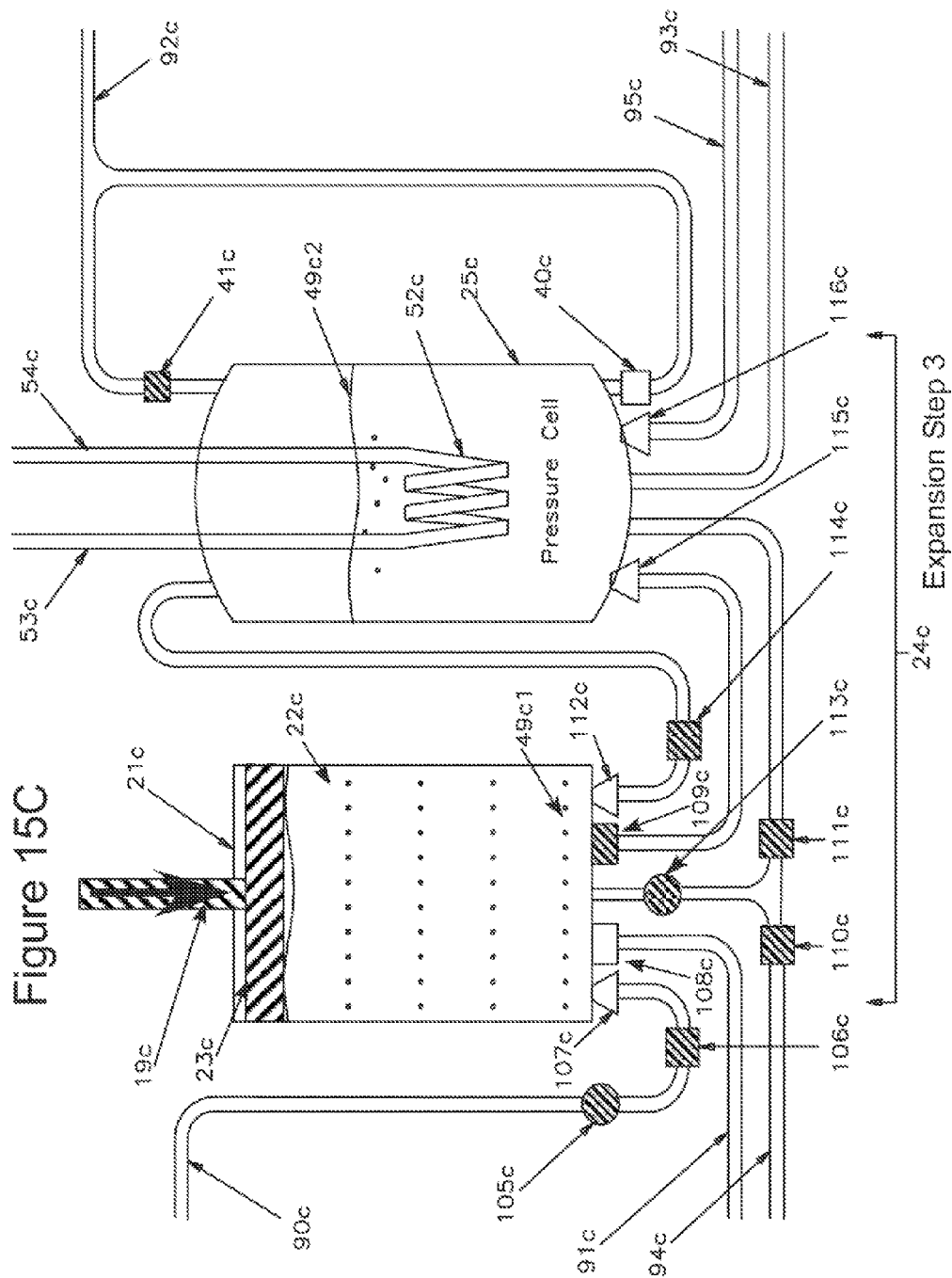
Figure 18B:
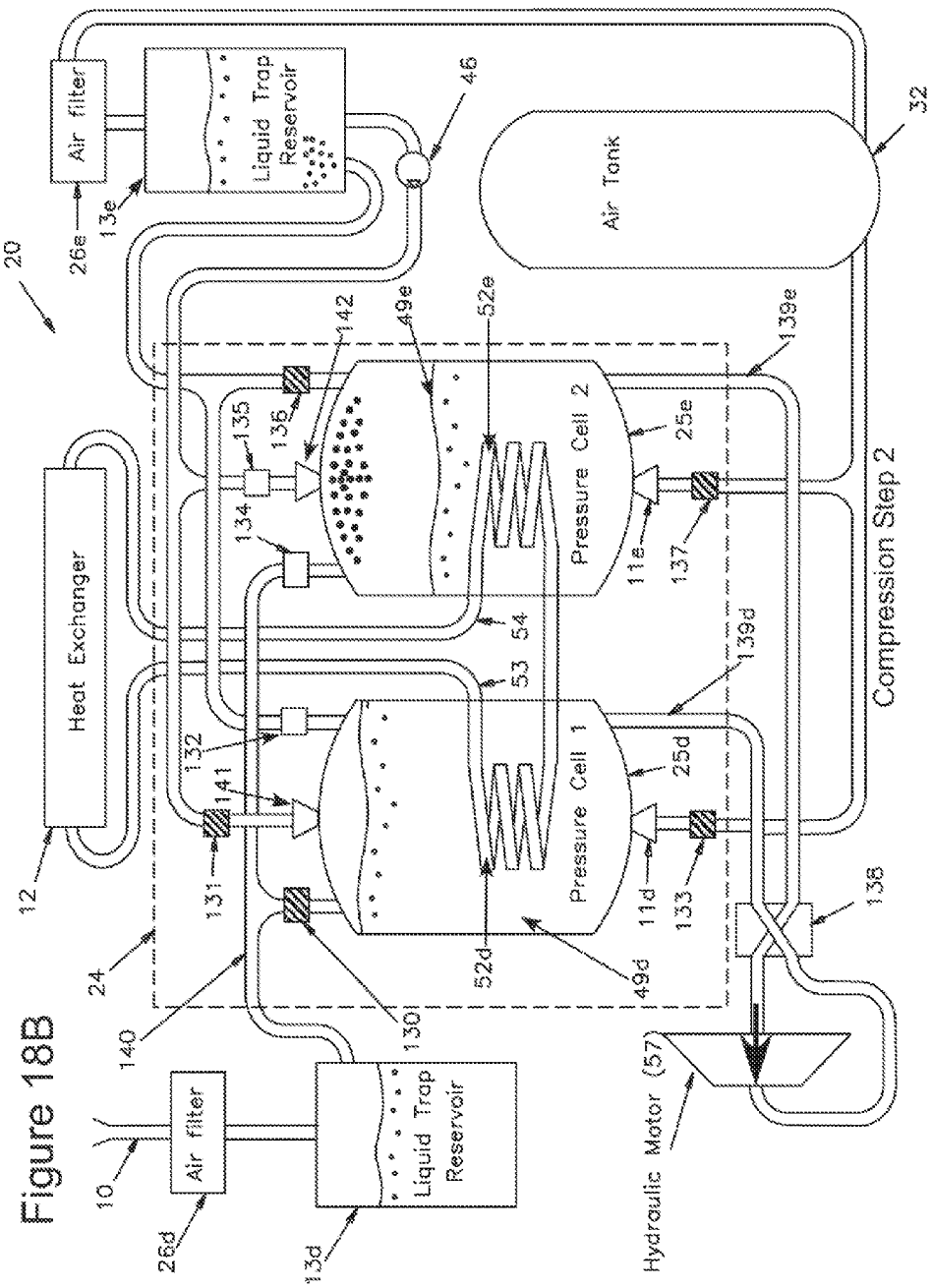
Figure 18C:
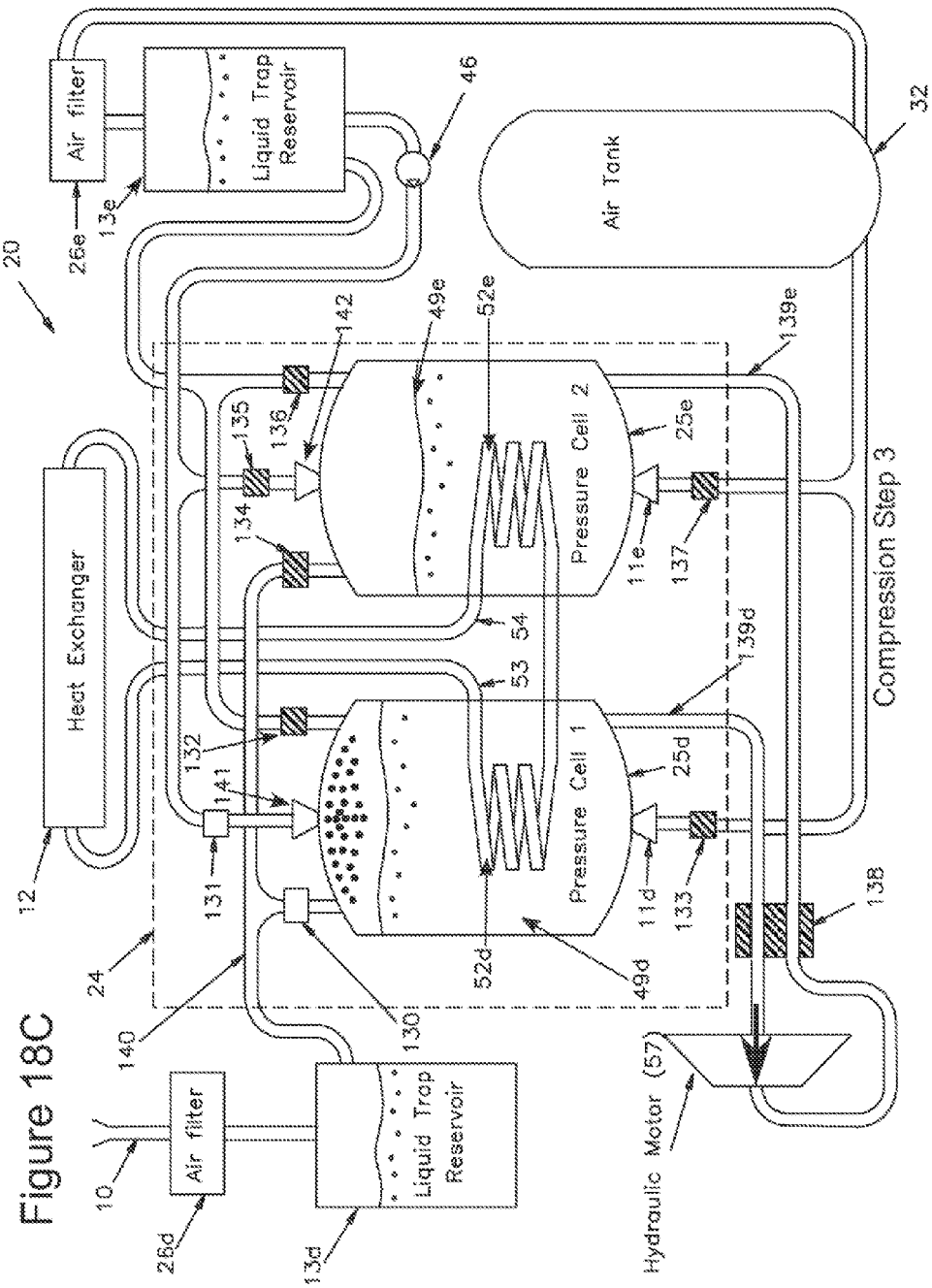
Figure 18D:
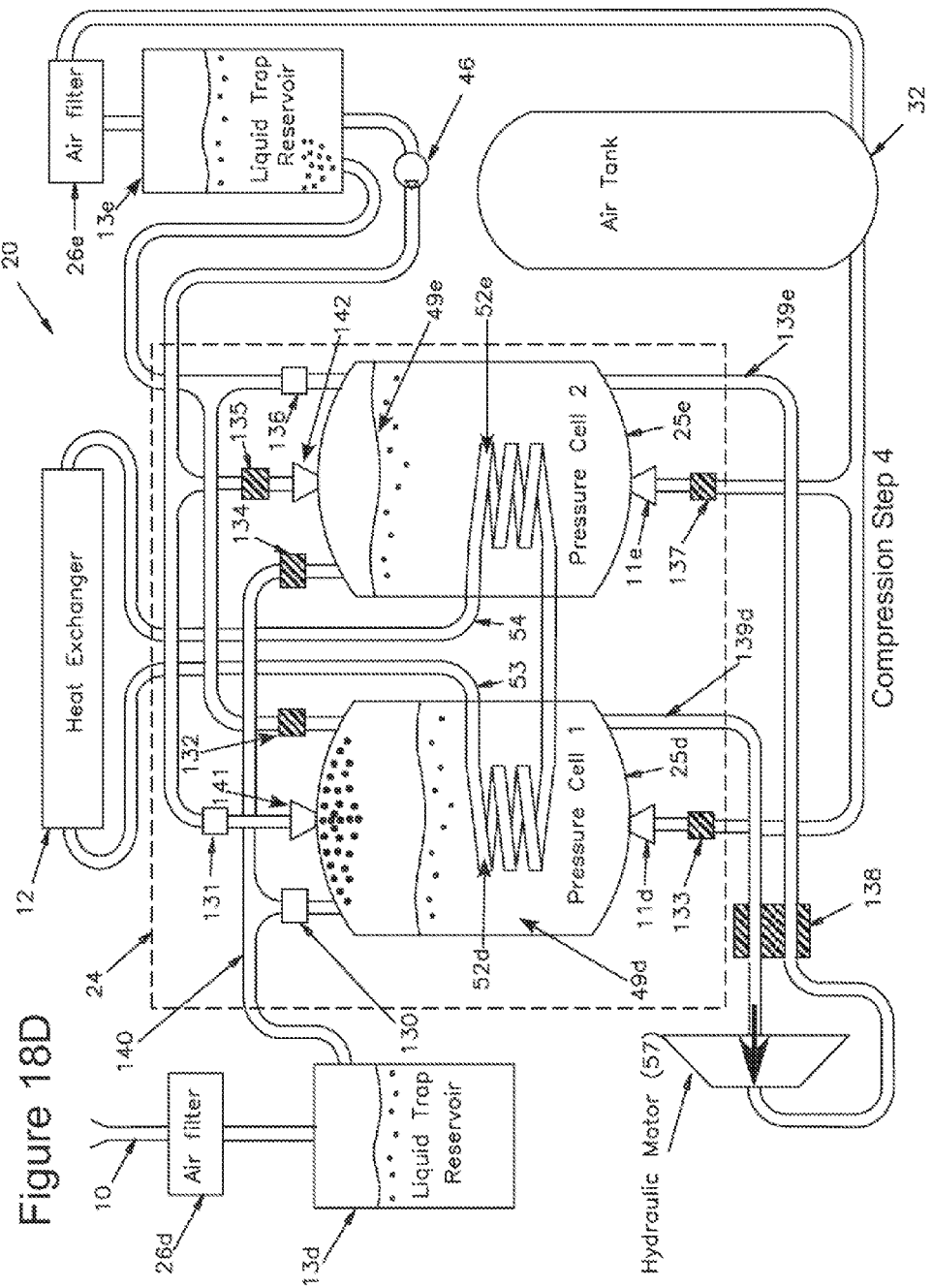
Figure 19B:
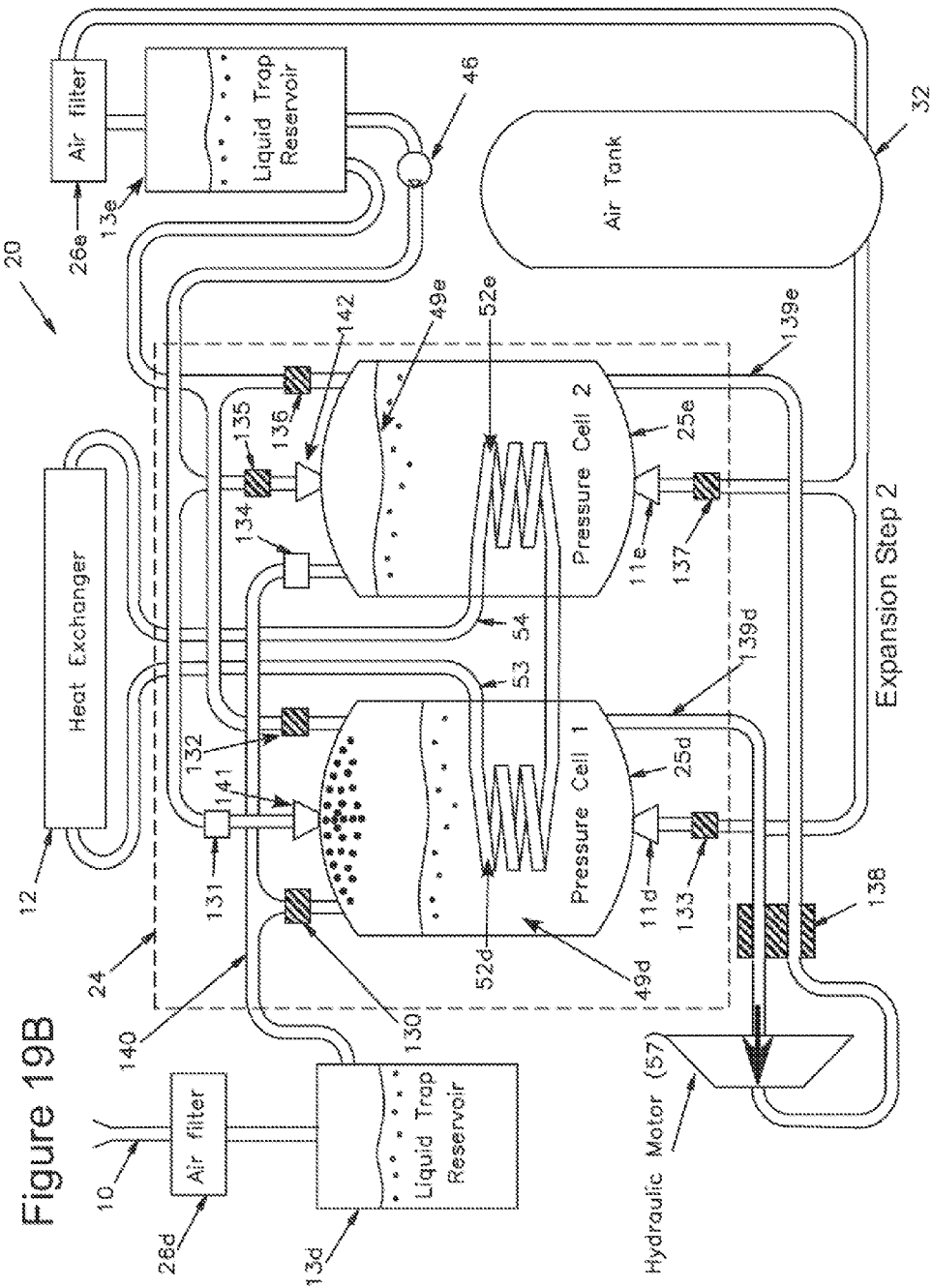
Figure 19C:
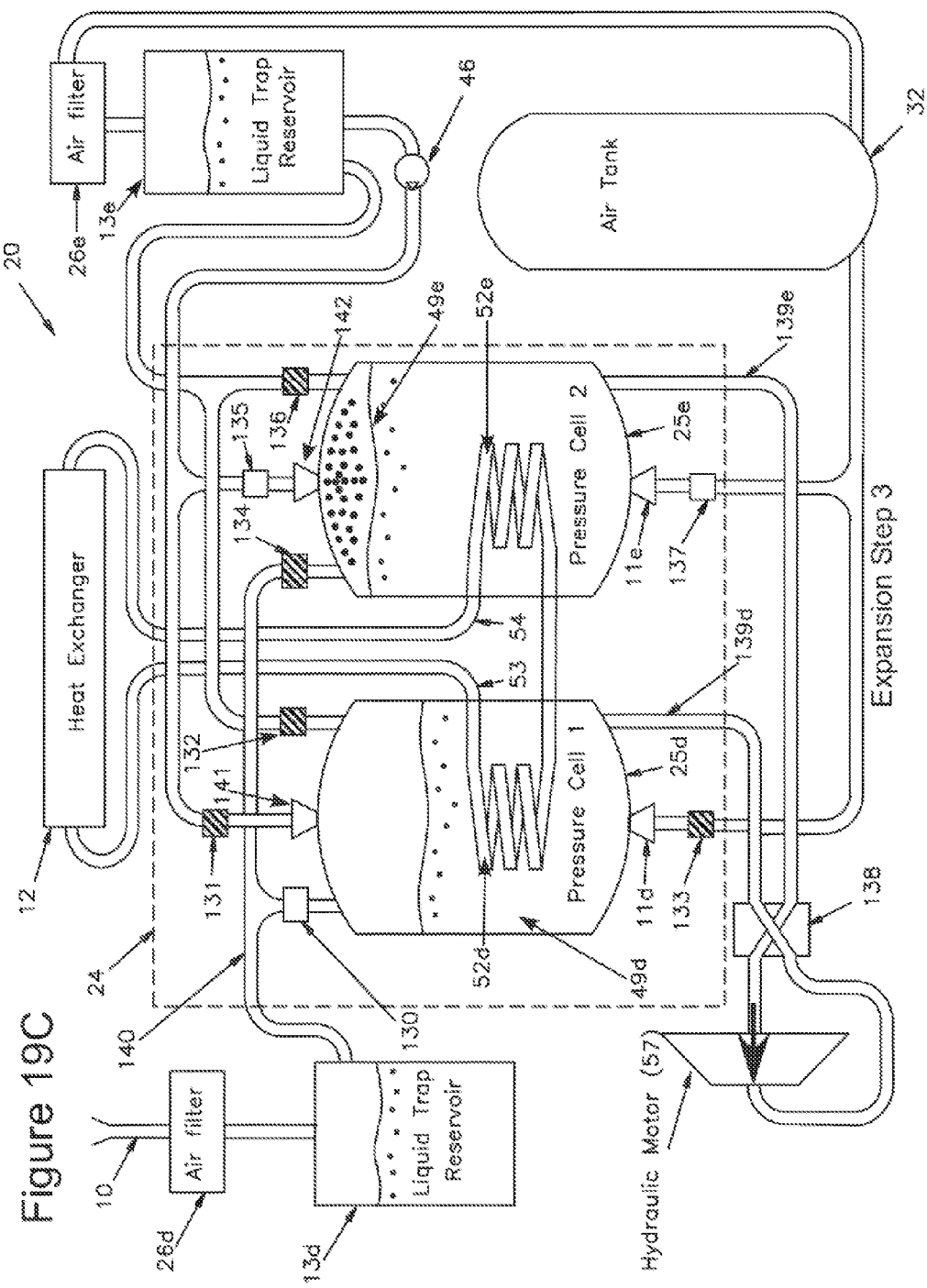
Figure 19D:
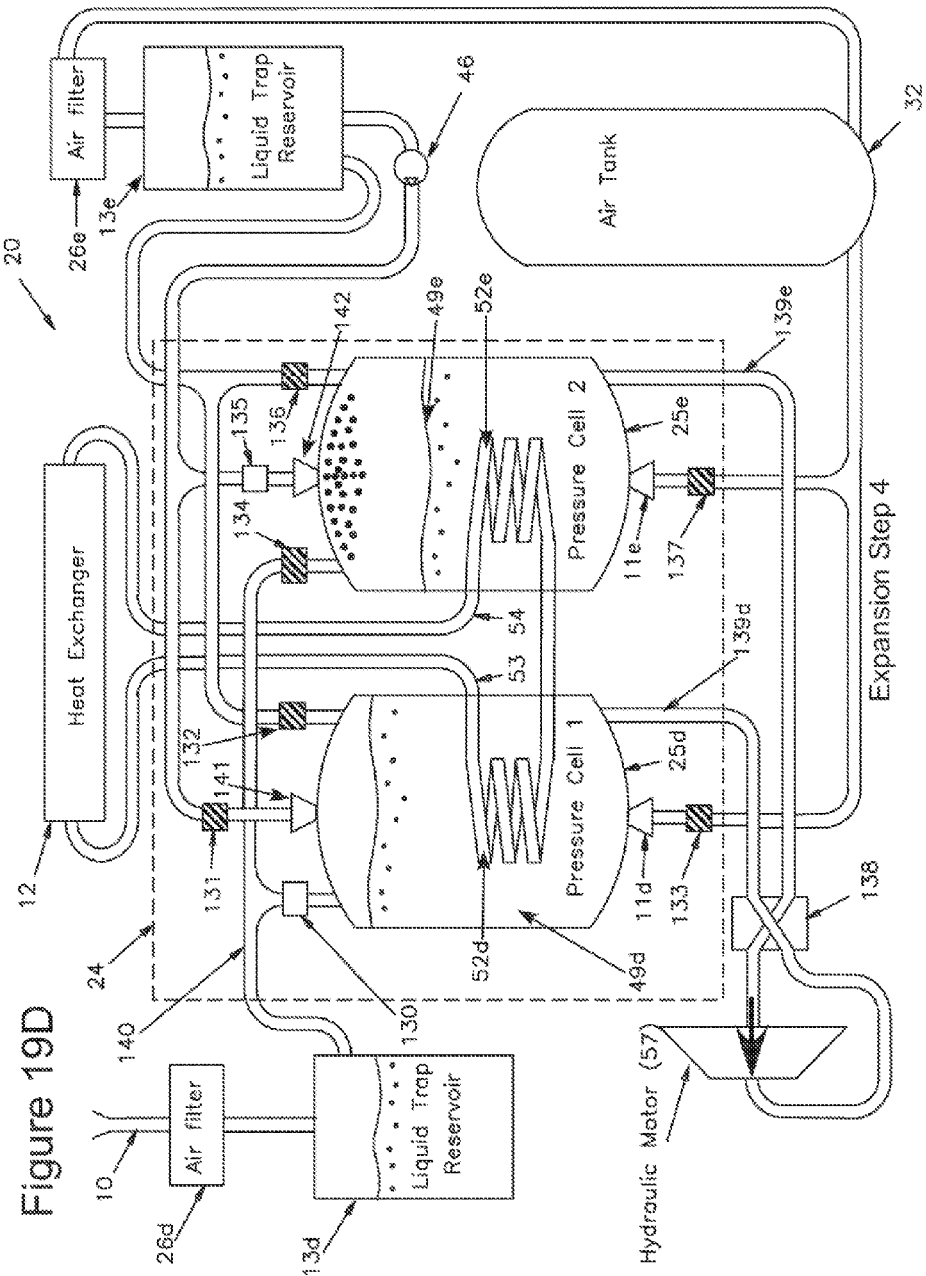

The corresponding expansion cycle for this system is shown in the table below in conjunction with FIGS. 15A-C:

|  | Step 1 | Step 2 | Step 3 |
|---|---|---|---|
|  | Description | | |
|  | Add compressed air to cylinder device | Expansion | Exhaust spent air |
| Valve 108c | Closed | Closed | Open |
| Valve 109c | Closed | Closed | Closed |
| Valve 114c | Open | Closed | Closed |
| Valve 41c | Closed | Closed | Closed |
| Valve 40c | Open | Open | Open |
| Valve 106c | Closed | Closed | Closed |
| Valve 110c | Closed | Closed | Closed |
| Valve 111c | Closed | Closed | Closed |
| Pump 105c | Off | Off | Off |
| Pump 113c | Off | Off | Off |
| Piston 23c | At top of liquid | Near top of liquid | At TDC at start |

Shown in FIGS. 16A-D and in the table below, are the steps of an embodiment of a compression cycle for a multi-phase stage, referencing the elements of FIG. 5:

|  | Step 1 | Step 2 | Step 3 | Step 4 |
|---|---|---|---|---|
|  | Description | | | |
|  | Add mist and air to chamber 22b1 and compress air in chamber 22b2 | Continue, moving air to pressure cell | Add mist and air to chamber 22b2 and compress air in chamber 22b1 | Continue, moving air to pressure cell |
| Valve 35b1 | Open | Open | Closed | Closed |
| Valve 36b1 | Closed | Closed | Closed | Closed |
| Valve 37b1 | Closed | Closed | Closed | Closed |
| Valve 38b1 | Closed | Closed | Closed | Open |
| Valve 39b1 | Open | Open | Closed | Closed |
| Valve 35b2 | Closed | Closed | Open | Open |
| Valve 36b2 | Closed | Closed | Closed | Closed |

-continued

|  | Step | | | |
|---|---|---|---|---|
|  | 1 | 2 | 3 | 4 |
|  | | | Description | |
|  | Add mist and air to chamber 22b1 and compress air in chamber 22b2 | Continue, moving air to pressure cell | Add mist and air to chamber 22b2 and compress air in chamber 22b1 | Continue, moving air to pressure cell |
| Valve 37b2 | Closed | Closed | Closed | Closed |
| Valve 38b2 | Closed | Open | Closed | Closed |
| Valve 39b2 | Closed | Closed | Open | Open |
| Valve 40b | Closed | Closed | Closed | Closed |
| Valve 41b | Open | Open | Open | Open |
| Pump 47b | On | On | On | On |
| Piston 23b | TDC at start of step | Between TDC and BDC, moving down | BDC at start of step | Between BDC and TDC, moving up |

The corresponding expansion cycle for the double-acting stage is illustrated in FIGS. 17A-D and in the following table:

|  | Step | | | |
|---|---|---|---|---|
|  | 1 | 2 | 3 | 4 |
|  | | | Description | |
|  | Add mist and air to chamber 22b1 and exhaust air from chamber 22b2 | Allow air in chamber 22b1 to expand and continue exhausting air from chamber 22b2 | Add mist and air to chamber 22b2 and exhaust air from chamber 22b1 | Allow air in chamber 22b2 to expand and continue exhausting air from chamber 22b1 |
| Valve 35b1 | Closed | Closed | Open | Open |
| Valve 36b1 | Closed | Closed | Closed | Closed |
| Valve 37b1 | Open | Closed | Closed | Closed |
| Valve 38b1 | Closed | Closed | Closed | Closed |
| Valve 39b1 | Open | Closed | Closed | Closed |
| Valve 35b2 | Open | Open | Closed | Closed |
| Valve 36b2 | Closed | Closed | Closed | Closed |
| Valve 37b2 | Closed | Closed | Open | Closed |
| Valve 38b2 | Closed | Closed | Closed | Closed |
| Valve 39b2 | Closed | Closed | Open | Closed |
| Valve 40b | Open | Open | Open | Open |
| Valve 41b | Closed | Closed | Closed | Closed |
| Pump 47b | On | Off | On | Off |
| Piston 23b | TDC at start of step | Between TDC and BDC, moving down | BDC at start of step | Between BDC and TDC, moving up |

A compression cycle for a single-stage, single-acting energy storage system shown in FIGS. 18A-D, is described in the table below, with mist sprayed at the time of inlet of air into the cylinder, with similar elements as shown in FIG. 3:

|  | Step | | | |
|---|---|---|---|---|
|  | 1 | 2 | 3 | 4 |
|  | | | Description | |
|  | Compress air in cell 25d while spraying mist, and replenish the air in cell 25e | Move compressed air from cell 25d to air tank | Compress air in cell 25e while spraying mist, and replenish the air in cell 25d | Move compressed air from cell 25e to air tank |
| Valve 130 | Closed | Closed | Open | Open |
| Valve 131 | Closed | Closed | Open | Open |
| Valve 132 | Closed | Open | Closed | Closed |
| Valve 133 | Closed | Closed | Closed | Closed |
| Valve 134 | Open | Open | Closed | Closed |
| Valve 135 | Open | Open | Closed | Closed |
| Valve 136 | Closed | Closed | Closed | Open |

-continued

|  | Step | | | |
|---|---|---|---|---|
|  | 1 | 2 | 3 | 4 |
|  | | | Description | |
|  | Compress air in cell 25d while spraying mist, and replenish the air in cell 25e | Move compressed air from cell 25d to air tank | Compress air in cell 25e while spraying mist, and replenish the air in cell 25d | Move compressed air from cell 25e to air tank |
| Valve 137 | Closed | Closed | Closed | Closed |
| Valve 138 | Fluid out from cell 25e, in to cell 25d | Fluid out from cell 25e, in to cell 25d | Fluid out from cell 25d, in to cell 25e | Fluid out from cell 25d, in to cell 25e |
| Pump 46 | On | On | On | On |

The corresponding expansion cycle of the single-stage, single-acting energy storage system proceeds as follows as shown in FIGS. 19A-D:

|  | Step | | | |
|---|---|---|---|---|
|  | 1 | 2 | 3 | 4 |
|  | | | Description | |
|  | Add air to cell 25d while spraying mist, and move air from cell 25e | Expand air in cell 25d while spraying mist, continue to exhaust cell 25e | Add air to cell 25e while spraying mist, and move air from cell 25d | Expand air in cell 25e while spraying mist, continue to exhaust cell 25d |
| Valve 130 | Closed | Closed | Open | Open |
| Valve 131 | Open | Open | Closed | Closed |
| Valve 132 | Closed | Closed | Closed | Closed |
| Valve 133 | Open | Closed | Closed | Closed |
| Valve 134 | Open | Open | Closed | Closed |
| Valve 135 | Closed | Closed | Open | Open |
| Valve 136 | Closed | Closed | Closed | Closed |
| Valve 137 | Closed | Closed | Open | Closed |
| Valve 138 | Fluid out from cell 25d, in to cell 25e | Fluid out from cell 25d, in to cell 25e | Fluid out from cell 25e, in to cell 25d | Fluid out from cell 25e, in to cell 25d |
| Pump 46 | On | On | On | On |

Variations on the specific embodiments describe above, are possible. For example, in some embodiments, a plurality of pistons may be in communication with a common chamber. In other embodiments, a multistage apparatus may not include a separate pressure cell.

Figure 4:
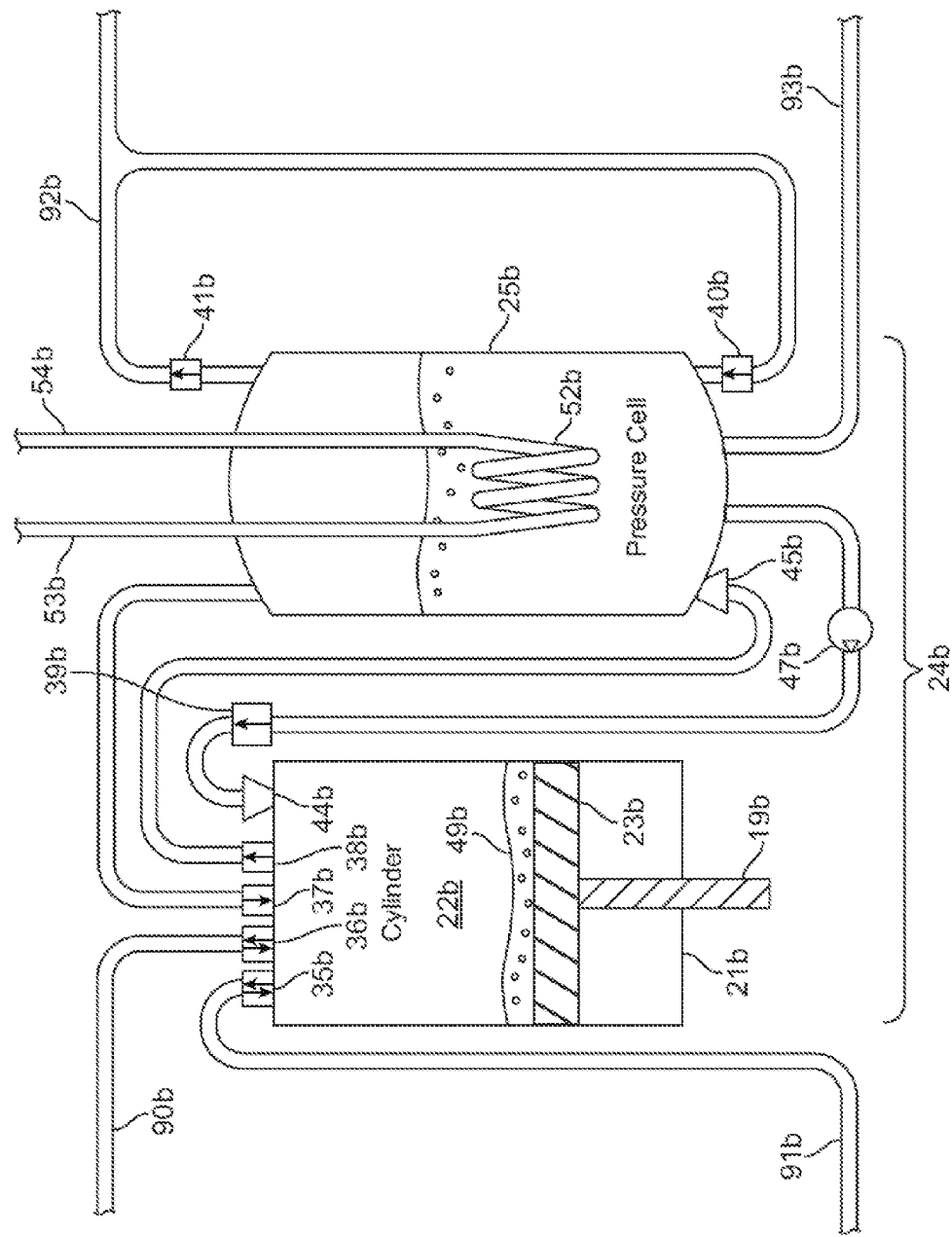
FIG. 4 is a schematic representation of a one single-acting stage that uses liquid mist to effect heat exchange in a multi-stage compressed air energy storage system in accordance with the present invention.
Figure 10:
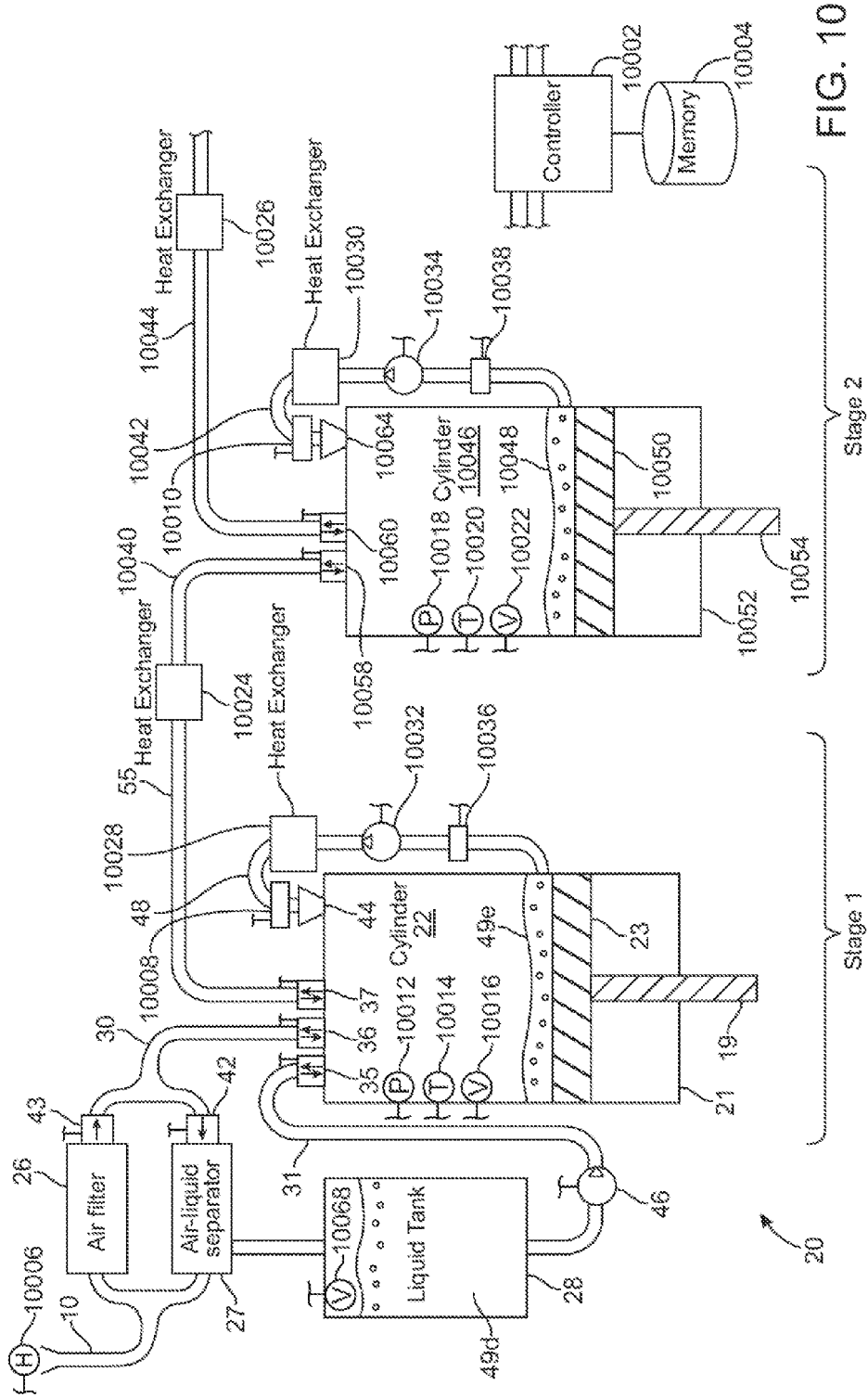
FIG. 10 shows an alternative embodiment of an apparatus in accordance with the present invention.

For example, in the embodiment of FIG. 10, the stages are connected directly together through a heat exchanger, rather than through a pressure cell as in the embodiment of FIG. 4. The relative phases of the cycles in the two stages must be carefully controlled so that when Stage 1 is performing an exhaust step, Stage 2 is performing an intake step (during compression). When Stage 2 is performing an exhaust step, Stage 1 is performing an intake step (during expansion).

The timing is controlled so the pressures on either side of heat exchanger 10024 are substantially the same when valves 37 and 10058 are open. Liquid for spray nozzle 44 is supplied from an excess water in cylinder 22 by opening valve 10036 and turning on pump 10032. Similarly, liquid for spray nozzle 10064 is supplied from an excess water in cylinder 10046 by opening valve 10038 and turning on pump 10034. Such precise timing during operation may be achieved with the operation of a controller/processor that is communication with a plurality of the system elements, as has been previously described.

The present invention is not limited to the embodiments specifically described above. For example, while water has been described as the liquid that is injected into air as a mist, other liquids could be utilized and fall within the scope of the present invention. Examples of liquids that could be used include polypropylene glycol, polyethylene glycol, and alcohols.

The following claims relate to compression.

1. A method for storing energy, the method comprising:
introducing a first quantity of air at a first temperature into a first chamber;
in a compression cycle, subjecting the first quantity of air to compression by a first piston coupled to the first chamber;
injecting a first determined quantity of fluid into the first quantity of air to absorb thermal energy generated by the compression cycle and thereby maintain the first quantity of air in a first temperature range during the compression; and
transferring at least a portion of the first quantity of air to a first pressure cell.

2. The method of claim 1 wherein the first determined quantity of fluid is based upon one or more control parameters.

3. The method of claim 2 wherein the control parameter is calculated for the compression cycle from a measured physical property.

4. The method of claim 2 wherein the control parameter comprises a maximum increase in a temperature of the first quantity of air during compression.

5. The method of claim 2 wherein the control parameter comprises an amount of the fluid present in liquid form inside the chamber.

6. The method of claim 2 wherein the control parameter comprises an efficiency.

7. The method of claim 2 wherein the control parameter comprises a power input to the piston.

8. The method of claim 2 wherein the control parameter comprises a speed of the piston.

9. The method of claim 2 wherein the control parameter comprises a force on the piston.

10. The method of claim 1 wherein the piston is solid, liquid, or a combination of solid and liquid.

11. The method of claim 1 wherein the first temperature range is reflected by a change in a temperature of the first quantity of air from a first temperature to a second temperature below a boiling point of the fluid.

12. The method of claim 11 wherein the fluid comprises water.

13. The method of claim 12 wherein the first temperature range is about 60 degrees Celsius or less.

14. The method of claim 1 wherein the first determined quantity of fluid is injected by spraying or misting.

15. The method of claim 1 wherein the thermal energy transferred from the first quantity of air to the first determined quantity of fluid is facilitated by bubbling air through a liquid.

16. The method of claim 1 further comprising transferring compressed air within the pressure cell to a storage tank.

The following claims relate to compression and expansion.

17. The method of claim 1 further comprising:
in an expansion cycle, transferring a second quantity of air from the first pressure cell to the first chamber;
allowing the second quantity of air to expand and drive the first piston; and
injecting a second determined quantity of fluid into the second quantity of air to provide thermal energy absorbed by the expanding air and thereby maintain the second quantity of air in a second temperature range during the expansion.

18. The method of claim 17 further comprising generating electrical power from the driving of the first piston.

19. The method of claim 17 wherein the second determined quantity of fluid is based upon a one or more control parameters.

20. The method of claim 17 wherein the control parameter is calculated for the expansion cycle from a measured physical property.

21. The method of claim 17 wherein the control parameter comprises a maximum decrease in a temperature of the second quantity of air during the expansion.

22. The method of claim 17 wherein the control parameter comprises an amount of the fluid present in liquid form inside the chamber.

23. The method of claim 17 wherein the control parameter comprises an efficiency.

24. The method of claim 17 wherein the control parameter comprises a power output by the first piston.

25. The method of claim 17 wherein the control parameter comprises a speed of the piston.

26. The method of claim 17 wherein the control parameter comprises a force on the piston.

27. The method of claim 17 wherein the first determined quantity of fluid is injected by spraying or misting.

28. The method of claim 17 wherein thermal energy is transferred from the second quantity of air to the second determined quantity of fluid facilitated by bubbling air through a liquid.

29. The method of claim 17 wherein the fluid comprises water.

30. The method of claim 17 further comprising placing the chamber in communication with additional thermal energy during the expansion cycle.

31. The method of claim 30 wherein the additional thermal energy is waste heat from another thermal source.

32. The method of claim 17 wherein the second temperature range is reflected by a change in a temperature of the second quantity of air from a first temperature to a second temperature above a freezing point of the fluid.

33. The method of claim 32 wherein the fluid comprises water.

34. The method of claim 33 wherein the second temperature range is about 11 degrees Celsius or less.

34a. The method of claim 17 wherein at an end of an expansion stroke of the first piston, the second quantity of air is configured to produce a pressure on the first piston substantially equal to a desired pressure.

34b. The method of claim 34a, wherein the desired pressure is an input pressure of the next lowest pressure stage, or is ambient pressure.

34c. The method of claim 34a wherein the desired pressure is calculated to maximize an efficiency of expansion.

34d. The method of claim 34a wherein the desired pressure is calculated to produce a desired level of power output.

34e. The method of claim 34a wherein the desired pressure is within approximately 5 psi of an input pressure of the next lowest pressure stage.

The following claims relate to multi-stage operation.

35. The method of claim 17 further comprising:
providing a second chamber in selective fluid communication with the first pressure cell and with a second pressure cell;
introducing from the first pressure cell, a third quantity of air at a second temperature into the second chamber;
in a compression cycle of the second chamber,
subjecting the third quantity of air to compression by a second piston coupled to the second chamber;
injecting a third determined quantity of fluid into the third quantity of air to absorb thermal energy generated by the compression and thereby maintain the third quantity of air in a third temperature range during the compression; and
transferring at least a portion of the third quantity of air to the second pressure cell.

36. The method of claim 35 further comprising:
in an expansion cycle of the second chamber, transferring a fourth quantity of air from the second pressure cell to the second chamber;
allowing the fourth quantity of air to expand and drive the second piston;
injecting a fourth determined quantity of fluid into the fourth quantity of air to provide thermal energy absorbed by the expanding air and thereby maintain the fourth quantity of air in a fourth temperature range during the expansion; and
transferring at least a portion of the fourth quantity of air from the second chamber to the first pressure cell.

The following claims relate to expansion.

37. A method for releasing stored energy, the method comprising:
in an expansion cycle, transferring a quantity of air from a pressure cell to a chamber having a piston disposed therein;
allowing the quantity of air to expand and drive the piston; and
injecting a determined quantity of fluid into the quantity of air to provide thermal energy absorbed by the expanding air and thereby maintain the quantity of air in a first temperature range during the expansion.

38. The method of claim 37 wherein the determined quantity of fluid is based upon one or more control parameters.

39. The method of claim 38 wherein the control parameter is calculated from a measured physical property.

40. The method of claim 38 wherein the control parameter comprises a maximum decrease in a temperature of the quantity of air during the expansion.

41. The method of claim 38 wherein the control parameter comprises an amount of the fluid present in liquid form inside the chamber.

42. The method of claim 38 wherein the control parameter comprises an efficiency.

43. The method of claim 38 wherein the control parameter comprises a power input to the piston.

44. The method of claim 38 wherein the control parameter comprises a speed of the piston.

45. The method of claim 38 wherein the control parameter comprises a force of the piston.

46. The method of claim 38 wherein the piston is solid, liquid, or a combination of solid and liquid.

47. The method of claim 38 wherein the fluid comprises water.

48. The method of claim 38 wherein the first temperature range is reflected by a change in a temperature of the first quantity of air from a first temperature to a second temperature, the change less than a determined value.

49. The method of claim 48 wherein the lower temperature is greater than a freezing point of the fluid.

50. The method of claim 48 wherein the higher temperature is less than a boiling point of the fluid.

51. The method of claim 38 wherein the first determined quantity of fluid is injected by spraying or misting.

52. The method of claim 38 wherein the thermal energy transferred from the quantity of air to the determined quantity of fluid is facilitated by bubbling air through a liquid.

52a. The method of claim 37 wherein at an end of an expansion stroke of the piston, the quantity of air is configured to produce a pressure on the piston substantially equal to a desired pressure.

52b. The method of claim 37, wherein the desired pressure is an input pressure of the next lowest pressure stage, or is ambient pressure.

52c. The method of claim 37 wherein the desired pressure is calculated to maximize an efficiency of expansion.

52d. The method of claim 37 wherein the desired pressure is calculated to produce a desired level of power output.

52e. The method of claim 37 wherein the desired pressure is within approximately 5 psi of an input pressure of the next lowest pressure stage.

The following claims relate to temperature difference during system operation.

53. A method comprising:
providing an energy storage system comprising a pressure cell in selective fluid communication with a chamber having a moveable piston disposed therein;
flowing air into the chamber;
in a compression cycle, storing energy by placing the piston in communication with an energy source to compress the air within the chamber, and then transferring the compressed air to the pressure cell; and then
in an expansion cycle, releasing energy by transferring air from the pressure cell back into the chamber while allowing the piston to move in response to expansion of air inside the chamber;
monitoring an operational parameter of the compression cycle and/or the expansion cycle; and
controlling the operational parameter to maintain a temperature of air in the chamber within a range.

54. The method of claim 53 wherein determining an operational parameter comprises controlling an amount of a liquid introduced into the air within the chamber during the compression cycle.

55. The method of claim 53 wherein the liquid comprises water.

56. The method of claim 53 wherein determining an operational parameter comprises controlling an amount of a liquid introduced into the air within the chamber during the expansion cycle.

57. The method of claim 56 wherein the liquid comprises water.

58. The method of claim 53 wherein a lower bound of the range is greater than a freezing point of a liquid introduced into the air within the chamber.

59. The method of claim 58 wherein the liquid comprises water.

60. The method of claim 53 wherein an upper bound of the range is lower than a boiling point of a liquid introduced into the air within the chamber.

61. The method of claim 60 wherein the liquid comprises water.

62. The method of claim 53 wherein determining an operational parameter comprises controlling a timing of the transfer of air from the pressure cell into the chamber during the expansion cycle.

62a. The method of claim 62 wherein the timing is controlled such that at an end of an expansion stroke of the piston, the transferred air is configured to produce a desired pressure on the piston.

62b. The method of claim 62a, wherein the desired pressure is an input pressure of the next lowest pressure stage, or is ambient pressure.

62c. The method of claim 62a wherein the desired pressure is calculated to maximize an efficiency of expansion.

62d. The method of claim 62a wherein the desired pressure is calculated to produce a desired level of power output.

62e. The method of claim 62a wherein the desired pressure is within approximately 5 psi of an input pressure of the next lowest pressure stage.

63. The method of claim 53 wherein determining an operational parameter comprises monitoring a pressure in the pressure cell.

64. The method of claim 53 wherein determining an operational parameter comprises monitoring a pressure in the chamber.

65. The method of claim 53 wherein determining an operational parameter comprises monitoring a temperature of the air in the chamber.

66. The method of claim 53 wherein determining an operational parameter comprises monitoring a humidity of the air flowed into the chamber.

67. The method of claim 53 wherein determining an operational parameter comprises monitoring a humidity of air exhausted from the chamber.

68. The method of claim 53 wherein determining an operational parameter comprises monitoring a power released during the expansion cycle.

69. The method of claim 53 wherein determining an operational parameter comprises monitoring a position of the piston.

70. The method of claim 53 wherein determining an operational parameter comprises monitoring a force on the piston.

71. The method of claim 54 wherein determining an operational parameter comprises monitoring a temperature of the liquid.

72. The method of claim 56 wherein determining an operational parameter comprises monitoring a temperature of the liquid.

73. The method of claim 54 wherein determining an operational parameter comprises monitoring a rate of flow of the liquid.

74. The method of claim 56 wherein determining an operational parameter comprises monitoring a rate of flow of the liquid.

75. The method of claim 54 wherein determining an operational parameter comprises monitoring a level of the liquid in the chamber.

76. The method of claim 56 wherein determining an operational parameter comprises monitoring a level of the liquid in the chamber.

77. The method of claim 54 wherein determining an operational parameter comprises monitoring a volume of the liquid in the chamber.

78. The method of claim 56 wherein determining an operational parameter comprises monitoring a volume of the liquid in the chamber.

79. The method of claim 53 wherein:
the piston is in communication with a rotating shaft; and
determining an operational parameter comprises monitoring a speed of the rotating shaft.

80. The method of claim 53 wherein:
the piston is in communication with a rotating shaft; and
determining an operational parameter comprises monitoring a torque of the rotating shaft.

81. The method of claim 53 wherein the operational parameter is controlled based upon a derived parameter calculated from the monitored operational parameter.

82. The method of claim 81 wherein the derived parameter is selected from the group comprising, an efficiency of power conversion, an expected power output, an expected output speed of a rotating shaft in communication with the piston, an expected output torque of a rotating shaft in communication with the piston, an expected input speed of a rotating shaft in communication with the piston, an expected input torque of a rotating shaft in communication with the piston, a maximum output speed of a rotating shaft in communication with the piston, a maximum output torque of a rotating shaft in communication with the piston, a minimum output speed of a rotating shaft in communication with the piston, a minimum output torque of a rotating shaft in communication with the piston, a maximum input speed of a rotating shaft in communication with the piston, a maximum input torque of a rotating shaft in communication with the piston, a minimum input speed of a rotating shaft in communication with the piston, a minimum input torque of a rotating shaft in communication with the piston, or a maximum expected temperature difference of air at each stage.

83. The method of claim 53 wherein controlling the operational parameter comprises controlling a timing of the transfer of air from the chamber to the pressure cell during the compression cycle.

84. The method of claim 53 wherein controlling the operational parameter comprises controlling a timing of the transfer of air from the pressure cell to the chamber during the expansion cycle.

85. The method of claim 54 wherein controlling the operational parameter comprises controlling a timing of a flow of liquid to the chamber.

86. The method of claim 56 wherein controlling the operational parameter comprises controlling a timing of a flow of liquid to the chamber.

87. The method of claim 53 wherein:
during the compression cycle, the piston is in communication with a motor or a motor-generator; and
controlling the operational parameter comprises controlling an amount of electrical power applied to the motor or the motor-generator.

88. The method of claim 53 wherein:
during the expansion cycle, the piston is in communication with a generator or a motor-generator; and
controlling the operational parameter comprises controlling an electrical load applied to the generator or the motor-generator.

89. The method of claim 54 wherein:
the liquid is flowed to the chamber utilizing a pump; and
controlling the operational parameter comprises controlling an amount of electrical power supplied to the pump.

90. The method of claim 56 wherein:
the liquid is flowed to the chamber utilizing a pump; and
controlling the operational parameter comprises controlling an amount of electrical power supplied to the pump.

91. The method of claim 53 wherein:
liquid in the pressure cell is circulated through a heat exchanger that is in thermal communication with a fan; and
controlling the operational parameter comprises controlling an amount of electrical power supplied to the fan.

92. The method of claim 53 further comprising placing the chamber in communication with additional thermal energy during the expansion cycle.

93. The method of claim 92 wherein the additional thermal energy is waste heat from another thermal source.

94. The method of claim 53 wherein controlling the operational parameter comprises controlling a compression ratio.

95. The method of claim 53 further comprising transferring compressed air within the pressure cell to a storage tank.

The following claims relate to a system.

96. An energy storage and recovery system comprising:
a first chamber having a moveable piston disposed therein and in selective communication with an energy source;
a pressure cell in selective fluid communication with the first chamber through a first valve;
an air source in selective fluid communication with the first chamber through a second valve;
a liquid source in selective fluid communication with the first chamber through a third valve; and
a controller in electronic communication with, and configured to operate, system elements in one of the following states:
an intake step wherein the first valve is closed, the second valve is open, and the third valve may be open or closed;
a compression step wherein the piston is in communication with the energy source, the first and second valves are closed, the third valve is open or closed, and then the first valve is opened upon compression of the air in the chamber by the piston,
an expansion step wherein the piston is not in communication with the energy source, the first valve is opened, the second valve is closed, and the third valve may be open or closed, such that the air expands in the chamber to move the piston, and then the first valve is closed as the air continues to expand, and
an exhaust step wherein the piston is not in communication with the energy source, the first valve is closed, the second valve is open, and the third valve may be open or closed; and;
wherein the controller is configured to determine an operational parameter in order to maintain a temperature of the air in the first chamber within a range.

97. The energy storage and recovery system of claim 96 wherein the moveable piston comprises a solid piston.

98. The energy storage and recovery system of claim 96 wherein the moveable piston comprises a liquid piston.

99. The energy storage and recovery system of claim 96 further comprising a sprayer configured to inject the liquid into the air within the chamber.

100. The energy storage and recovery system of claim 99 wherein the liquid comprises water.

101. The energy storage and recovery system of claim 96 further comprising a bubbler configured to transfer heat between the liquid and air within the pressure cell.

102. The energy storage and recovery system of claim 101 wherein the liquid comprises water.

103. The energy storage and recovery system of claim 96 further comprising a sensor configured to detect a volume of liquid present within the chamber, the sensor in electronic communication with the controller and referenced to determine the operational parameter.

104. The energy storage and recovery system of claim 96 further comprising a sensor configured to detect a property selected from the group comprising, a pressure, a temperature, a humidity, a position of the piston, a force on the piston, a liquid flow rate, a liquid level, a liquid volume, a speed of a shaft driven by the piston, or a torque of the shaft driven by the piston, wherein the sensor is in electronic communication with the controller and referenced to determine the operational parameter.

105. The energy storage and recovery system of claim 96 further comprising a power generator or motor-generator configured to be in selective communication with the piston during the expansion stroke.

106. The energy storage and recovery system of claim 96 wherein the chamber is configured to be in thermal communication with a thermal energy source.

107. The energy storage and recovery system of claim 96 further comprising a storage tank configured to receive compressed air from the pressure cell.

107a. The energy storage and recovery system of claim 96 wherein during the expansion the controller is configured to operate the first valve to inlet the air such that at an end of an expansion stroke of the piston, a pressure on the piston is substantially equal to a desired pressure.

107b. The method of claim 107a, wherein the desired pressure is an input pressure of the next lowest pressure stage, or is ambient pressure.

107c. The method of claim 107a wherein the desired pressure is calculated to maximize an efficiency of expansion.

107d. The method of claim 107a wherein the desired pressure is calculated to produce a desired level of power output.

107e. The method of claim 107a wherein the desired pressure is within approximately 5 psi of an input pressure of the next lowest pressure stage.

The following claims relate to a system having multiple stages.

108. The energy storage and recovery system of claim 96, further comprising:
a second chamber having a moveable piston disposed therein and in selective communication with the energy source; and
a second pressure cell in selective fluid communication with the second chamber through a fourth valve, in selective fluid communication with the first pressure cell through a fifth valve, the fourth and fifth valves in communication with and configured to be operated by the controller.

109. The energy storage and recovery system of claim 96, further comprising a plurality of a second chamber and second pressure cell connected in series with the first chamber and first pressure cell, such that output from the first chamber is communicated to the second chamber.

The following claims relate to a processor.

110. An apparatus for storing and recovering energy, the apparatus comprising:
a host computer comprising a processor in electronic communication with a computer-readable storage medium, the computer readable storage medium having stored thereon one or more codes to instruct the processor to,
receive a signal indicating a property of an energy storage and recovery system comprising a first chamber having a moveable piston disposed therein and in selective communication with an energy source, and a pressure cell in selective fluid communication with the first chamber,
in response to the received signal, control an element of the energy storage and recovery system to maintain a temperature of air within the first chamber within a temperature range.

111. The apparatus of claim 110 wherein the code stored on the computer readable storage medium is configured to receive the signal indicating a pressure in the pressure cell.

112. The apparatus of claim 110 wherein the code stored on the computer readable storage medium is configured to receive the signal indicating a pressure in the first chamber.

113. The apparatus of claim 110 wherein the code stored on the computer readable storage medium is configured to receive the signal indicating a temperature of the air in the first chamber.

114. The apparatus of claim 110 wherein the code stored on the computer readable storage medium is configured to receive the signal indicating a temperature of the air in the pressure cell.

115. The apparatus of claim 110 wherein the code stored on the computer readable storage medium is configured to receive the signal indicating a humidity of the air inlet to the first chamber.

116. The apparatus of claim 110 wherein the code stored on the computer readable storage medium is configured to receive the signal indicating a power output.

117. The apparatus of claim 110 wherein the code stored on the computer readable storage medium is configured to receive the signal indicating a humidity of the air exhausted from the first chamber.

118. The apparatus of claim 110 wherein the code stored on the computer readable storage medium is configured to receive the signal indicating a position of the piston.

119. The apparatus of claim 110 wherein the code stored on the computer readable storage medium is configured to receive the signal indicating a force on the piston.

120. The apparatus of claim 110 wherein the code stored on the computer readable storage medium is configured to receive the signal indicating a temperature of liquid flowed to the chamber.

121. The apparatus of claim 110 wherein the code stored on the computer readable storage medium is configured to receive the signal indicating rate of flow of liquid to the chamber.

122. The apparatus of claim 110 wherein the code stored on the computer readable storage medium is configured to receive the signal indicating a level of liquid in the chamber.

123. The apparatus of claim 110 wherein the code stored on the computer readable storage medium is configured to receive the signal indicating volume of liquid in the chamber.

124. The apparatus of claim 110 wherein the code stored on the computer readable storage medium is configured to receive the signal indicating a speed of a rotating shaft in communication with the piston.

125. The apparatus of claim 110 wherein the code stored on the computer readable storage medium is configured to receive the signal indicating torque of a rotating shaft in communication with the piston.

126. The apparatus of claim 110 wherein in response to the received signal, the code stored on the computer readable storage medium is configured to instruct the processor to control a timing of a transfer of air from the chamber to the pressure cell during a compression cycle.

126a. The apparatus of claim 110 wherein in response to the received signal, the code stored on the computer readable storage medium is configured to instruct the processor to control a timing of a transfer of air from the pressure cell to the chamber during an expansion cycle.

127. The apparatus of claim 110 wherein in response to the received signal, the code stored on the computer readable storage medium is configured to instruct the processor to control a timing of a transfer of liquid to the chamber.

128. The apparatus of claim 110 wherein in response to the received signal, the code stored on the computer readable storage medium is configured to instruct the processor to control the amount of liquid transferred to the chamber.

129. The apparatus of claim 110 wherein in response to the received signal, the code stored on the computer readable storage medium is configured to instruct the processor to control an electrical load applied to a generator or a motor-generator in communication with the piston, during an expansion cycle.

130. The apparatus of claim 110 wherein in response to the received signal, the code stored on the computer readable storage medium is configured to instruct the processor to control an electrical power applied to a motor or a motor-generator in communication with the piston, during a compression cycle.

131. The apparatus of claim 110 wherein in response to the received signal, the code stored on the computer readable storage medium is configured to instruct the processor to control an electrical power applied to a pump to flow liquid into the chamber.

132. The apparatus of claim 110 wherein in response to the received signal, the code stored on the computer readable storage medium is configured to instruct the processor to control an electrical power applied to fans associated with a heat exchanger configured to receive liquid from the pressure cell.

133. The apparatus of claim 110 wherein in response to the received signal, the code stored on the computer readable storage medium is configured to instruct the processor to control a compression ratio.

The following claims relate to a multi-stage system.

134. An energy storage and recovery system comprising:
a first stage comprising a first element moveable to compress air in the first stage, the first stage in selective fluid communication with an ambient air supply through a first valve;
a final stage comprising a second element moveable to compress air in the final stage, and
moveable in response to expanding air within the final stage, the final stage in selective fluid communication with a compressed air storage tank through a second valve;
a controller configured to determine an amount of liquid to be injected into the first stage or the final stage to maintain a temperature of air in the first stage or in the final stage within a temperature range; and
a liquid source in communication with the controller and configured to inject the determined amount of liquid into the first stage or into the final stage.

135. The energy storage and recovery system of claim 134, wherein the first moveable element is also moveable in response to expanding air within the first stage.

136. The energy storage and recovery system of claim 134, wherein the first moveable element comprises a piston.

137. The energy storage and recovery system of claim 134, wherein the first moveable element comprises a screw.

138. The energy storage and recovery system of claim 134, wherein the first stage or the final stage comprises a pressure cell in selective fluid communication with a chamber.

139. The energy storage and recovery system of claim 134, wherein the first stage is configured to transfer to, and receive compressed air from, the final stage through a third valve.

140. The energy storage and recovery system of claim 139, wherein the first stage comprises a first chamber having a first piston disposed therein as the first moveable element, and the final stage comprises a second chamber having a second piston disposed therein as the second moveable element, the first and final stages lacking a pressure cell.

141. The energy storage and recovery system of claim 134, further comprising an intermediate stage positioned in series and in selective fluid communication between the first stage and the final stage, the intermediate stage comprising a third element moveable to compress air in the intermediate stage, and moveable in response to expanding air within the intermediate stage.

142. The energy storage and recovery system of claim 141, wherein the first moveable element is also moveable in response to expanding air within the first stage.

143. The energy storage and recovery system of claim 142, wherein the first stage comprises a first chamber having a first piston disposed therein as the first moveable element, and the intermediate stage comprises a second chamber having a second piston disposed therein as the third moveable element.

144. The energy storage and recovery system of claim 141, wherein the intermediate stage comprises a first chamber having a first piston disposed therein as the third moveable element, and the final stage comprises a second chamber having a second piston disposed therein as the second moveable element.

145. The energy storage and recovery system of claim 141, wherein the first stage, the intermediate stage, or the final stage comprises a chamber in selective fluid communication with a pressure cell.

146. The energy storage and recovery system of claim 141, wherein consecutive stages do not include a pressure cell.

147. The energy storage and recovery system of claim 141, further comprising additional intermediate stages positioned in series between the first stage and the final stage.

148. The energy storage and recovery system of claim 134, wherein the second moveable element comprises a piston.

149. The energy storage and recovery system of claim 148, wherein the second moveable element comprises a liquid piston.

150. The energy storage and recovery system of claim 148, wherein the second moveable element comprises a solid piston.

151. The energy storage and recovery system of claim 134, wherein a compression ratio of the first stage is larger than a compression ratio of the final stage.

152. The energy storage and recovery system of claim 141, wherein a compression ratio of the first stage is larger than a compression ratio of the intermediate stage, and the compression ratio of the intermediate stage is greater than a compression ratio of the final stage.

153. The energy storage and recovery system of claim 134, wherein the liquid comprises water.

154. A method of storing energy, the method comprising:
receiving ambient air in a first stage;
compressing the ambient air in the first stage;
transferring compressed air to a final stage;
further compressing air in the final stage;
transferring the further compressed air from the final stage to a storage tank; and
determining an operational parameter to maintain a temperature change of air in the first stage or in the second stage within a range during the compression or the further compression.

155. The method of claim 154 wherein the determined operational parameter comprises a timing of opening or closing valves controlling movement of air into or out of the stages.

156. The method of claim 154 wherein the determined operational parameter comprises an amount of liquid injected into the first stage or into the final stage during the compression or the further compression.

157. The method of claim 154 wherein compressing the ambient air comprises placing a piston disposed within a chamber of the first stage, in communication with an energy source.

158. The method of claim 154 wherein compressing the ambient air comprises placing a screw disposed within a chamber of the first stage, in communication with an energy source.

159. The method of claim 154 wherein compressed air is transferred to the final stage via an intermediate stage in which additional compression takes place.

160. The method of claim 154 further comprising:
transferring compressed air from the storage tank to the final stage;
allowing the compressed air to expand and drive a first moveable element in the final stage;
transferring air from the final stage to the first stage;
allowing compressed air in the first stage to expand and drive a second moveable element in the first stage; and
determining an operational parameter to maintain a temperature change of air in the first stage or in the second stage within a range, during expansion of air within the first stage or within the second stage.

161. The method of claim 160 wherein the determined operational parameter comprises a timing of opening or closing valves controlling movement of air into or out of the stages.

162. The method of claim 160 wherein the determined operational parameter comprises an amount of liquid injected into the first stage or into the final stage during expansion of air within the first stage or the second stage.

163. The method of claim 160 wherein the first moveable element comprises a piston.

164. The method of claim 160 wherein the second moveable element comprises a piston.

165. The method of claim 160 wherein air is transferred from the final stage to the first stage via an intermediate stage wherein further expansion of air takes place.

What is claimed is:

1. A method comprising:
providing an energy storage system comprising a gas storage tank in selective fluid communication with a chamber having a rotatable moveable screw element disposed therein;
bubbling air through liquid in the chamber to facilitate heat exchange;
in a compression cycle, storing energy by placing the rotatable moveable screw element in communication with an energy source through a mechanical linkage to compress the air within the chamber, and then transferring the compressed air from the chamber; and then
in an expansion cycle, releasing energy by transferring air from the gas storage tank into the chamber while allowing the rotatable moveable screw element to drive the mechanical linkage in response to expansion of air inside the chamber, such that the mechanical linkage transmits out of the chamber, a power of expanding air;
monitoring a sensed value of the compression cycle and/or the expansion cycle; and
controlling an operational parameter based upon the sensed value to maintain a temperature of air in the chamber within a range.

2. The method of claim 1 wherein controlling the operational parameter comprises:
controlling an amount of a liquid introduced into the air within the chamber during the compression cycle, or
controlling an amount of a liquid introduced into the air within the chamber during the expansion cycle.

3. The method of claim 1 wherein a lower bound of the range is greater than a freezing point of a liquid introduced into the air within the chamber, and an upper bound of the range is lower than a boiling point of a liquid introduced into the air within the chamber.

4. The method of claim 1 wherein monitoring the sensed value is selected from monitoring a pressure in the gas storage tank, a pressure in the chamber, a temperature of the air in the chamber, a humidity of the air flowed into the chamber, and a power released during the expansion cycle.

5. The method of claim 2 wherein monitoring the sensed value is selected from a temperature of the liquid, a rate of flow of the liquid, a level of the liquid in the chamber, or a volume of liquid in the chamber.

6. The method of claim 1 wherein:
the rotatable moveable screw element is in communication with the mechanical linkage comprising a rotating shaft; and
controlling the operational parameter comprises monitoring a speed of the rotating shaft, or a torque of the rotating shaft.

7. The method of claim 4 wherein the operational parameter is controlled based upon a derived parameter calculated from the sensed value.

8. The method of claim 7 wherein:
the mechanical linkage comprises a rotating shaft; and
wherein the derived parameter is selected from the group comprising, an efficiency of power conversion, an expected power output, an expected output speed of the rotating shaft, an expected output torque of the rotating shaft, an expected input speed of the rotating shaft, an expected input torque of the rotating shaft, a maximum output speed of the rotating shaft, a maximum output torque of the rotating shaft, a minimum output speed of the rotating shaft, a minimum output torque of the rotating shaft, a maximum input speed of the rotating shaft, a maximum input torque of the rotating shaft, a minimum input speed of the rotating shaft, a minimum input torque of the rotating shaft, or a maximum expected temperature difference of air at each stage.

9. The method of claim 1 wherein the energy source comprises a source of shaft torque.

10. The method of claim 9 wherein the source of shaft torque comprises a motor.

11. The method of claim 9 wherein the source of shaft torque comprises a motor-generator.

12. The method of claim 9 wherein the mechanical linkage comprises a rotating shaft.

* * * * *